US012240135B2

(12) United States Patent
Bourque et al.

(10) Patent No.: US 12,240,135 B2
(45) Date of Patent: Mar. 4, 2025

(54) RAZOR HANDLE WITH A PIVOTING PORTION

(71) Applicant: The Gillette Company LLC, Boston, MA (US)

(72) Inventors: Steven Michael Bourque, Billerica, MA (US); Charles James Bassett, North Reading, MA (US); Marco Fontecchio, Framingham, MA (US); Michael Tejpaul Verasamy, Mountain View, CA (US); Jack Anthony Washington, Mendon, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 16/366,230

(22) Filed: Mar. 27, 2019

(65) Prior Publication Data

US 2019/0299443 A1 Oct. 3, 2019

Related U.S. Application Data

(60) Provisional application No. 62/650,299, filed on Mar. 30, 2018.

(51) Int. Cl.
*B26B 21/22* (2006.01)
*B26B 21/52* (2006.01)

(52) U.S. Cl.
CPC .......... *B26B 21/225* (2013.01); *B26B 21/521* (2013.01)

(58) Field of Classification Search
CPC ...... B26B 21/225; B26B 21/521; B26B 21/52
See application file for complete search history.

(56) References Cited

U.S. PATENT DOCUMENTS

| | | | |
|---|---|---|---|
| 1,505,578 | A | 8/1924 | Charles |
| 1,552,026 | A | 9/1925 | Charles |
| 1,675,128 | A | 6/1928 | Harry |
| 1,821,574 | A | 9/1931 | Nicholas |
| 1,892,836 | A | 1/1933 | Harvey |
| 2,018,147 | A | 10/1935 | Emil |
| 2,063,808 | A | 12/1936 | Henderson et al. |
| 2,134,973 | A | 11/1938 | Harwell |

(Continued)

FOREIGN PATENT DOCUMENTS

| | | | | |
|---|---|---|---|---|
| AU | 1135700 A | | 11/2000 | |
| BE | 861904 A | * | 6/1978 | .......... B26B 21/225 |

(Continued)

OTHER PUBLICATIONS

English Translation of KR20140069811. (Year: 2014).*

(Continued)

*Primary Examiner* — Jennifer S Matthews
(74) *Attorney, Agent, or Firm* — Andres E. Velarde; Joanne N. Pappas; Kevin C. Johnson

(57) ABSTRACT

A handle. The handle can include a main body and a first substantially flat metal arm having a first proximal portion and a first distal end, the first proximal portion being rigidly coupled to the main body at a first location, and a second arm having a second proximal portion and a second distal end, the second proximal portion being rigidly coupled to the main body at a second location. The first and second distal ends can be in spaced relationship and have pivotally coupled therebetween a pivoting head.

26 Claims, 66 Drawing Sheets

(56) References Cited

U.S. PATENT DOCUMENTS 2,164,581 A 7/1939 Ewald
2,225,257 A 12/1940 Conill
2,231,219 A 2/1941 Payson
2,324,148 A 7/1943 Gravin
2,327,192 A 8/1943 Keene
2,414,482 A 1/1947 Kelso
2,536,844 A 1/1951 Carlton et al.
2,622,319 A 12/1952 Russell
2,714,651 A 8/1955 Richard
3,325,627 A 6/1967 Adler et al.
3,364,568 A 1/1968 Nathaniel
3,454,745 A 7/1969 Stone
3,591,923 A 7/1971 Rose
3,593,416 A 7/1971 Edson
3,600,804 A 8/1971 Brown
3,611,568 A 10/1971 Alexander et al.
3,644,992 A 2/1972 Bennett et al.
3,648,368 A 3/1972 Douglass et al.
3,713,184 A 1/1973 Leland
3,748,730 A 7/1973 Bartram et al.
3,768,162 A 10/1973 Perry
3,786,563 A 1/1974 Dorion et al.
3,795,979 A 3/1974 Perry
3,876,858 A 4/1975 Davis et al.
3,878,605 A 4/1975 Braginetz
3,896,364 A 7/1975 Reister
3,934,115 A 1/1976 Peterson
3,935,639 A 2/1976 Terry et al.
3,950,848 A 4/1976 Goldstein
4,026,016 A 5/1977 Nissen
4,077,119 A 3/1978 Sellera
4,083,104 A * 4/1978 Nissen .................. B26B 21/521 30/47
4,148,236 A 4/1979 Holoyen et al.
4,253,013 A 2/1981 Mabuchi
4,253,235 A 3/1981 Jacobson
4,258,471 A 3/1981 Jacobson
4,266,340 A * 5/1981 Bowman ............... B26B 21/225 30/47
4,281,455 A 8/1981 Dixon et al.
4,281,456 A 8/1981 Douglass et al.
4,377,034 A 3/1983 Druash et al.
4,403,414 A 9/1983 Kiraly et al.
4,413,411 A 11/1983 Trotta
4,422,237 A 12/1983 Trotta
4,475,286 A * 10/1984 Saito ..................... B26B 21/225 30/527
4,502,216 A 3/1985 Furnari
4,514,904 A 5/1985 Bond
4,561,526 A 12/1985 Winter et al.
4,562,644 A 1/1986 Hitchens
4,587,968 A 5/1986 Price
4,598,192 A 7/1986 Garrett
4,658,505 A 4/1987 Williams
4,716,652 A 1/1988 Cataudella
4,791,724 A * 12/1988 Dumas .................... B26B 21/18 30/48
4,797,998 A 1/1989 Motta
4,809,432 A 3/1989 Schauble
4,833,779 A 5/1989 Iten
4,837,930 A 6/1989 Righi
4,864,735 A 9/1989 Chung
4,879,811 A 11/1989 Cooney
4,888,868 A 12/1989 Pritchard
4,918,818 A 4/1990 Hsieh
4,944,090 A 7/1990 Sumnall
4,970,784 A 11/1990 Althaus et al.
4,985,995 A 1/1991 Coffin
5,010,905 A 4/1991 Snyder et al.
5,016,352 A 5/1991 Metcalf
5,029,391 A 7/1991 Althaus et al.
5,031,319 A 7/1991 Althaus et al.
5,033,152 A 7/1991 Althaus
5,038,472 A 8/1991 Iderosa
5,044,077 A * 9/1991 Ferraro ................. B26B 21/225 30/530
5,046,249 A 9/1991 Kawara et al.
5,065,515 A 11/1991 Iderosa
5,092,041 A 3/1992 Podolsky
5,093,991 A 3/1992 Hendrickson
5,098,414 A 3/1992 Walker
5,113,585 A 5/1992 Rogers
5,121,541 A 6/1992 Patrakis
5,157,834 A 10/1992 Chen et al.
5,168,628 A 12/1992 Mock et al.
5,182,858 A 2/1993 Chen
5,191,172 A 3/1993 Garganese
5,191,712 A 3/1993 Crook et al.
5,270,493 A 12/1993 Inobe et al.
5,299,354 A 4/1994 Metcalf et al.
5,307,564 A 5/1994 Schoenberg
5,309,640 A 5/1994 Caron
5,319,822 A 6/1994 Shaw
5,331,740 A 7/1994 Carson, III et al.
5,333,382 A 8/1994 Buchbinder
5,333,383 A 8/1994 Ferraro
5,337,478 A 8/1994 Cohen et al.
5,347,717 A 9/1994 Ts
5,394,777 A 3/1995 Kozikowski
5,402,573 A 4/1995 Laniado
5,438,759 A 8/1995 Dieringer
5,454,164 A 10/1995 Yin et al.
5,497,551 A 3/1996 Apprille, Jr.
5,533,263 A 7/1996 Gilder
5,560,106 A 10/1996 Armbruster et al.
5,575,068 A 11/1996 Pedersen
5,600,887 A * 2/1997 Olson ................... B26B 21/225 30/41.5
5,626,154 A 5/1997 Rogers et al.
5,636,442 A 6/1997 Wain
5,653,025 A 8/1997 Cheng et al.
5,661,907 A 9/1997 Apprille, Jr.
5,673,485 A 10/1997 Hill
5,687,485 A 11/1997 Shurtleff et al.
5,743,017 A 4/1998 Dreher et al.
5,761,814 A 6/1998 Anderson et al.
5,780,819 A 7/1998 Fabrikant et al.
5,782,346 A 7/1998 Gray et al.
5,784,790 A 7/1998 Carson, III et al.
5,786,573 A 7/1998 Fabrikant et al.
5,787,586 A 8/1998 Apprille, Jr. et al.
5,787,593 A 8/1998 Althaus
5,787,594 A 8/1998 Estrada
5,794,342 A 8/1998 Davey
5,794,343 A 8/1998 Lee et al.
5,822,869 A 10/1998 Metcalf et al.
5,911,480 A 6/1999 Morgan
5,933,960 A 8/1999 Avidor
5,953,825 A 9/1999 Christman et al.
5,956,851 A 9/1999 Apprille, Jr. et al.
6,026,577 A 2/2000 Ferraro
6,035,537 A 3/2000 Apprille, Jr. et al.
6,052,903 A 4/2000 Metcalf et al.
6,061,912 A 5/2000 Gazaway
6,115,924 A 9/2000 Oldroyd
6,122,826 A 9/2000 Coffin et al.
6,138,361 A 10/2000 Richard et al.
6,141,875 A 11/2000 Andrews
6,158,125 A 12/2000 Dolev
6,161,287 A 12/2000 Swanson et al.
6,161,288 A * 12/2000 Andrews ................. B26B 21/00 30/50
6,189,222 B1 2/2001 Doyle
D446,884 S 8/2001 Kohring et al.
6,276,061 B1 8/2001 Rozenkranc
6,276,062 B1 8/2001 Prochaska
6,301,792 B1 10/2001 Speer
6,308,415 B1 10/2001 Sablatschan et al.
6,421,918 B1 7/2002 Dato et al.
6,430,813 B2 8/2002 Muraguchi et al.
6,434,839 B1 8/2002 Lee et al.
6,442,850 B1 9/2002 Coffin
6,481,104 B1 11/2002 Parker et al.

(56) References Cited

U.S. PATENT DOCUMENTS 6,526,660 B1 * 3/2003 MacNeil .............. B26B 21/222 30/50
6,574,866 B2 6/2003 Pragt et al.
6,598,303 B2 7/2003 Bosy et al.
6,615,498 B1 9/2003 King et al.
6,655,028 B2 12/2003 Coffin
6,675,479 B1 1/2004 Walker, Jr. et al.
6,736,997 B2 5/2004 Olding et al.
6,754,958 B2 6/2004 Haws et al.
6,763,590 B2 7/2004 Guimont et al.
6,789,321 B2 9/2004 Simms
6,807,739 B2 10/2004 Follo
6,817,101 B1 11/2004 Bohmer
6,836,966 B2 1/2005 Patrick
6,868,610 B2 3/2005 Brandt et al.
6,880,253 B1 4/2005 Gyllerstrom
6,910,274 B1 6/2005 Pennella et al.
6,941,659 B2 9/2005 Gilder
6,946,624 B1 9/2005 Tomassetti
6,966,400 B1 11/2005 Rollins et al.
6,973,730 B2 12/2005 Tomassetti et al.
7,000,282 B2 2/2006 Cox et al.
D524,482 S 7/2006 Fischer
D524,483 S 7/2006 Bunnell et al.
7,093,363 B1 8/2006 Kuo
7,111,400 B2 9/2006 Guimont et al.
7,137,203 B2 11/2006 Bressler et al.
D533,684 S 12/2006 Gray et al.
7,197,825 B2 4/2007 Walker et al.
7,200,938 B2 4/2007 Lembke
7,219,430 B2 5/2007 Fandrey et al.
7,520,408 B1 4/2009 Smith et al.
7,681,320 B2 3/2010 Szczepanowski et al.
7,743,506 B2 6/2010 Szczepanowski et al.
7,770,294 B2 8/2010 Bruno et al.
7,877,879 B2 2/2011 Nakasuka
7,913,399 B2 3/2011 Lau
D643,977 S 8/2011 Wonderley et al.
8,015,711 B2 9/2011 Psimadas et al.
8,033,023 B2 10/2011 Johnson et al.
8,104,184 B2 1/2012 Walker
8,183,940 B2 5/2012 Koyama et al.
8,186,063 B2 5/2012 Clarke
8,191,263 B2 6/2012 Follo et al.
8,205,344 B2 6/2012 Stevens
8,429,826 B2 4/2013 Clarke
8,434,189 B2 5/2013 Wang
8,438,735 B2 5/2013 De
8,474,144 B2 7/2013 Royle
8,479,624 B2 7/2013 Flyash et al.
8,481,898 B2 7/2013 Parker
8,510,958 B2 8/2013 Hart et al.
8,516,706 B2 8/2013 Flyash et al.
8,615,886 B1 12/2013 Childers
8,615,891 B2 12/2013 Psimadas et al.
8,621,758 B2 1/2014 Quintiliani et al.
8,650,763 B2 2/2014 Howell et al.
8,661,688 B2 3/2014 Shigeta et al.
8,713,801 B2 5/2014 Bohmer et al.
8,732,955 B2 5/2014 Howell et al.
D707,885 S 6/2014 Cataudella
8,745,877 B2 6/2014 Szczepanowski et al.
8,745,883 B2 6/2014 Murgida et al.
8,769,825 B2 7/2014 Howell et al.
8,772,679 B2 7/2014 Novikov
8,793,879 B2 8/2014 Jessemey et al.
8,826,543 B2 9/2014 Szczepanowski
8,887,369 B2 11/2014 Burrowes et al.
8,938,885 B2 1/2015 Stevens
8,978,258 B2 3/2015 Patel et al.
9,071,073 B2 6/2015 Bourilkov et al.
D741,008 S 10/2015 Bruno et al.
D741,010 S 10/2015 Wang et al.
9,149,945 B2 10/2015 Tomassetti et al.
9,193,077 B2 11/2015 Worrick
D749,265 S 2/2016 Cataudella
9,259,846 B1 2/2016 Robertson
9,283,685 B2 3/2016 Griffin et al.
9,381,657 B2 7/2016 Xu et al.
D764,101 S 8/2016 Cataudella
9,434,080 B2 9/2016 Bozikis
9,440,367 B2 9/2016 Zakuskin
9,469,038 B2 10/2016 Iaccarino et al.
9,469,039 B2 10/2016 Hodgson et al.
9,475,202 B2 10/2016 Griffin et al.
D772,484 S 11/2016 Otsuka
9,486,930 B2 11/2016 Provost et al.
9,498,892 B2 11/2016 Nakasuka et al.
9,511,501 B2 12/2016 Carneiro et al.
9,517,570 B2 12/2016 Tucker et al.
9,539,734 B1 1/2017 Bozikis et al.
9,545,729 B2 1/2017 Buck, Jr. et al.
9,604,375 B2 3/2017 Bohmer et al.
D785,248 S 4/2017 Bruno et al.
9,623,575 B2 4/2017 Griffin et al.
9,630,331 B2 4/2017 Griffin
9,636,830 B2 5/2017 Hodgson et al.
9,669,555 B2 6/2017 Griffin et al.
9,694,503 B2 7/2017 Papadopoulos-papageorgis et al.
9,707,690 B2 7/2017 Hodgson
9,751,229 B2 9/2017 Hodgson
9,789,620 B2 10/2017 Wain et al.
9,833,917 B2 12/2017 Hodgson et al.
9,868,220 B2 1/2018 Moffat
D811,658 S 2/2018 Cataudella et al.
9,889,572 B2 2/2018 Bucco
9,902,077 B2 2/2018 Park et al.
9,975,262 B2 5/2018 Safar
9,993,931 B1 6/2018 Zucker
D829,991 S 10/2018 Zucker
10,099,393 B2 10/2018 Gester et al.
10,137,584 B2 11/2018 Lee et al.
D843,059 S 3/2019 Lettenberger
10,220,532 B2 3/2019 Davos et al.
10,328,587 B2 6/2019 Griffin et al.
10,406,704 B2 * 9/2019 Barrett .................. B26B 21/522
10,427,312 B2 10/2019 Gratsias et al.
D867,661 S 11/2019 Ovvadias
10,500,747 B2 12/2019 Tucker et al.
D874,061 S 1/2020 Verasamy et al.
10,538,006 B2 1/2020 Bridges et al.
10,543,611 B2 1/2020 Bozikis et al.
D877,983 S 3/2020 Walker, Jr. et al.
10,583,576 B2 3/2020 Broemse et al.
10,652,956 B2 5/2020 Heubach et al.
10,667,892 B2 6/2020 Bärtschi et al.
10,759,069 B2 9/2020 Johnson et al.
10,766,155 B2 9/2020 Broemse
10,773,403 B2 9/2020 Washington et al.
10,773,406 B2 9/2020 Broemse
10,773,407 B2 9/2020 Washington et al.
10,773,408 B2 9/2020 Johnson et al.
10,786,917 B1 9/2020 Walton
10,843,357 B2 11/2020 Jang
D905,339 S 12/2020 Roche
10,850,412 B2 12/2020 Harris
10,864,646 B2 12/2020 Long et al.
D908,285 S 1/2021 Cataudella et al.
10,894,330 B2 1/2021 Goeder et al.
D912,326 S 3/2021 Goeder et al.
D913,591 S 3/2021 Ramm et al.
10,940,597 B2 3/2021 Park et al.
10,946,540 B2 3/2021 Bozikis et al.
10,974,403 B2 4/2021 Chang
D921,984 S 6/2021 Brissett et al.
11,117,278 B2 9/2021 Walker, Jr.
D933,295 S 10/2021 Washington et al.
11,148,310 B2 10/2021 Maimone et al.
11,154,999 B2 10/2021 Johnson et al.
D936,287 S 11/2021 Huang et al.
11,325,270 B2 5/2022 Griffin et al.
11,358,294 B2 6/2022 Johnson et al.
D961,847 S 8/2022 Walker, Jr. et al.
D961,849 S 8/2022 Brissett et al.

(56) References Cited

U.S. PATENT DOCUMENTS

| | | | |
|---|---|---|---|
| D965,221 | S | 9/2022 | Verasamy et al. |
| D965,887 | S | 10/2022 | Lettenberger et al. |
| D967,529 | S | 10/2022 | Goeder et al. |
| D972,776 | S | 12/2022 | Lin |
| 11,826,924 | B2 | 11/2023 | Washington |
| 2001/0003869 | A1 | 6/2001 | Rocha |
| 2001/0023538 | A1 | 9/2001 | Muraguchi et al. |
| 2002/0000040 | A1 | 1/2002 | Gilder |
| 2002/0014010 | A1 | 2/2002 | Beutel et al. |
| 2002/0023351 | A1 | 2/2002 | Simms |
| 2002/0029478 | A1 | 3/2002 | Haws et al. |
| 2002/0035786 | A1 | 3/2002 | Gilder et al. |
| 2002/0096512 | A1 | 7/2002 | Abbott et al. |
| 2002/0116822 | A1 | 8/2002 | Coffin |
| 2002/0120278 | A1 | 8/2002 | Cense et al. |
| 2002/0138992 | A1 | 10/2002 | Richard |
| 2002/0144404 | A1 | 10/2002 | Gilder et al. |
| 2002/0189102 | A1 | 12/2002 | Orloff |
| 2003/0046816 | A1 | 3/2003 | Kanzer |
| 2003/0070309 | A1 | 4/2003 | Brown et al. |
| 2003/0074798 | A1 | 4/2003 | Follo |
| 2003/0079348 | A1 | 5/2003 | Follo |
| 2003/0088984 | A1 | 5/2003 | Brandt et al. |
| 2003/0101589 | A1 | 6/2003 | Barish |
| 2003/0115762 | A1 | 6/2003 | Follo et al. |
| 2003/0154832 | A1 | 8/2003 | Guimont et al. |
| 2003/0155887 | A1 | 8/2003 | Bourilkov et al. |
| 2003/0204954 | A1 | 11/2003 | Wain |
| 2003/0226258 | A1 | 12/2003 | Patrick |
| 2003/0231001 | A1 | 12/2003 | Bruning |
| 2004/0045948 | A1 | 3/2004 | Shalev et al. |
| 2004/0074097 | A1 | 4/2004 | Guimont et al. |
| 2004/0098863 | A1 | 5/2004 | Shalev et al. |
| 2004/0181953 | A1 | 9/2004 | Follo et al. |
| 2004/0216311 | A1 | 11/2004 | Follo |
| 2004/0226126 | A1 | 11/2004 | Cox et al. |
| 2005/0000100 | A1 | 1/2005 | Coffin |
| 2005/0189338 | A1 | 9/2005 | Sukeforth |
| 2005/0198840 | A1 | 9/2005 | Worrick, III et al. |
| 2005/0198841 | A1 | 9/2005 | Worrick, III |
| 2005/0218513 | A1 | 10/2005 | Seko |
| 2005/0223568 | A1 | 10/2005 | Walker et al. |
| 2005/0268472 | A1 | 12/2005 | Bourilkov et al. |
| 2006/0032053 | A1 | 2/2006 | Saker et al. |
| 2006/0032054 | A1 | 2/2006 | Simms et al. |
| 2006/0032055 | A1 | 2/2006 | Simms et al. |
| 2006/0037197 | A1 | 2/2006 | Hawes et al. |
| 2006/0070242 | A1 | 4/2006 | Szczepanowski et al. |
| 2006/0080837 | A1 | 4/2006 | Johnson et al. |
| 2006/0080838 | A1 | 4/2006 | Johnson et al. |
| 2006/0080839 | A1 | 4/2006 | Hesketh |
| 2006/0112563 | A1 | 6/2006 | Wain |
| 2006/0117568 | A1 | 6/2006 | Tomassetti |
| 2006/0123631 | A1 | 6/2006 | Szczepanowski et al. |
| 2006/0138121 | A1 | 6/2006 | Werkman et al. |
| 2006/0179661 | A1 | 8/2006 | Walker et al. |
| 2006/0260142 | A1 | 11/2006 | Dombrowski et al. |
| 2007/0028449 | A1 | 2/2007 | King |
| 2007/0044313 | A1 | 3/2007 | Rozenkranc |
| 2007/0056167 | A1 | 3/2007 | Richard et al. |
| 2007/0068010 | A1 | 3/2007 | Annoura |
| 2007/0084058 | A1 | 4/2007 | Szczepanowski et al. |
| 2007/0145031 | A1 | 6/2007 | Shalev et al. |
| 2007/0163123 | A1 | 7/2007 | Gratsias et al. |
| 2007/0168302 | A1 | 7/2007 | Giovinazzo et al. |
| 2007/0169302 | A1 | 7/2007 | Madhala |
| 2007/0180699 | A1 | 8/2007 | Psimadas et al. |
| 2007/0220752 | A1 | 9/2007 | Psimadas et al. |
| 2007/0256276 | A1 | 11/2007 | Holland-letz |
| 2007/0271714 | A1 | 11/2007 | Adam et al. |
| 2007/0283565 | A1 | 12/2007 | Ho |
| 2008/0016692 | A1 | 1/2008 | Noble |
| 2008/0034591 | A1 | 2/2008 | Fung |
| 2008/0086887 | A1 | 4/2008 | Park et al. |
| 2008/0148579 | A1 | 6/2008 | Bozikis et al. |
| 2008/0155831 | A1 | 7/2008 | Royle |
| 2008/0189953 | A1 | 8/2008 | Jessemey et al. |
| 2008/0271319 | A1 | 11/2008 | Saker et al. |
| 2008/0289185 | A1 | 11/2008 | Clarke |
| 2008/0307660 | A1 | 12/2008 | Clarke |
| 2009/0007432 | A1 | 1/2009 | Chou |
| 2009/0056140 | A1 | 3/2009 | Bruno et al. |
| 2009/0070947 | A1 | 3/2009 | Baertschi et al. |
| 2009/0071010 | A1 | 3/2009 | Hart |
| 2009/0083982 | A1 | 4/2009 | Forsdike |
| 2009/0119923 | A1 | 5/2009 | Hart et al. |
| 2009/0178281 | A1 | 7/2009 | Moore |
| 2009/0183371 | A1 | 7/2009 | Mileti et al. |
| 2009/0217531 | A1 | 9/2009 | Muraguchi |
| 2009/0235539 | A1 | 9/2009 | Wonderley |
| 2009/0255123 | A1 | 10/2009 | Tomassetti et al. |
| 2009/0293281 | A1 | 12/2009 | Bruno |
| 2009/0313837 | A1 | 12/2009 | Winter et al. |
| 2010/0000093 | A1 | 1/2010 | Hwang |
| 2010/0024615 | A1 | 2/2010 | Rebaudieres et al. |
| 2010/0031510 | A1 | 2/2010 | Gester et al. |
| 2010/0043242 | A1 | 2/2010 | Stevens |
| 2010/0077622 | A1 | 4/2010 | Schulz |
| 2010/0095530 | A1 | 4/2010 | De et al. |
| 2010/0107416 | A1 | 5/2010 | Follo |
| 2010/0115774 | A1 | 5/2010 | De |
| 2010/0122464 | A1 | 5/2010 | Ndou et al. |
| 2010/0132204 | A1 | 6/2010 | Brown |
| 2010/0198134 | A1 | 8/2010 | Eckhouse et al. |
| 2010/0205808 | A1 | 8/2010 | King |
| 2010/0212939 | A1 | 8/2010 | Ito et al. |
| 2010/0236071 | A1 | 9/2010 | Szczepanowski et al. |
| 2010/0236072 | A1 | 9/2010 | Szczepanowski et al. |
| 2010/0269352 | A1 * | 10/2010 | Curtin .................. B26B 21/521 30/123.5 |
| 2010/0281698 | A1 | 11/2010 | King |
| 2010/0287784 | A1 | 11/2010 | Qiu |
| 2010/0292546 | A1 | 11/2010 | Gonopolskiy et al. |
| 2010/0319204 | A1 | 12/2010 | Peterson et al. |
| 2011/0005082 | A1 | 1/2011 | Larscheid et al. |
| 2011/0016721 | A1 | 1/2011 | Schnak et al. |
| 2011/0023310 | A1 | 2/2011 | Psimadas et al. |
| 2011/0035950 | A1 | 2/2011 | Royle |
| 2011/0041340 | A1 | 2/2011 | Sherman et al. |
| 2011/0088269 | A1 | 4/2011 | Walker, Jr. et al. |
| 2011/0126413 | A1 | 6/2011 | Szczepanowski et al. |
| 2011/0138637 | A1 | 6/2011 | Bucco |
| 2011/0146015 | A1 | 6/2011 | Moskovich et al. |
| 2011/0146080 | A1 | 6/2011 | Pauw |
| 2011/0167640 | A1 | 7/2011 | Flyash et al. |
| 2011/0167653 | A1 | 7/2011 | Psimadas et al. |
| 2011/0174328 | A1 | 7/2011 | Cerutti et al. |
| 2011/0197450 | A1 | 8/2011 | Taub et al. |
| 2011/0203124 | A1 | 8/2011 | Bridges et al. |
| 2011/0219624 | A1 | 9/2011 | Rockell et al. |
| 2011/0239475 | A1 | 10/2011 | Efthimiadis et al. |
| 2011/0252646 | A1 | 10/2011 | Gordon et al. |
| 2011/0289776 | A1 | 12/2011 | Hawes et al. |
| 2011/0308089 | A1 | 12/2011 | Bridges |
| 2011/0314677 | A1 | 12/2011 | Meier et al. |
| 2012/0030945 | A1 | 2/2012 | Clarke et al. |
| 2012/0060382 | A1 | 3/2012 | Beugels et al. |
| 2012/0096718 | A1 | 4/2012 | Howell |
| 2012/0102745 | A1 | 5/2012 | Jessemey et al. |
| 2012/0102761 | A1 | 5/2012 | Jessemey et al. |
| 2012/0124840 | A1 | 5/2012 | Iaccarino et al. |
| 2012/0125489 | A1 | 5/2012 | Hashimura et al. |
| 2012/0151775 | A1 | 6/2012 | Ren |
| 2012/0167392 | A1 | 7/2012 | Cherian et al. |
| 2012/0187261 | A1 | 7/2012 | Cicero |
| 2012/0205362 | A1 | 8/2012 | Etzkorn et al. |
| 2012/0210586 | A1 | 8/2012 | Lelieveld et al. |
| 2012/0227554 | A1 | 9/2012 | Beech |
| 2012/0233864 | A1 | 9/2012 | Flyash et al. |
| 2012/0234658 | A1 | 9/2012 | Schnak et al. |
| 2012/0246947 | A1 | 10/2012 | Fang et al. |
| 2012/0255185 | A1 | 10/2012 | Patel et al. |
| 2012/0255942 | A1 | 10/2012 | Vodvarka |
| 2012/0260509 | A1 | 10/2012 | Fang et al. |

(56) References Cited

U.S. PATENT DOCUMENTS

2012/0266465 A1 10/2012 Hart et al.
2012/0279070 A1 11/2012 Seo
2012/0279073 A1 11/2012 Snow et al.
2012/0279075 A1 11/2012 Amsel
2012/0291288 A1 11/2012 Bohmer et al.
2012/0291295 A1 11/2012 Braun
2012/0297625 A1 11/2012 Madden
2012/0311865 A1 12/2012 Hamilton et al.
2012/0330234 A1 12/2012 Balluff et al.
2013/0081276 A1 4/2013 Wain
2013/0081289 A1 4/2013 Wain et al.
2013/0081290 A1 4/2013 Murgida et al.
2013/0097868 A1 4/2013 Jessemey et al.
2013/0144280 A1 6/2013 Eckhouse et al.
2013/0145623 A1 6/2013 Wain
2013/0145624 A1 6/2013 Jessemey et al.
2013/0145625 A1 6/2013 Xu et al.
2013/0145626 A1 6/2013 Xu et al.
2013/0160306 A1 6/2013 Howell et al.
2013/0199346 A1 8/2013 Psimadas et al.
2013/0199348 A1 8/2013 Aberizk
2013/0205959 A1 8/2013 Jones et al.
2013/0247395 A1 9/2013 Szczepanowski et al.
2013/0291390 A1 11/2013 Gajria et al.
2013/0291391 A1 11/2013 Stevens
2013/0312272 A1 11/2013 Wilson et al.
2013/0326881 A1 12/2013 Blatter
2014/0026423 A1 1/2014 Schnak et al.
2014/0026726 A1 1/2014 Griffin et al.
2014/0048310 A1 2/2014 Montevirgen et al.
2014/0083265 A1 3/2014 Provost et al.
2014/0096396 A1 4/2014 Pauw
2014/0096402 A1 4/2014 Nakasuka et al.
2014/0109735 A1 4/2014 Shepperson
2014/0114301 A1 4/2014 Solomon et al.
2014/0116211 A1 5/2014 Griffin et al.
2014/0116737 A1 5/2014 Iwata et al.
2014/0165800 A1 6/2014 Griffin et al.
2014/0216210 A1 8/2014 Near
2014/0230258 A1 8/2014 Eagleton et al.
2014/0245611 A1 9/2014 Bohmer et al.
2015/0032128 A1 1/2015 Tavlin et al.
2015/0068043 A1 3/2015 Gester et al.
2015/0122899 A1 5/2015 Kaneko et al.
2015/0135538 A1 5/2015 Tomassetti et al.
2015/0174773 A1 6/2015 Hodgson
2015/0174774 A1 6/2015 Hodgson
2015/0174775 A1 6/2015 Hodgson
2015/0174776 A1 6/2015 Hawes
2015/0190935 A1 7/2015 Griffin et al.
2015/0190936 A1 7/2015 Griffin et al.
2015/0197018 A1 7/2015 Heubach et al.
2015/0197019 A1 7/2015 Hodgson et al.
2015/0197020 A1 7/2015 Hodgson et al.
2015/0197021 A1 7/2015 Hodgson et al.
2015/0266190 A1 9/2015 Bohmer et al.
2015/0266191 A1 9/2015 Maimone et al.
2015/0273708 A1 10/2015 Haba
2015/0283716 A1 10/2015 Kim et al.
2015/0290819 A1 10/2015 Giannopoulos et al.
2015/0296622 A1 10/2015 Jiang et al.
2015/0298326 A1 10/2015 Tomassetti et al.
2015/0298327 A1 10/2015 Tomassetti et al.
2015/0306777 A1 10/2015 Georgakis et al.
2015/0314466 A1 11/2015 Papadopoulos-papageorgis et al.
2015/0321366 A1 11/2015 Papadopoulos-papageorgis et al.
2015/0328788 A1 11/2015 Ren et al.
2016/0001455 A1 1/2016 Swenson
2016/0046028 A1 2/2016 Meier et al.
2016/0046029 A1 2/2016 Samuels et al.
2016/0096280 A1 4/2016 Robertson
2016/0101531 A1 4/2016 Bunnell
2016/0107324 A1 4/2016 Robertson et al.
2016/0121495 A1 5/2016 Johnson
2016/0121496 A1 5/2016 Johnson
2016/0121497 A1 5/2016 Johnson
2016/0144519 A1 5/2016 Hahn et al.
2016/0144520 A1 5/2016 Lee
2016/0250764 A1 9/2016 Hashimoto
2016/0250765 A1 9/2016 Gratsias et al.
2016/0250766 A1 9/2016 Gratsias et al.
2016/0288348 A1 10/2016 Molema et al.
2016/0375596 A1 12/2016 Broemse et al.
2016/0375597 A1 12/2016 Broemse et al.
2017/0001323 A1 1/2017 Furuta
2017/0021513 A1* 1/2017 Liberatore ............ B26B 21/225
2017/0036363 A1 2/2017 Efthimiadis et al.
2017/0043492 A1 2/2017 Robertson et al.
2017/0066148 A1 3/2017 Hodgson et al.
2017/0066149 A1 3/2017 Hodgson et al.
2017/0080585 A1 3/2017 Griffin et al.
2017/0112002 A1 4/2017 Behrendt et al.
2017/0173806 A1 6/2017 Lee
2017/0173809 A1 6/2017 Psimadas et al.
2017/0203453 A1 7/2017 Hodgson et al.
2017/0225345 A1 8/2017 Burrowes et al.
2017/0259440 A1 9/2017 Broemse et al.
2017/0266825 A1 9/2017 Bozikis et al.
2017/0282390 A1 10/2017 Hodgson
2017/0282391 A1 10/2017 Provost et al.
2017/0282392 A1 10/2017 Maimone et al.
2017/0319310 A1 11/2017 Gengyo et al.
2017/0326741 A1 11/2017 Liberatore
2017/0326743 A1 11/2017 Hodgson
2017/0326744 A1 11/2017 Liberatore
2017/0334083 A1 11/2017 Gratsias et al.
2017/0341248 A1 11/2017 Lee et al.
2017/0341249 A1 11/2017 Lee et al.
2018/0043553 A1 2/2018 Lu et al.
2018/0079095 A1 3/2018 Robertson et al.
2018/0093384 A1* 4/2018 Moffat ................ B26B 21/4012
2018/0141225 A1 5/2018 Zucker
2018/0200899 A1 7/2018 Eagleton et al.
2018/0272549 A1 9/2018 Son et al.
2018/0297222 A1 10/2018 Hodgson
2018/0297224 A1 10/2018 Bozikis et al.
2018/0370052 A1* 12/2018 Zaremba .............. B26B 21/528
2019/0117356 A1 4/2019 Bärtschi et al.
2019/0152077 A1 5/2019 Kim
2019/0152079 A1 5/2019 Chang
2019/0176355 A1 6/2019 Mazarakis et al.
2019/0224874 A1 7/2019 Blatter et al.
2019/0255721 A1 8/2019 Psimadas et al.
2019/0299447 A1 10/2019 Johnson et al.
2019/0299450 A1 10/2019 Johnson et al.
2019/0299451 A1 10/2019 Long et al.
2019/0299452 A1 10/2019 Johnson et al.
2019/0299453 A1 10/2019 Bourque et al.
2019/0299455 A1 10/2019 Patel et al.
2019/0299461 A1 10/2019 Johnson et al.
2019/0299462 A1 10/2019 Washington et al.
2019/0299463 A1 10/2019 Patel et al.
2019/0299464 A1 10/2019 Washington et al.
2019/0299465 A1 10/2019 Gester et al.
2019/0299472 A1 10/2019 Johnson et al.
2019/0299473 A1 10/2019 Johnson et al.
2019/0299474 A1 10/2019 Bourque et al.
2019/0299477 A1 10/2019 Johnson et al.
2019/0337174 A1 11/2019 Kopelas et al.
2019/0358836 A1 11/2019 Maimone et al.
2019/0358837 A1 11/2019 Broemse et al.
2019/0366570 A1 12/2019 Kopelas et al.
2020/0023531 A1 1/2020 Hitchcock
2020/0039098 A1 2/2020 Kopelas et al.
2020/0130208 A1 4/2020 Anjum et al.
2020/0130209 A1* 4/2020 Maurer ................. B26B 21/446
2020/0180178 A1 6/2020 Park et al.
2020/0223080 A1 7/2020 Tucker et al.
2020/0236738 A1 7/2020 Heubach et al.
2020/0361105 A1 11/2020 Park et al.
2020/0361106 A1 11/2020 Broemse
2020/0368927 A1 11/2020 O'connor et al.
2020/0398449 A1 12/2020 Claus et al.
2021/0016458 A1 1/2021 Peterson et al.

(56) References Cited

U.S. PATENT DOCUMENTS

| | | | |
|---|---|---|---|
| 2021/0323180 A1 | 10/2021 | Shen et al. | |
| 2021/0323181 A1 | 10/2021 | Shen et al. | |
| 2021/0379780 A1 | 12/2021 | Patel et al. | |
| 2022/0152855 A1 | 5/2022 | Noh et al. | |
| 2022/0241994 A1 | 8/2022 | Washington | |
| 2022/0258366 A1 | 8/2022 | Johnson et al. | |
| 2022/0258367 A1 | 8/2022 | Johnson et al. | |
| 2022/0329246 A1 | 10/2022 | Von Dahlen et al. | |
| 2022/0347875 A1 | 11/2022 | Hamelin et al. | |

FOREIGN PATENT DOCUMENTS

| | | | | | |
|---|---|---|---|---|---|
| BE | 891863 | A * | 5/1982 | B26B 21/225 |
| CA | 2261421 | A1 * | 10/1999 | B26B 21/225 |
| CN | 1462103 | A | 12/2003 | |
| CN | 2848496 | Y | 12/2006 | |
| CN | 200977659 | Y | 11/2007 | |
| CN | 101306537 | A | 11/2008 | |
| CN | 201253863 | Y | 6/2009 | |
| CN | 101612740 | A | 12/2009 | |
| CN | 101790444 | A | 7/2010 | |
| CN | 102133756 | A | 7/2011 | |
| CN | 202085323 | U | 12/2011 | |
| CN | 101795832 | B | 7/2012 | |
| CN | 103208780 | A | 7/2013 | |
| CN | 203031634 | U | 7/2013 | |
| CN | 103235614 | A | 8/2013 | |
| CN | 203210412 | U | 9/2013 | |
| CN | 103909531 | A | 7/2014 | |
| CN | 103998190 | A | 8/2014 | |
| CN | 203818169 | U * | 9/2014 | B26B 21/521 |
| CN | 107107359 | A | 8/2017 | |
| CN | 206795896 | U | 12/2017 | |
| DE | 575523 | C | 4/1933 | |
| DE | 2620813 | A * | 11/1976 | B26B 21/225 |
| DE | 2520959 | A1 | 12/1976 | |
| DE | 2801845 | A1 | 7/1979 | |
| DE | 3141361 | A1 * | 8/1982 | |
| DE | 202009003889 | U1 | 5/2009 | |
| DE | 102008032389 | A1 | 1/2010 | |
| EP | 0020816 | | 1/1981 | |
| EP | 0885697 | | 12/1998 | |
| EP | 903205 | A1 * | 3/1999 | |
| EP | 0987088 | A1 | 3/2000 | |
| EP | 1535708 | A1 | 6/2005 | |
| EP | 1671761 | A1 * | 6/2006 | B26B 21/225 |
| EP | 1363517 | B1 | 2/2008 | |
| EP | 2338652 | | 6/2011 | |
| EP | 3166760 | B1 | 3/2018 | |
| FR | 520234 | A | 6/1921 | |
| FR | 749861 | A | 8/1933 | |
| FR | 840502 | A | 4/1939 | |
| FR | 985030 | A | 7/1951 | |
| FR | 2703290 | A1 | 10/1994 | |
| FR | 2716402 | A1 | 8/1995 | |
| GB | 541723 | A | 12/1941 | |
| GB | 875618 | A | 8/1961 | |
| GB | 1056038 | A | 1/1967 | |
| GB | 1075139 | A | 7/1967 | |
| GB | 2030909 | A | 4/1980 | |
| GB | 2078589 | A * | 1/1982 | B26B 21/225 |
| GB | 2116470 | A * | 9/1983 | B26B 21/225 |
| GB | 2323224 | A | 9/1998 | |
| GB | 2452411 | B | 5/2010 | |
| JP | S5416091 | U | 2/1979 | |
| JP | S5566396 | U | 5/1980 | |
| JP | S56128188 | A | 10/1981 | |
| JP | S5838581 | A | 3/1983 | |
| JP | S60194333 | U | 12/1985 | |
| JP | H06137960 | A | 5/1994 | |
| JP | H06216532 | A | 8/1994 | |
| JP | H0720172 | U | 4/1995 | |
| JP | H08202459 | A | 8/1996 | |
| JP | H10165521 | A | 6/1998 | |
| JP | H10207288 | A | 8/1998 | |
| JP | H11059591 | | 3/1999 | |
| JP | 3066524 | B2 | 5/2000 | |
| JP | 2001510720 | A | 8/2001 | |
| JP | 2002023805 | A | 1/2002 | |
| JP | 2002066172 | A | 3/2002 | |
| JP | 2004186072 | A | 7/2004 | |
| JP | 2005246044 | A | 9/2005 | |
| JP | 2006520212 | A | 9/2006 | |
| JP | 2007068922 | A | 3/2007 | |
| JP | 2007512928 | A | 5/2007 | |
| JP | 2007525309 | A | 9/2007 | |
| JP | 2008059842 | A | 3/2008 | |
| JP | 2008063187 | A | 3/2008 | |
| JP | 2008515510 | A | 5/2008 | |
| JP | 2009506858 | A | 2/2009 | |
| JP | 2009178400 | A | 8/2009 | |
| JP | 2010124875 | A | 6/2010 | |
| JP | 2010193758 | A | 9/2010 | |
| JP | 2010532220 | A | 10/2010 | |
| JP | 2011019558 | A | 2/2011 | |
| JP | 2011152345 | A | 8/2011 | |
| JP | 2011523882 | A | 8/2011 | |
| JP | 2013523407 | A | 6/2013 | |
| JP | 5753310 | B1 | 5/2015 | |
| JP | 2015515884 | A | 6/2015 | |
| JP | 2015195869 | A | 11/2015 | |
| JP | 2016168276 | A | 9/2016 | |
| JP | 2017500115 | A | 1/2017 | |
| JP | 2017501852 | A | 1/2017 | |
| JP | 2017502778 | A | 1/2017 | |
| JP | 2017502781 | A | 1/2017 | |
| JP | 2017086606 | A | 5/2017 | |
| JP | 2017531513 | A | 10/2017 | |
| KR | 920000490 | Y1 * | 1/1992 | |
| KR | 20070089345 | A | 8/2007 | |
| KR | 20100108753 | A | 10/2010 | |
| KR | 20140040880 | A | 4/2014 | |
| KR | 20140042230 | A | 4/2014 | |
| KR | 20140069811 | A * | 6/2014 | |
| KR | 200473990 | Y1 * | 8/2014 | |
| WO | 9213684 | A2 | 8/1992 | |
| WO | 9404106 | A1 | 3/1994 | |
| WO | 9708804 | A1 | 3/1997 | |
| WO | 9737819 | A2 | 10/1997 | |
| WO | WO-2010068070 | | 6/2010 | |
| WO | 2010078564 | A2 | 7/2010 | |
| WO | 2013070995 | A1 | 5/2013 | |
| WO | 2015108805 | A1 | 7/2015 | |
| WO | 2015108806 | A1 | 7/2015 | |
| WO | 2015108801 | A4 | 9/2015 | |
| WO | WO-2017024156 | A1 * | 2/2017 | B26B 21/08 |
| WO | 2019191231 | A1 | 10/2019 | |

OTHER PUBLICATIONS

U.S. Appl. No. 16/365,825, filed Mar. 27, 2019, Marco Fontecchio et. al.

U.S. Appl. No. 16/365,879, filed Mar. 27, 2019, Patrick Francis McNally et al.

U.S. Appl. No. 16/366,189, filed Mar. 27, 2019, Patrick Francis McNally et al.

U.S. Appl. No. 16/366,209, filed Mar. 27, 2019, Charles James Bassett et al.

U.S. Appl. No. 16/366,246, filed Mar. 27, 2019, Charles James Bassett et al.

U.S. Appl. No. 16/366,271, filed Mar. 27, 2019, Charles James Bassett et al.

U.S. Appl. No. 16/366,288, filed Mar. 27, 2019, Charles James Bassett et al.

U.S. Appl. No. 16/366,306, filed Mar. 27, 2019, Charles James Bassett et al.

U.S. Appl. No. 16/367,396, filed Mar. 28, 2019, Michael Tejpaul Verasamy et al.

U.S. Appl. No. 16/367,402, filed Mar. 28, 2019, Michael Tejpayl Verasamy et al.

U.S. Appl. No. 16/367,412, filed Mar. 28, 2019, Eric Glenn Siegmann et al.

(56) References Cited

OTHER PUBLICATIONS

U.S. Appl. No. 16/367,427, filed Mar. 28, 2019, Ashok Bakul Patel et al.
PCT International Search Report with Written Opinion in corresponding Int'l Appln. PCT/US2019/024178 dated May 24, 2019.
All Office Actions; U.S. Appl. No. 17/406,457.
Unpublished U.S. Appl. No. 17/406,457, filed Aug. 19, 2021, to Ashok Bakul Patel et. al.
3B Certified Silicones in 50, 60, and 70 Durometer, Testa, Dominic, available on Sep. 25, 2020 at https://v www .sspi nc.com/si li cones that_ work/88/3 B-Certi fied-Si I icones-i n-50-60-and-70-Du rometer/?vsrefdom =adwords&gcl id=EAlalQobChMIOYrO_oyF7AIVk-DICh08_QaFEAAYAiAAEgKAnvD_Bw, dated Feb. 27, 2017,1-6 pages.
All Office Actions, U.S. Appl. No. 16/366,209.
All Office Actions, U.S. Appl. No. 16/367,402.
All Office Actions, U.S. Appl. No. 16/365,825.
All Office Actions, U.S. Appl. No. 16/365,879.
All Office Actions, U.S. Appl. No. 16/366,246.
All Office Actions, U.S. Appl. No. 16/366,189.
All Office Actions, U.S. Appl. No. 16/366,271.
All Office Actions, U.S. Appl. No. 16/366,288.
All Office Actions, U.S. Appl. No. 16/366,306.
All Office Actions, U.S. Appl. No. 16/367,396.
All Office Actions, U.S. Appl. No. 16/367,427.
All Office Actions, U.S. Appl. No. 16/367,412.
Amazon product review, Shaving razor handle dated Mar. 23, 2016,2 pages.
https://en.wikipedia.org/wiki/Yield_(engineering)#:-:text=The%20yield%20strength%20or%20yield,material%20begins%20to%20deform%20plastically., dated 2020 ; 1 page.
https://www.merriam-webster.com/dictionary/handle; dated 2020; 2 pages.
Low Compression Set Gaskets—Silicone, Urethane Foam, New England Die Cutting, available on Sep. 25, 2020 athttps://www.nedc.com/low-compression-set-gaskets-silicone-urethane-foam/ dated Mar. 22, 2020, 1-5 pages.
"Practical Design Guidelines for Flex", dated 2016, pp. 75-116, available on Sep. 12, 2023 at: https://fliphtmls.com/izxs/irex/basic.
Collins Dictionary, "loop" online retrieved from "https://www.collinsdictionary.com/us/dictionary/english/loop", No Known Date, 01 page.

* cited by examiner

RAZOR HANDLE WITH A PIVOTING PORTION

FIELD OF THE INVENTION

The invention generally relates to handles for razors, more particularly to handles with a pivoting portion.

BACKGROUND OF THE INVENTION

Recent advances in shaving razors, such as a 5-bladed or 6-bladed razor for wet shaving, may provide for closer, finer, and more comfortable shaving. One factor that may affect the closeness of the shave is the amount of contact for blades on a shaving surface. The larger the surface area that the blades contact then the closer the shave becomes. Current approaches to shaving largely comprise of razors with a pivoting axis of rotation, for example, about an axis substantially parallel to the blades and substantially perpendicular to the handle (i.e., front-and-back pivoting motion). One factor that may affect the comfort of the shave is provision for a skin benefit, such as fluid or heat, to be delivered at the skin surface. However, effectively providing for a skin benefit can be hindered by the requirements for effective blade pivoting in a compact, durable razor.

What is needed, then, is a razor, suitable for wet or dry shaving, providing a skin benefit and pivoting for a close, comfortable shave. The razor, including powered and manual razors, is preferably simpler, cost-effective, reliable, compact, durable, easier and/or faster to manufacture, and easier and/or faster to assemble with more precision.

SUMMARY OF THE INVENTION

A handle is disclosed. The handle can include a main body weighing greater than about 60 grams. A first arm having a first proximal portion and a first distal end can have the first proximal portion rigidly coupled to the main body at a first location. A second arm having a second proximal portion and a second distal end can have the second proximal portion rigidly coupled to the main body at a second location. The first and second distal ends can be in spaced relationship and have pivotally coupled therebetween a pivoting head.

BRIEF DESCRIPTION OF THE DRAWINGS

Other features and advantages of the present invention, as well as the invention itself, can be more fully understood from the following description of the various embodiments, when read together with the accompanying drawings, in which.

DETAILED DESCRIPTION OF THE INVENTION

Figure 1:
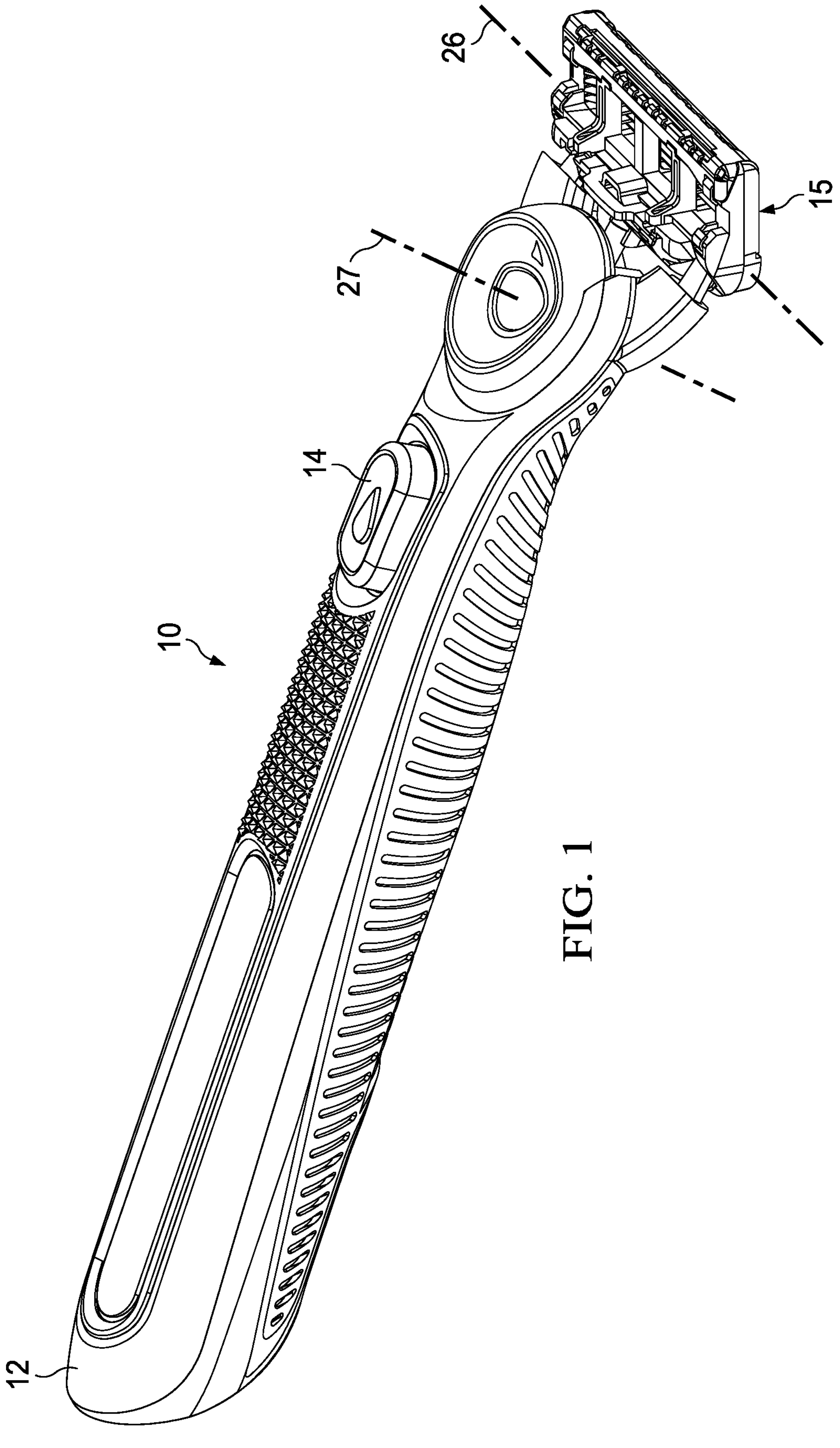
FIG. 1 is a schematic perspective view of a shaving razor in accordance with an embodiment of the invention.

Except as otherwise noted, the articles "a," "an," and "the" mean "one or more." Referring to FIG. 1, an embodiment of a shaving razor 10 is shown. The shaving razor can have a handle 12 and a blade cartridge unit 15 which can releasably attach to the handle 12 and can contain one or more blades 17. The description herein relates primarily to the handle 12, and features associated with the handle 12 that facilitate pivoting of the blade cartridge unit 15 relative to the handle 12, and provision of skin benefit delivery components to the skin of a user of the razor 10.

In the illustrated embodiments the skin benefit delivery components extend from handle 12 through an opening in the cartridge unit 15 and can, therefore, be in close proximity to the skin of a user during shaving. The benefits will be delivered through a pivoting head as will be described herein. The mechanism to pivot the pivoting head relative to a handle comprises a benefit pivot delivery connection, a spring member, and one or more bearings. The benefit pivot delivery connection functions to deliver a benefit (such as heat or fluid) from the handle to a user's skin.

Figure 2:
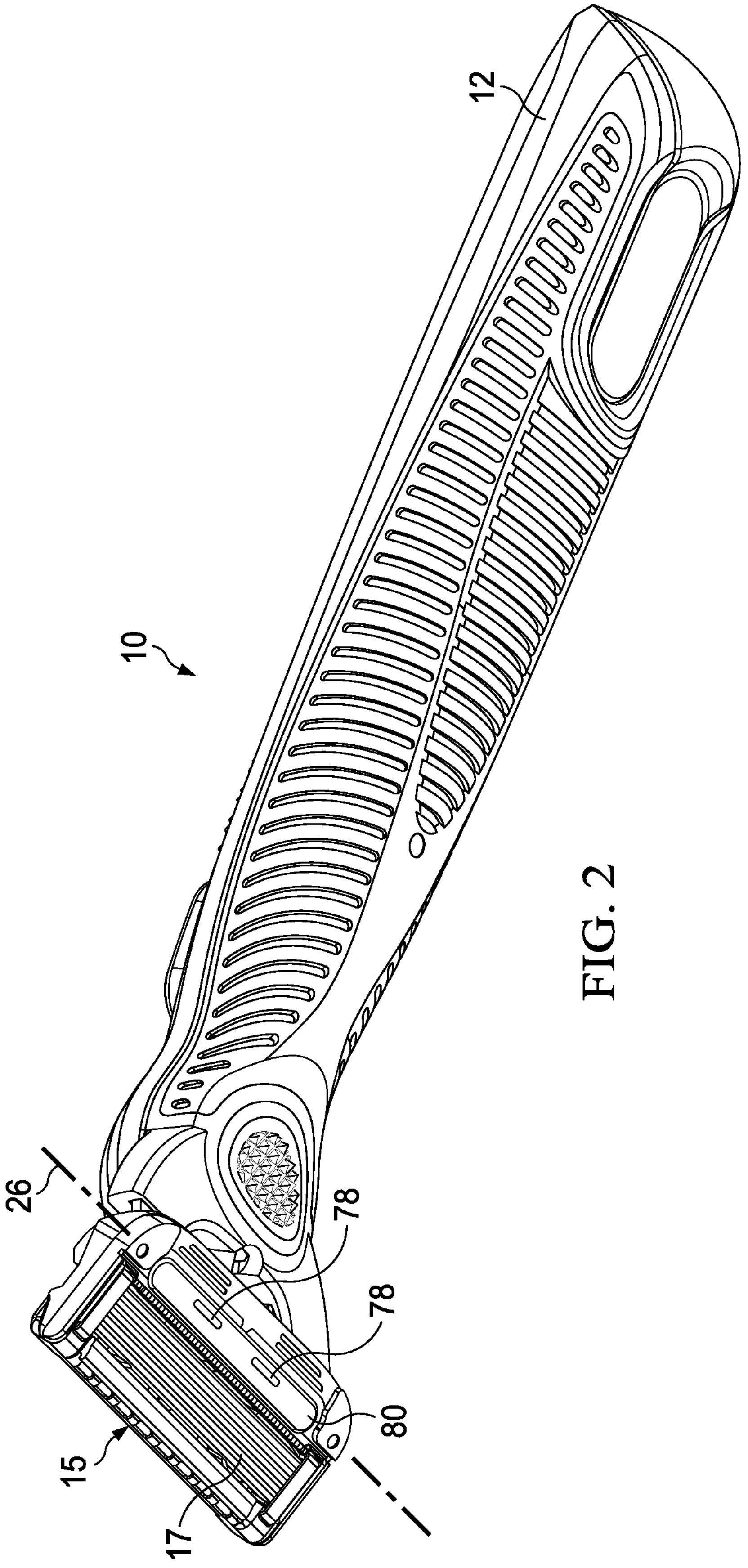
FIG. 2 is a schematic perspective view of the underside of the shaving razor of FIG. 1.
Figure 3:
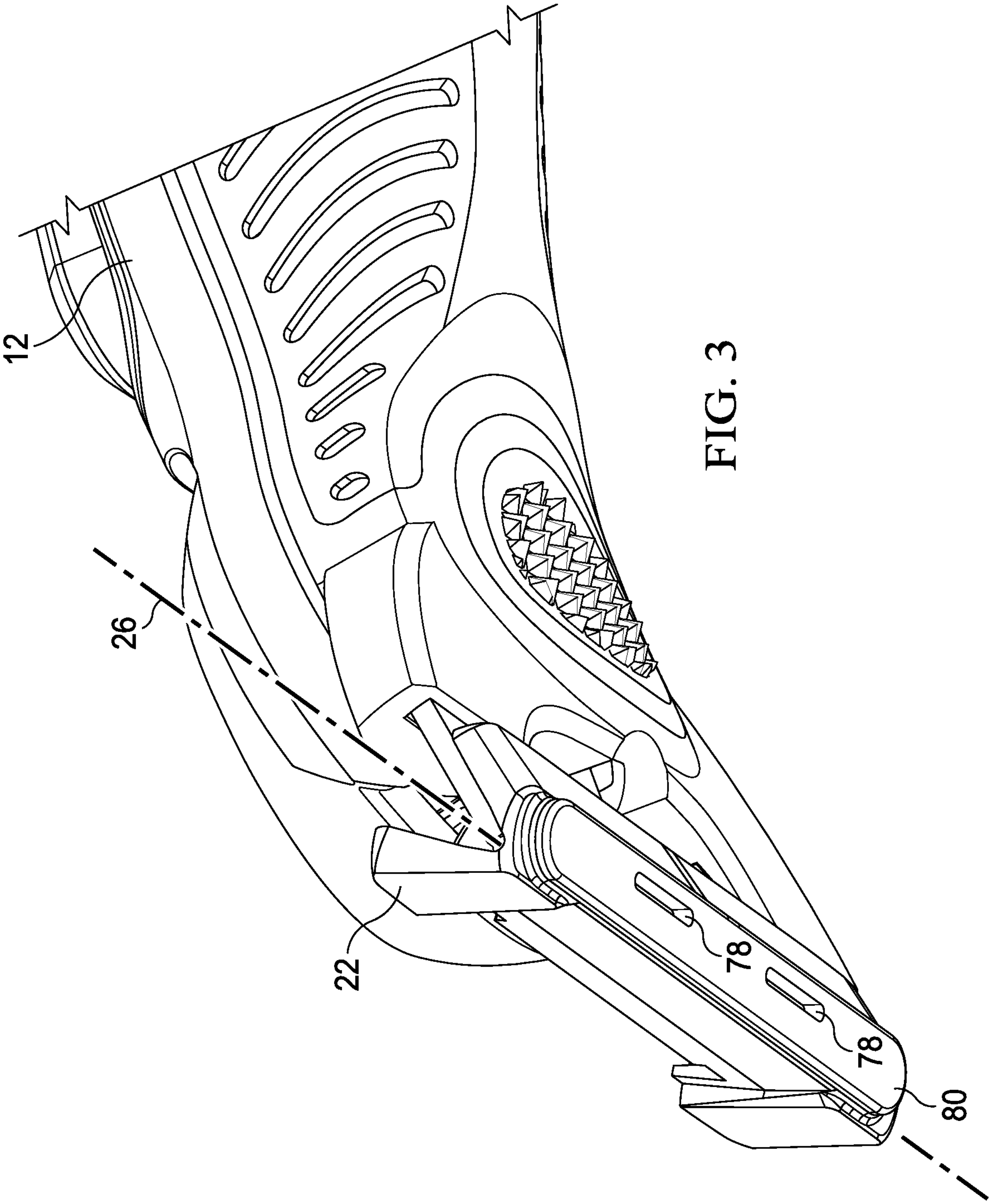
FIG. 3 is a schematic perspective view of a portion of the shaving razor of FIG. 2.

Two non-limiting embodiments of razors providing for a skin benefit are disclosed herein. The first, shown in FIG. 1 can deliver a fluid to the skin of the user. As shown in FIG. 2 which shows the underside of the razor depicted in FIG. 1, a portion of the handle 12 can extend through blade cartridge unit 15 and be exposed as face 80. Face 80 can be a skin interfacing surface, intended to be contacting or proximate the skin of a user using the shaver, discussed more fully below. As shown in FIG. 2 and in more detail in FIG. 3 in which the blade cartridge unit 15 has been removed, face 80 is a surface of a pivoting head 22 and can have openings 78 through which a fluid can be dispensed for skin benefit during and after shaving. Pivoting head 22 can pivot about a pivot axis, referred to herein as a pivot axis or a first axis of rotation 26 with respect to handle 12, as well as a secondary axis of rotation 27 that is generally perpendicular to the first axis of rotation 26. Fluid flow from the reservoir in handle 12 can be achieved by pressing the skin benefit actuator 14, which can be a depressible button, and which presses on a fluid reservoir inside handle 12 to urge fluid flow toward and through the pivoting head 22, as described more fully below. The reservoir may be of any type. One example is described in co-owned, co-pending U.S. patent application Ser. No. 15/499,307, which is hereby incorporated herein by reference.

Figure 4:
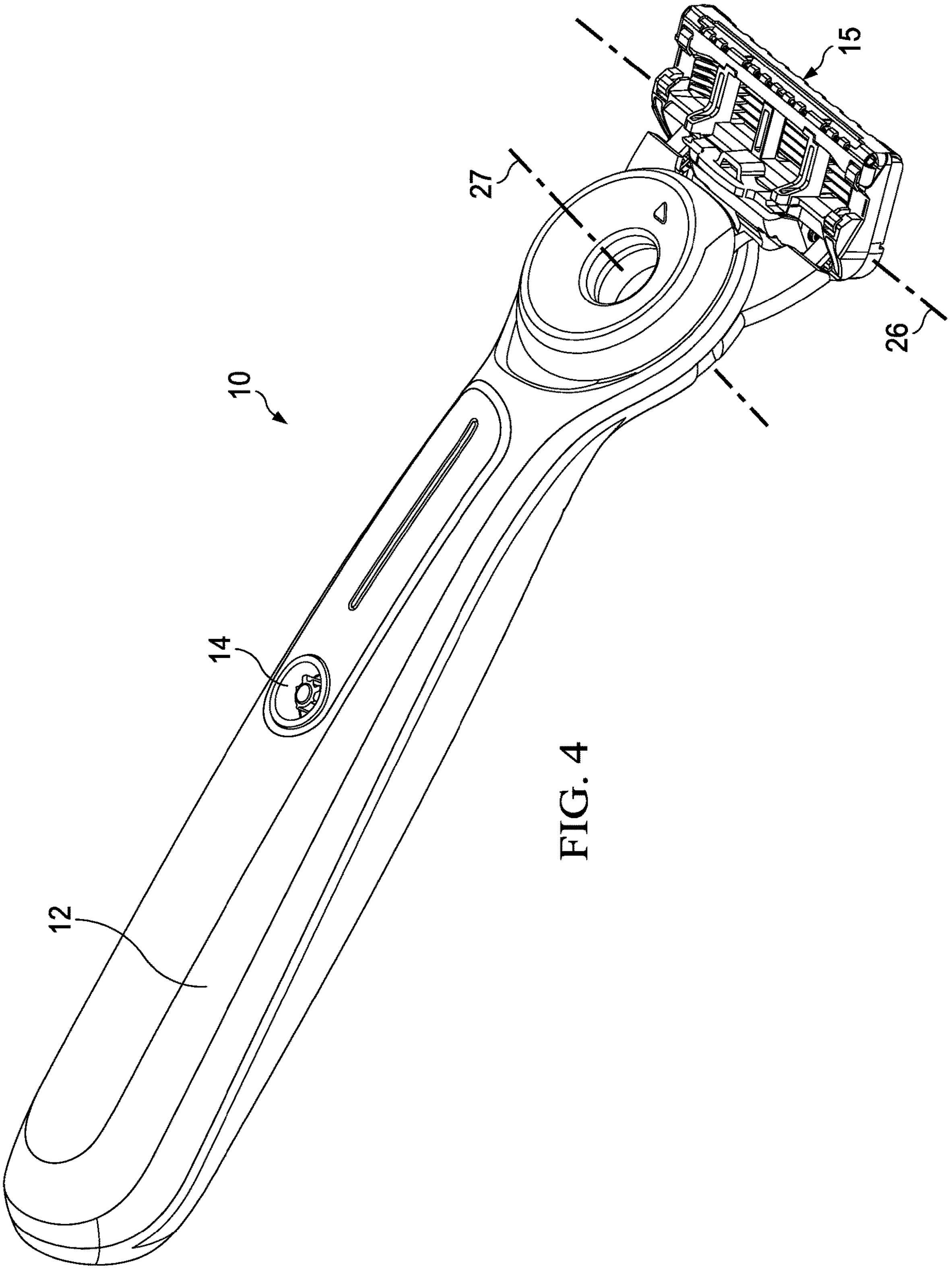
FIG. 4 is a schematic perspective view of a shaving razor in accordance with an embodiment of the invention.
Figure 5:
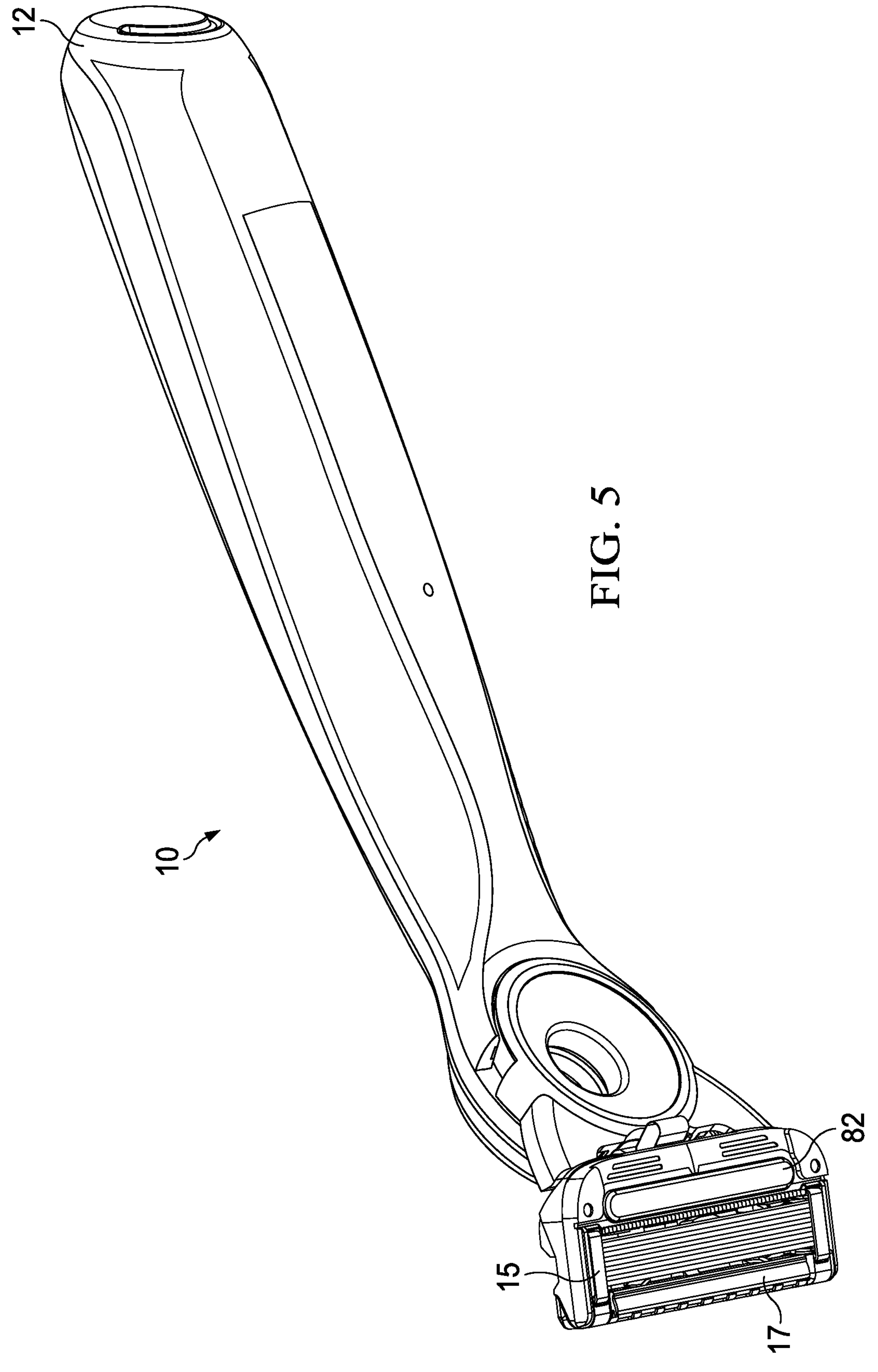
FIG. 5 is a schematic perspective view of the underside of the shaving razor of FIG. 4.
Figure 6:
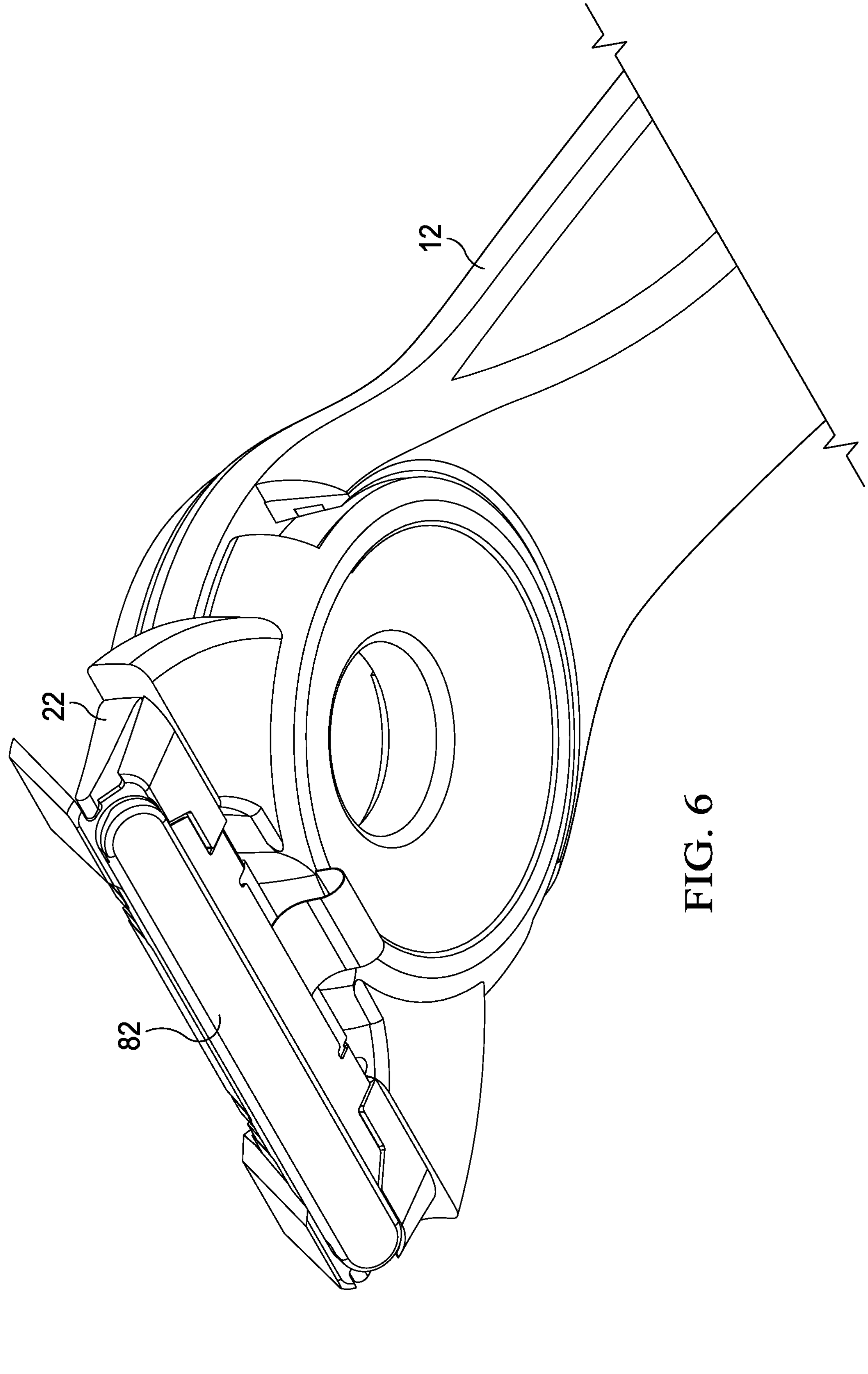
FIG. 6 is a schematic perspective view of a portion of the shaving razor of FIG. 5.

In like manner, FIG. 4 shows another embodiment of a shaving razor that can have a handle 12 and a blade cartridge unit 15 which can releasably attach to the handle 12 and can contain one or more blades 17. In the embodiment of FIG. 4, the pivoting head 22 can comprise a heat delivery element which can deliver a heat benefit to the skin or a heat skin benefit. As with the razor shown in FIG. 1, pivoting head 22 can pivot about the first axis of rotation 26 with respect to handle 12, as well as a secondary axis of rotation 27 that is generally perpendicular to the first axis of rotation 26. As shown in FIG. 5 which shows the underside of the razor depicted in FIG. 4, a portion of the handle 12 can extend through blade cartridge unit 15 and be exposed as heating surface 82, discussed more fully below. As shown in FIG. 5 and in more detail in FIG. 6 in which the blade cartridge unit 15 has been removed, heating surface 82 is a surface of a pivoting head 22 and can be heated to deliver a heat skin benefit during or after shaving. Heating can be achieved by pressing the skin benefit actuator 14, which can be a depressible button, and which closes a powered circuit inside handle 12 to a flexible circuit to the pivoting head 22, as described more fully below. The handle 12 may hold a power source, such as one or more batteries (not shown) that supply power to a heat delivery element, as discussed below. In certain embodiments, the heat delivery element may comprise a metal, such as aluminum or steel. The razor handle disclosed herein can include the heat delivery element disclosed co-owned, co-pending US Application, which is hereby incorporated herein by reference.

Figure 7:
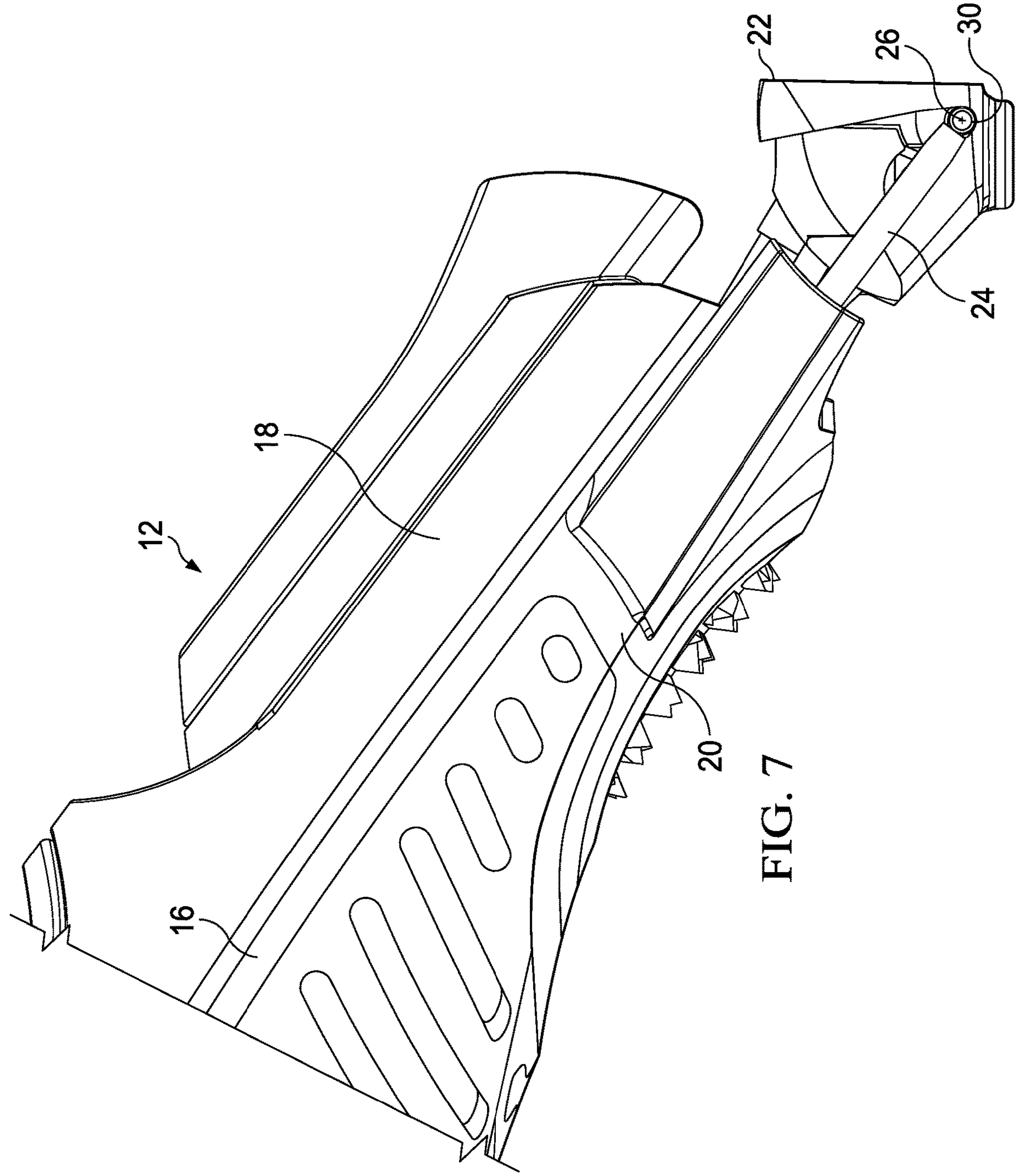
FIG. 7 is a schematic side view of a razor handle in accordance with an embodiment of the invention.

Referring now to FIG. 7, an embodiment of a handle for a razor providing a fluid skin benefit will be described in more detail. It should be noted that many of the components described in relation to the razor 10 providing a fluid skin benefit can also be incorporated into a razor 10 providing for heat skin benefit, particularly as they relate to the handle and pivoting head described herein, including the shape of the pivoting head, and the spring mechanism that urges the pivoting head into a rest position, and the limit members that limit the range of rotation of the pivoting head, all as described more fully below.

As shown in FIG. 7, the handle 12 can comprise a main body 16 that can include a main frame 18 and a secondary frame 20. The main body 16 including its component main frame 18 and secondary frame 20 members can comprise a durable material such as metal, cast metal, plastic, impact-resistant plastic, and composite materials. The main frame 18 can be made of metal and can provide a significant portion of the structural integrity of the handle. In an embodiment the main frame 18 is comprised of zinc. In an embodiment the main frame 18 is comprised of die cast zinc. The secondary frame 20 can be made of a plastic material and can overlie most of the main frame 18 and provide for a significant portion of the size and comfort of the handle 12.

Continuing to refer to FIG. 7, a pivoting head 22 can be connected to the main body 16 by one or more arms 24. Pivoting head 22 can pivot about the first axis of rotation 26 that is defined by the connection of the pivoting head 22 to pins 30 disposed at distal portions 58 of arms 24, as described more fully below. As discussed above, blade cartridge unit 15 attaches to the pivoting head 22 such that the blade cartridge unit 15 can pivot on handle 12 to provide more skin contact area on the skin of a user during shaving.

The pivoting head 22 can have a shape beneficially conducive to both attaching to the blade cartridge unit 15 and facilitating the delivery of a skin benefit from the handle 12 to and through the blade cartridge unit 15 attached to the handle 12.

Figure 8:
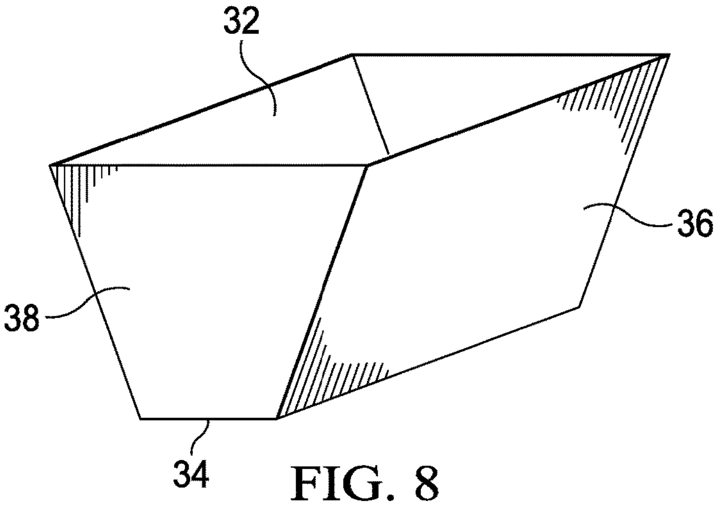
FIG. 8 is a schematic perspective representation of a trapezoidal prism shaped object.

The shape of the pivoting head 22 can alternatively be described as a "funnel," or as "tapered," or a "trapezoidal prism-shaped." As understood from the description herein, the description "trapezoidal prism" is general with respect to an overall visual impression the pivoting head. For example, a schematic representation of a trapezoidal prism-shaped element is shown in FIG. 8 and shows a shape having a relatively wide upper face (or opening) 32, a relatively narrow lower face 34, two long major faces 36, and two end faces 38 that are generally trapezoidal-shaped.

The description "trapezoidal prism" is used herein as the best description for the overall visual appearance of the pivoting head 22, but the description does not imply any particular geometric or dimensional requirements beyond what is described herein. That is, the pivoting head 22, including the cover member 40, need not have complete edges or surfaces. Further, edges need not be unbroken and straight, and sides need not be unbroken and flat.

Pivoting head 22 and the various parts as described herein can be made of thermoplastic resins, which can be injection molded. The thermoplastic resin can preferably be of a relatively high impact strength with a Charpy notched strength impact value higher than 2 $kJ/m^2$ (as measured by ISO 179/1). The thermoplastic resin can have a relatively high tensile modulus above 500 MPa as measured using ISO 527-2/1-A (1 mm/min).

In an embodiment, resins of the polyoxymethylene (POM, also known as acetal) can be utilized for the pivoting head parts, and copolymer forms can be more readily injection molded due to improved heat stability over homopolymer versions. Acetal copolymer with Charpy notched strength impact values higher than 6 $kJ/m^2$ (as measured by ISO 179/1), including with values equal to or greater than 13 $kJ/m^2$, and including values greater than 85 $kJ/m^2$ can be utilized. Further, it is contemplated that the thermoplastic material is relatively stiff having a tensile modulus above 900 MPa as measured using ISO 527-2/1-A (1 mm/min). Examples include HOSTAFORM® XT20 and HOSTAFORM® 59363.

Figure 9:
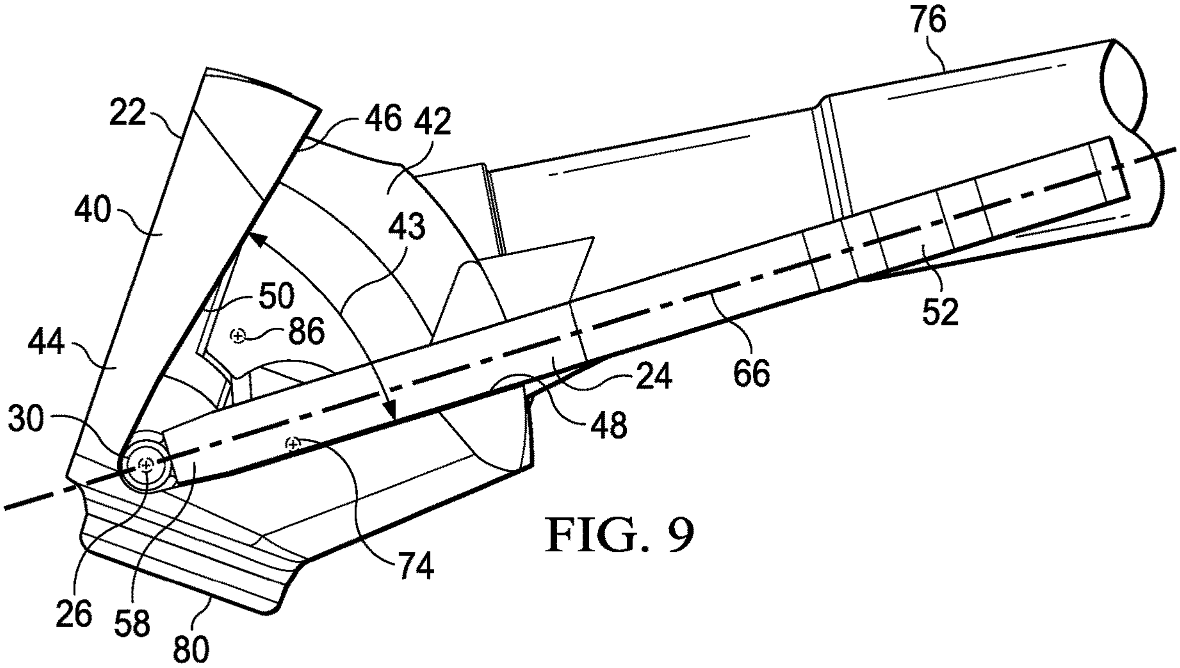
FIG. 9 is a schematic side view of a portion of a pivoting head in accordance with an embodiment of a handle of the invention.
Figure 10:
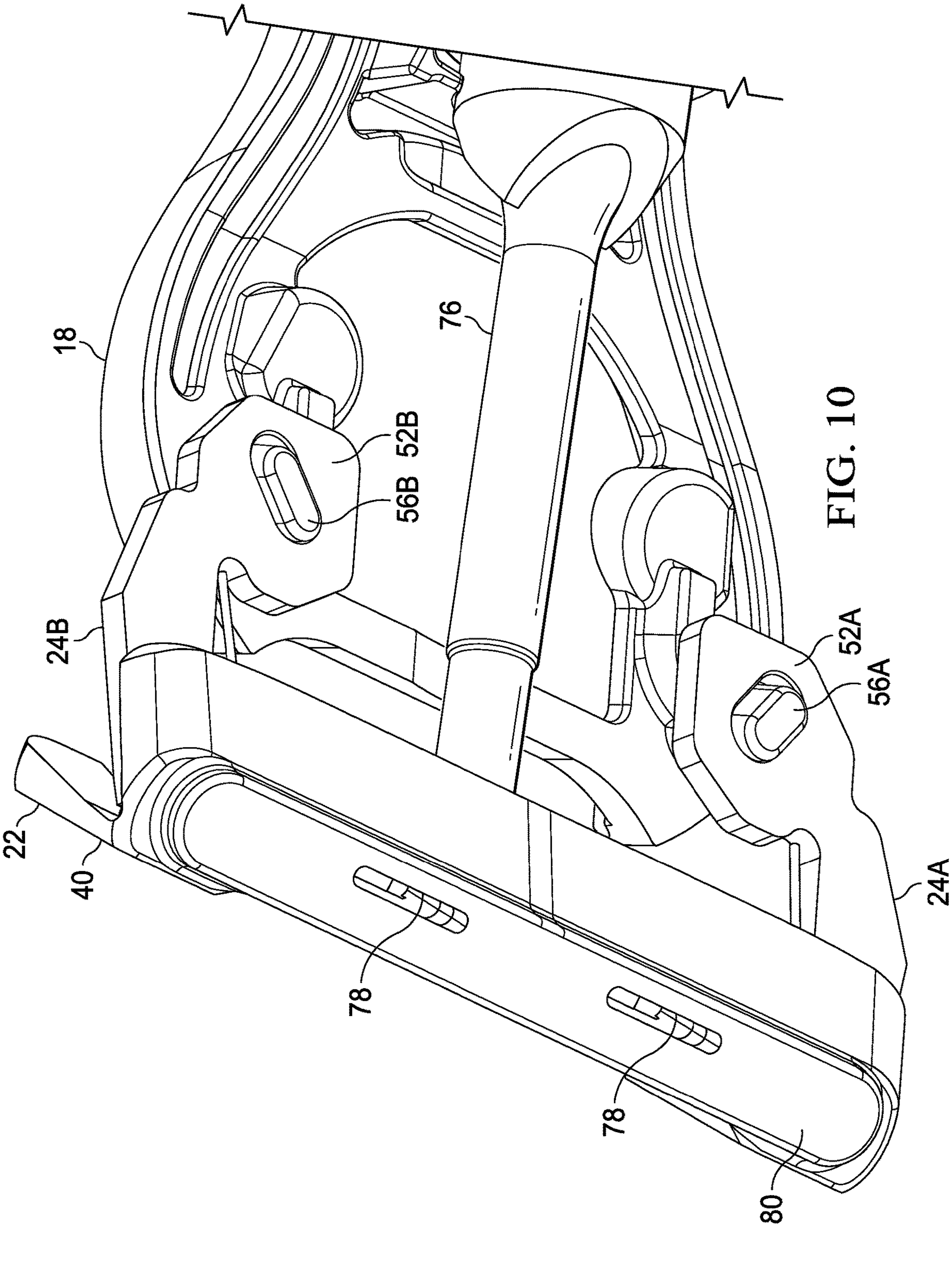
FIG. 10 is a schematic perspective view of a portion of a pivoting head in accordance with an embodiment of a handle of the invention.

Referring now to FIG. 9, embodiments of the disclosure in which a fluid skin benefit can be delivered via the pivoting head 22 are described. FIGS. 9-13 shows a pivoting head in side profile in which corresponding faces 32, 34, 36, and 38 of the trapezoidal prism shape in FIG. 8 are shown, the trapezoidal prism shape schematically representing the general shape impression of the pivoting head 22. FIG. 9 shows a portion of pivoting head 22 that includes a cover member 40, a base member 42 connected to cover member 40, and arms 24 connected handle 12 and to pivoting head 22 at pivot axis, i.e., first axis of rotation 26. A fluid skin benefit can be delivered via a benefit delivery member in the form of a fluid benefit delivery member 76 operatively coupled to base member 42 to permit fluid flow from the fluid delivery member into the pivoting head 22. Thus, fluid benefit delivery member 76 can include a flexible plastic benefit pivot delivery connection, such as a flexible silicone plastic tube, operatively coupled to a fluid reservoir in the handle 12 and to base member 42 such that upon depressing the skin benefit actuator 14 on handle 12, a fluid, including a lubricating lotion, can be transmitted from inside handle 12 through pivoting head 22, and out of openings 78 on face 80 as shown in FIG. 10.

The materials chosen for fluid benefit delivery member 76 can have good chemical resistance to a variety of chemicals found in a consumer environment for durability along with a low modulus of elasticity for providing low resistance to angular deflection about a pivot.

In an embodiment, the materials for fluid benefit delivery member 76 can include thermoplastic elastomers (TPE). The TPE materials can include styrenic block copolymers, including, for example, Poly(styrene-block-ethylenebutylene-block-styrene) (SEBS), Poly(styrene-block-butadiene-block-styrene) (SBS), or Poly(styrene-block-isoprene-block-styrene) (SIS).

In an embodiment, the materials for fluid benefit delivery member 76 can include thermoplastic vulcanized (TPV) systems. In an embodiment the fluid delivery member can be injection molded as an overmold, e.g., in a two-shot injection molding operation, on base member 42 which can be a different material, including a relatively harder plastic. However, fluid benefit delivery member 76 can also be formed separately and joined to base member 42. Suitable TPV systems can include TPV systems based on polypropylene (PP) and ethylene propylene diene terpolymer (EPDM), TPV systems based on polypropylene and nitrile rubber, TPV systems based on polypropylene and butyl rubber, TPV systems based on polypropylene and halogenated butyl rubber, TPV systems based on polypropylene and natural rubber, or TPV systems based on polyurethane and silicone rubber. A TPV system based on polypropylene can have the greater chemical resistance against chemicals commonly used in shaving applications.

In an embodiment, materials for the fluid benefit delivery member 76 can include creep resistant materials having an increase in tensile strain of less than about 3% from an initial tensile strain when measured using ISO 89901 carried out at 1000 hours at 73 Fahrenheit.

In an embodiment, materials for the fluid benefit delivery member 76 can include materials having a hardness of about 10 on a Shore A durometer scale and about 60 on a Shore A durometer scale. The materials for any benefit delivery member, such as the fluid benefit delivery member 76 or heat delivery member 96 can be below 60A, including values below 50A.

In an embodiment, materials for the fluid benefit delivery member 76 can include elastomers having compression sets less than about 25% as measured by ASTM D-395.

In an embodiment, benefit delivery member has a moment of inertia from about 6 $mm^4$ to about 40 $mm^4$.

Other materials suitable for fluid benefit delivery member 76 can include thermoplastic polyurethane (TPU), melt processable rubber (MPR), plasticized polyvinyl chloride (PVC), olefinic block copolymers (OBC), ionomers, and thermoplastic elastomers based on styrenic block copolymers.

One or both ends 44 (corresponding to the end faces 38 of the schematic shape shown in FIG. 8) of the pivoting head 22 can have a limit member 46 that limits the extent of rotation of pivoting head 22 about first axis of rotation 26. In an embodiment, limit members 46 limit rotation by providing a surface of the pivoting head 22 that can come into contact with arms 24 to stop rotation. For example, in an embodiment, the limit members can include first and second surfaces 48, 50 that can come into contacting relationship with arms 24 to stop rotation of the pivoting head about first axis of rotation 26. In an embodiment, surfaces 48, 50 can be diverging surfaces that diverge relative to each other from a closest position near the pivoting axis 26 a distance substantially the extent of the portion of pivoting head 22 corresponding to the short dimension of the major faces 36 of the trapezoidal prism shape. As can be understood from FIG. 9, the first diverging surface 48 can limit movement of the pivoting head to a first position and the second diverging surface 50 can limit the movement of the pivoting head to a second position. Pivoting of the pivoting head 22 is thus limited by the interaction of the diverging surfaces and the arms 24. First and second diverging surfaces 48, 50, can be flat, partially flat, or have non-flat portions, with the only requirement being that a portion of the diverging surfaces contact arm 24 to limit rotation as desired. As shown in FIG. 9, for example, first diverging surface 48 of limit member 46 can be substantially flat and can be disposed in contacting relationship adjacent arm 24 to limit the pivoting head 22 from further pivoting in a counter-clockwise direction (as viewed in FIG. 9).

As can be understood from the description herein, the included angle 43 between the diverging surfaces (e.g., an angle of divergence) for the angularly diverging surfaces 48 and 50 can determine the angular rotation of pivoting head 22 about first axis of rotation 26. In an embodiment, the angle of divergence for the angularly diverging surfaces 48 and 50 can be up to 50 degrees or more. As can be understood, therefore, in an embodiment, pivoting head 22 can rotate from a first position at 0 degrees to a second position at about 50 degrees relative to the first position, and any position therebetween. At all positions a spring member 64 can apply a biasing force at a location corresponding to a main bar portion axis 86, as described more fully below, to urge pivoting head 22 toward the first, at rest, position. The position shown in FIG. 9, can be considered a rest position, as this is the position of the pivoting head 22 when no biasing force is applied against spring member 64 (shown in FIG. 13) to rotate the pivoting head clockwise (as viewed in FIG. 9). The rest position of the pivoting head can be at any angle within the included angle 43.

Referring to FIG. 10, pivoting head 22 is shown connected to the main frame 18 of the main body 16 by arms 24, referred to individually as first arm 24A and second arm 24B. The nomenclature of "A" and "B" is used herein to denote individual pairs of elements. Fluid benefit delivery member 76 extends from main body 16 and connects to base member 42, which is joined to cover member 40 to provide for controlled fluid transport from a reservoir inside handle 12 to one or more openings 78 on the face 80 of pivoting head 22. As discussed above, face 80 can extend through an opening on an attached blade cartridge unit 15 such that face 80 can be disposed very near, or even on, the skin of a user when razor 10 is used for shaving. Fluid flow can be provided, for example, by pressure applied to a flexible fluid reservoir inside handle 12. Pressure can be applied, for example, by the user pressing on a skin benefit actuator 14 on handle 12.

Figure 11:
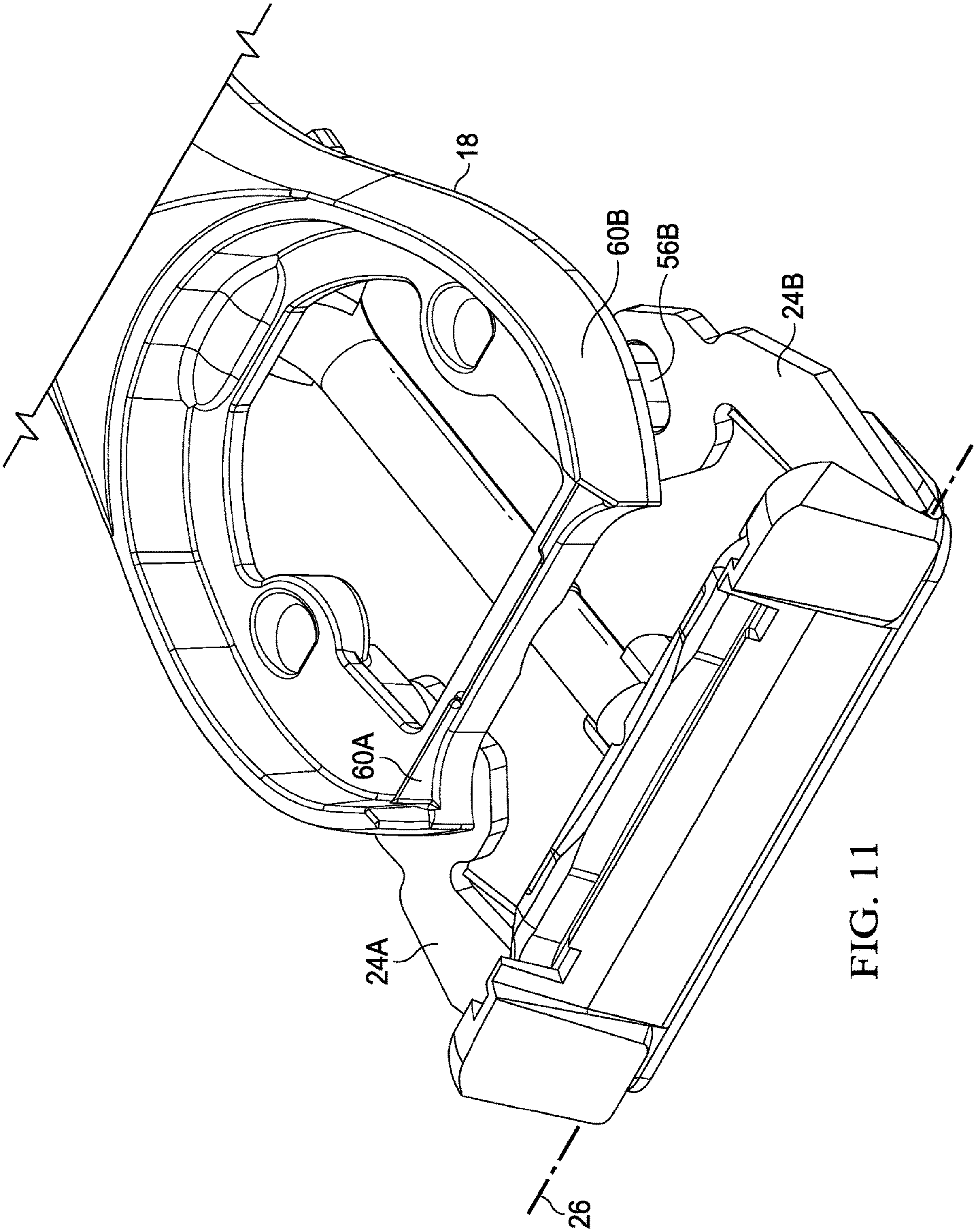
FIG. 11 is a schematic perspective view of a portion of a pivoting head in accordance with an embodiment of a handle of the invention.
Figure 12:
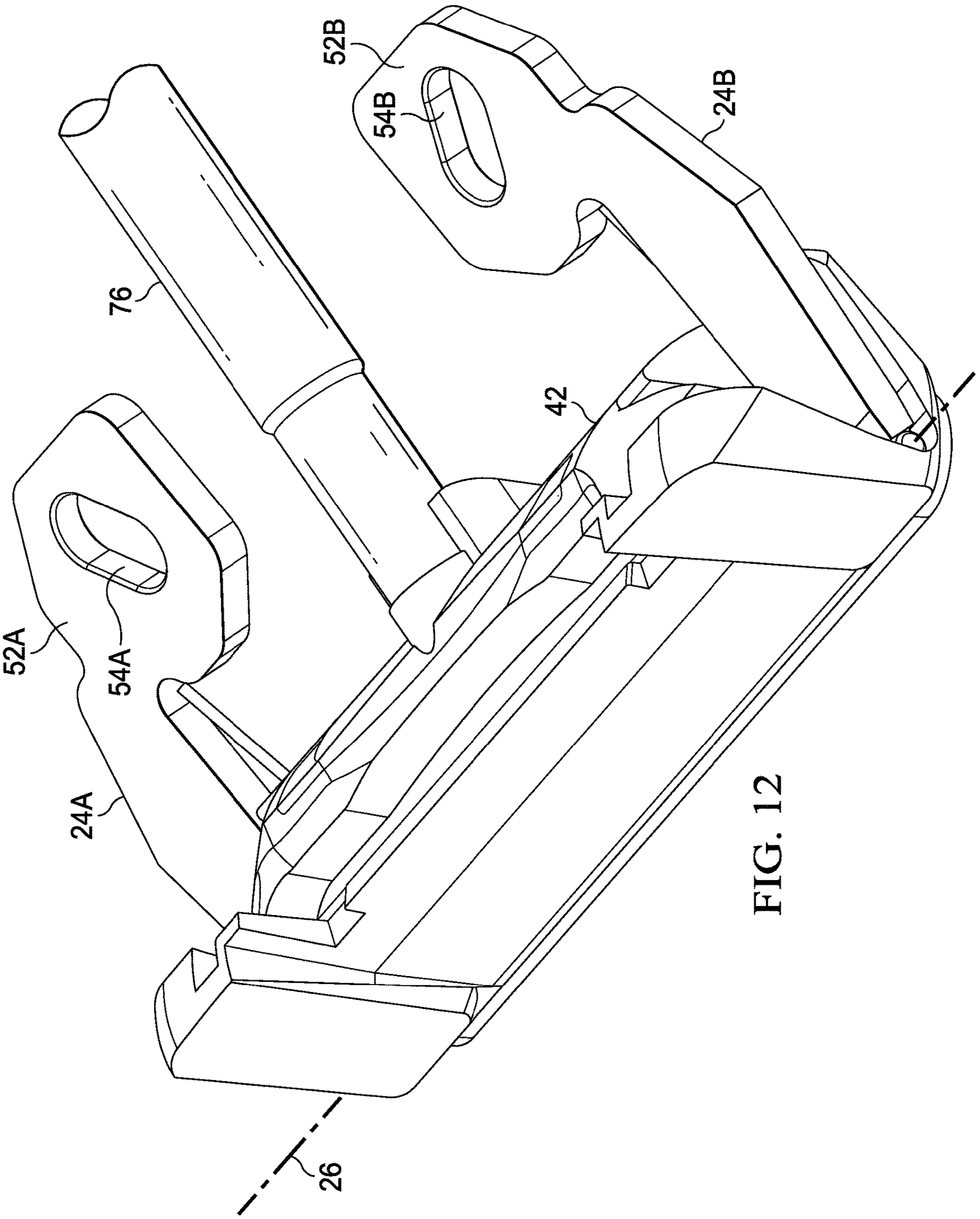
FIG. 12 is a schematic perspective view of a portion of a pivoting head in accordance with an embodiment of a handle of the invention.

As shown in FIGS. 10 and 11, in an embodiment, a proximal portion 52 of arms 24 can be connected to the main frame 18 at a mounting location 60. Arms 24 can be made of metal and the main frame can be made of metal such that a relatively strong connection can be facilitated by the fixation of metal arms on a metal main frame. Proximal portion 52 of arm 24 can define an opening 54 (shown in more detail in FIG. 12) in arm 24 which can engage a protuberance 56 on main frame 18 for connection to main body 16 of handle 12. Arms 24 likewise have a distal portion 58 which can engage a bearing recess 62 in pivoting head 22 (described more fully below) for connecting the pivoting head 22 to the main body 16 of handle 12. Thus, as shown in FIGS. 11 and 12, in an embodiment, a first arm 24A can have a first proximal portion 52A that can define an opening 54A that can connect to a first protuberance 56A at a first location 60A on main frame 18, and a second arm 24B can have a second proximal portion 52B that can define an opening 54B that can connect to a second protuberance 56B at a second location 60B on main frame 18. Likewise, a first arm 24A can have a first distal portion 58A that can connect to a first bearing recess in pivoting head 22, and a second arm 24B can have a second distal portion 58B that can connect to a second bearing recess in pivoting head 22.

Figure 13:
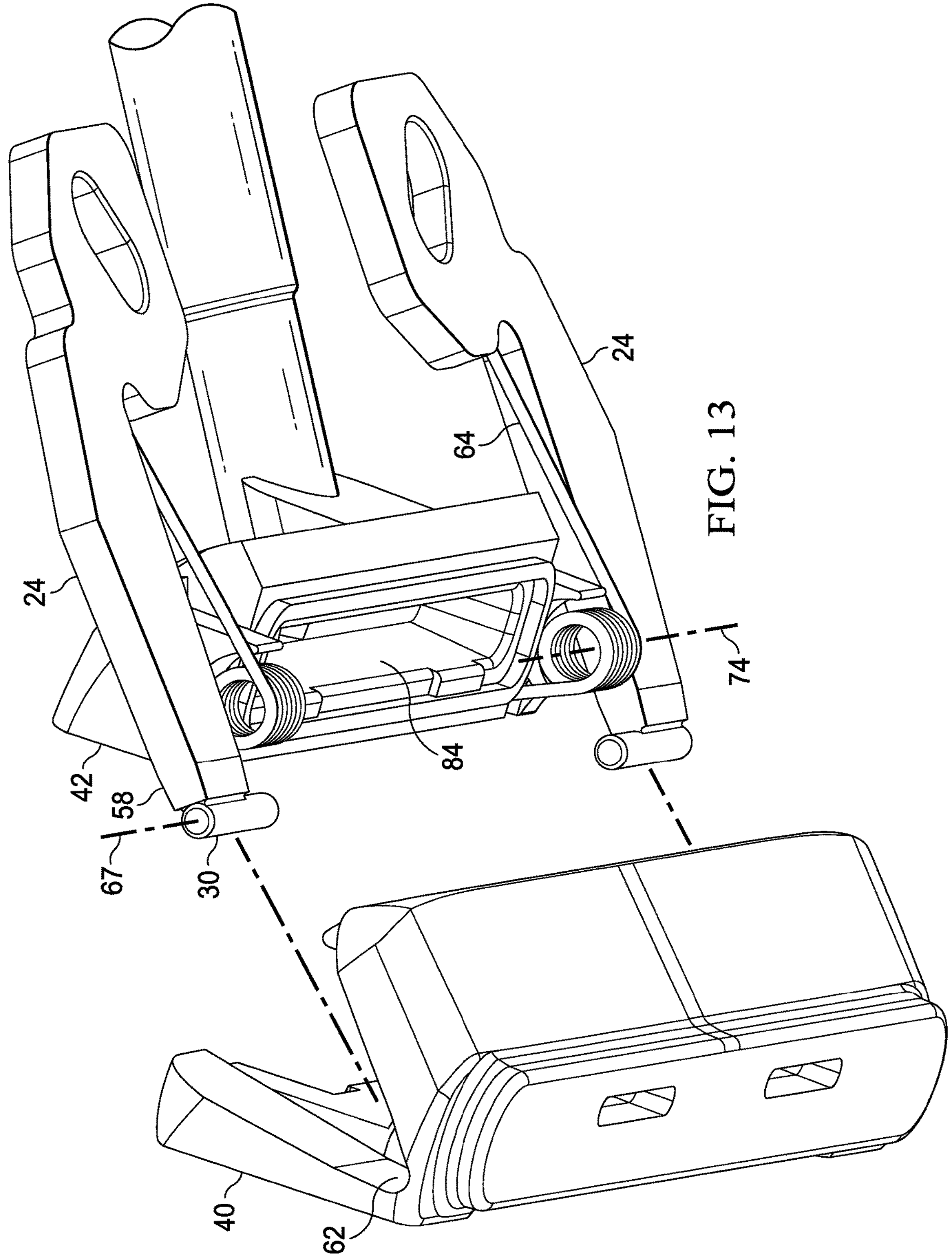
FIG. 13 is a schematic perspective view of a portion of a pivoting head in accordance with an embodiment of a handle of the invention.

Referring now to FIG. 13, certain components of an embodiment of the pivoting head 22 are shown in more detail. Pivoting head 22 can have mating portions that when connected together form a spring-loaded compartment 84 therebetween, the compartment facilitating the delivery of a skin benefit to a user during shaving. For example, as discussed above, pivoting head 22 can have a cover member 40, a base member 42 connected to cover member 40, and arms 24 connecting the pivoting head 22 to main body 16.

Figure 14:
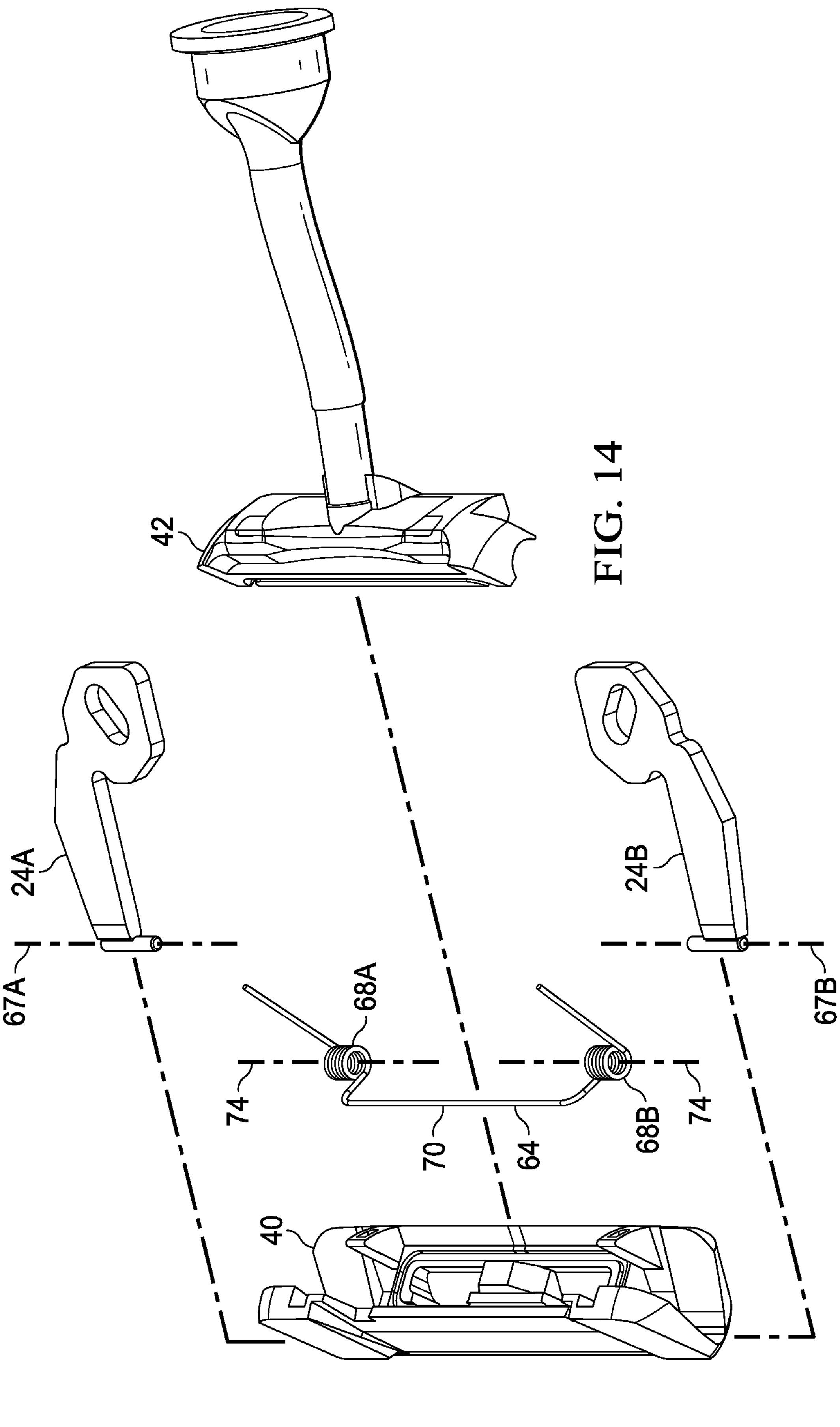
FIG. 14 is a schematic perspective assembly view a portion of a pivoting head in accordance with an embodiment of a handle of the invention.
Figure 15A:
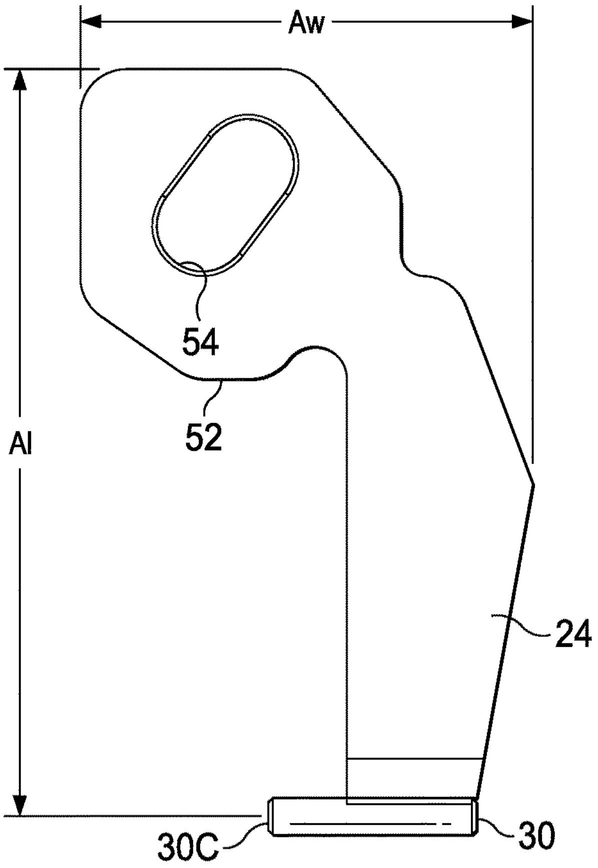
FIG. 15A-C is a schematic representation of an embodiment of an arm.
Figure 15B:
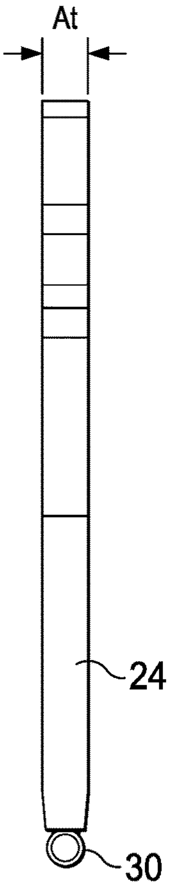
Figure 15C:
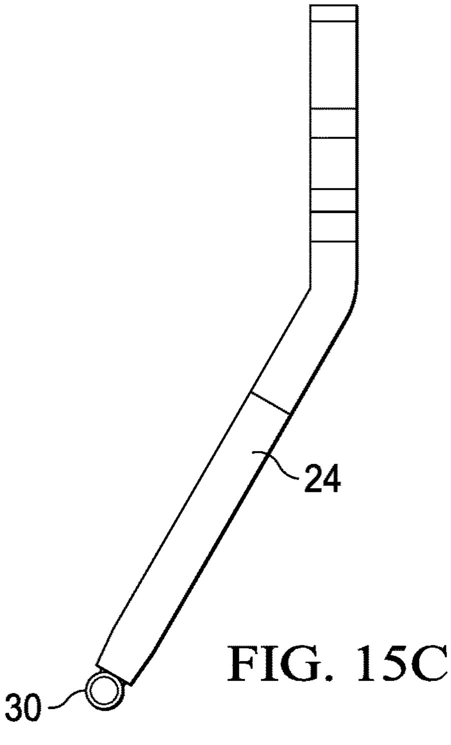

As shown in FIGS. 13 and 14, which show assembly views of certain components of one embodiment of a pivoting head 22 from different angles, arms 24 can have pins 30 disposed at distal portions 58 thereof. In an embodiment, cylindrical pins 30 can be welded to distal portions 58 of arms 24. Each pin 30 can be operatively disposed in a bearing recess 62 on pivoting head 22. The bearing recess 62 can be a cylindrical opening on cover member 40 having an inside diameter slightly greater than the outside diameter of pins 30, such that cover member 40, and therefore pivoting head 22, can freely pivot upon the first axis of rotation 26. A spring member 64 is partially disposed between the mating faces of the cover member 40 and base member 42 and acts to bias the pivoting head 22 in relation to arms 24 into the first position as shown in FIG. 4, in which first diverging surface 48 of limit member 46 rests in contacting relationship with arm 24.

Spring member 64 can be any spring member facilitating biasing of the pivoting head to the first rest position. Spring member can be, for example, any of torsion coil springs, coil spring, leaf spring, helical compression spring, and disc spring. In the illustrated embodiment, spring member 64 comprises torsion springs, and can have at least one coil spring 68. In an embodiment, two coil springs 68A and 68B are coupled together in a spaced relationship by a main bar portion 70 as shown in FIG. 14. In an embodiment, coil springs 68 can each define a longitudinal coil axis 74. In an embodiment, the axis of rotation, which can be called a pivot axis or a first pivot axis, can be parallel to and offset from one of the longitudinal coil axes.

Additionally, spring member 64 can be can be made of plastic, impact-resistant plastic, metal, and composite materials. In an embodiment, the spring member 64 can be made from materials that are resistant to stress relaxation such as metal, polyetheretherketone, and some grades of silicone rubber. Such an embodiment of spring member 64, comprised of stress relaxation resistant materials, can prevent the pivot head from undesirably taking a "set," a permanent deformation of the spring member that prevents the pivot head from returning to its rest position when unloaded. In an embodiment, spring member 64 can be made of 200 Series or 300 Series stainless steel at spring temper per ASTM A313. In an embodiment, spring member 64 can be comprised of stainless steel wire (e.g., 302 stainless steel wire) having an ultimate tensile strength metal greater than 1800 MPa or an engineering yield stress between about 800 MPa and about 2000 MPa.

First arm 24A and second arm 24B can each be generally flat members having generally parallel planar opposite sides. Arms 24 can define an imaginary plane 66, as shown in FIG. 9, and the imaginary plane 66A of arm 24A can be coplanar with the imaginary plane 66B of arm 24B. Pins 30 can each have an imaginary longitudinal pin axis 67 disposed centrally in relation to each pin, and imaginary longitudinal pin axis 67A of pin 30A on arm 24A can be coaxial with longitudinal pin axis 67B of pin 30B on arm 24B, as indicated in FIG. 14.

Arms 24 can have various shapes and features beneficially adapted to the pivoting head 22. Additionally, arms can be made of plastic, impact-resistant plastic, metal, and composite materials. In an embodiment, arms 24 can be comprised of metal. Arms 24 and can be made of a 200 or 300 Series stainless steel having an engineering yield stress measured by ASTM standard E8 greater than about 200 MPa, and preferably greater than 500 MPa and a tensile strength again measured by ASTM standard E8 greater than 1000 MPa.

As shown in FIGS. 15-20, arms 24 can be sized and shaped appropriately to the size of the pivoting head 22 and handle 12 to which pivoting head 22 is attached. In example embodiments shown in FIGS. 15 and 16, arm 24 can be considered in plan view having an arm length, Al, of from about 10 mm to about 25 mm, and can be about 17 mm. In an embodiment arm 24 can have an arm width, Aw, of from about 5 mm to about 20 mm, and can be about 10 mm. In the embodiments shown in FIGS. 15 and 16, arm 24 can be a substantially uniform thickness plate having an arm thickness, At, of from about 0.5 mm to about 4 mm, and can be about 1 mm. In an embodiment, arm 24 can be substantially flat in side profile, as shown in FIGS. 15A and 15B. In an embodiment, arm 24 can have at least one bend as shown in side profile in FIGS. 15B and 15C. As shown, a pin 30 can be integral with arm 24, or attached, such as by welding, to arm 24 such that a portion 30C of pin 30 extends laterally to engage the bearing recess 62 of the pivoting head 22. Pin 30 can be a circular cross section cylindrical shape having a length of from about 2 mm to about 15 mm and can be about 4 mm. Pin 30 can have a largest cross-sectional dimension, such as a diameter, of from about 0.6 mm to about 2.5 mm, and can be about 1.0 mm. Perimeter of holes in arm can be from about 5 mm to about 25 mm and can be about 10 mm. To ensure product integrity during accidental drops and to prevent excessive deflection during use, along the length of the arm, the arms have a minimum cross-sectional moment of inertia multiplied by the elastic modulus of the arm material greater than 65 N-cm$^2$. In an embodiment, this minimum cross-sectional moment of inertia multiplied by the elastic modulus of the arm material can be about 400 N-cm$^2$ to about 20000 N-cm$^2$.

Figure 16A:
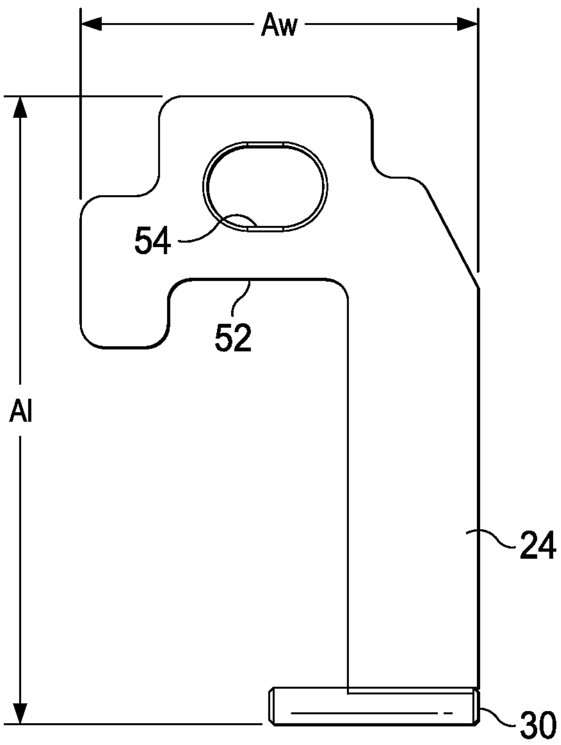
FIG. 16A-C is a schematic representation of an embodiment of an arm.
Figure 16B:
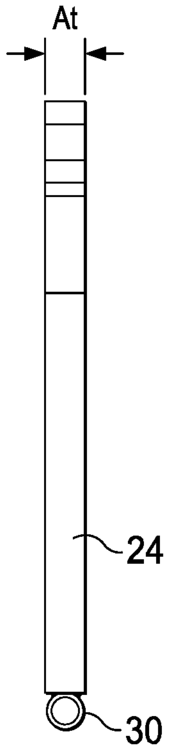
Figure 16C:
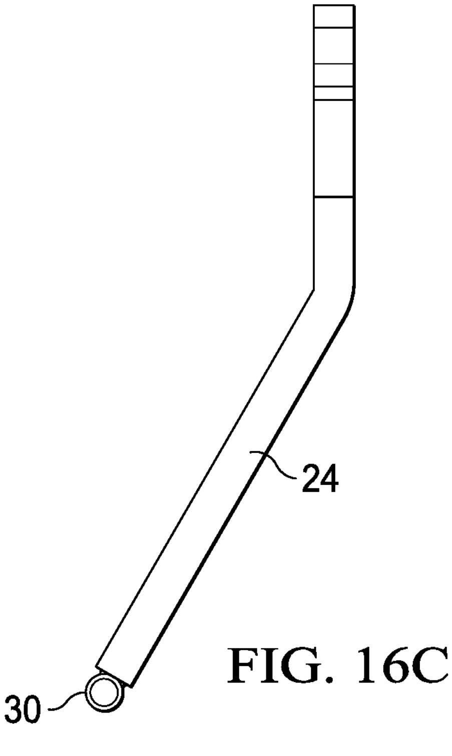
Figure 17A:
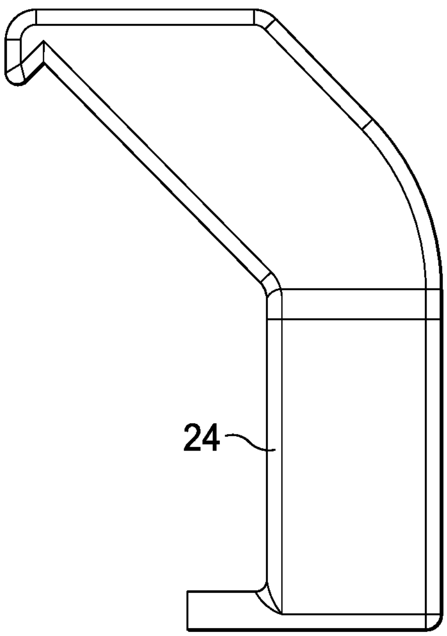
FIG. 17A-B is a schematic representation of an embodiment of an arm.
Figure 17B:
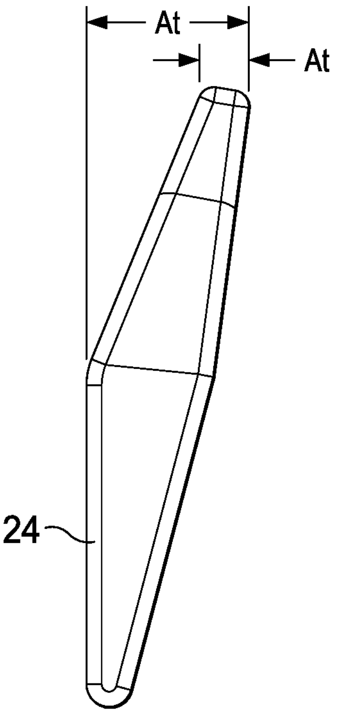

As shown in FIGS. 15 and 16, arm 24 can have portions at a proximal portion 52 defining an opening 54. Openings can be used to engage and attach arms 24 to the main body 16. For example, arm 24 shown in FIG. 15 corresponds to arm 24 shown in FIGS. 10 and 11, in which opening 54 engages a protuberance 56 on main frame 18 of main body 16.

Figure 18:
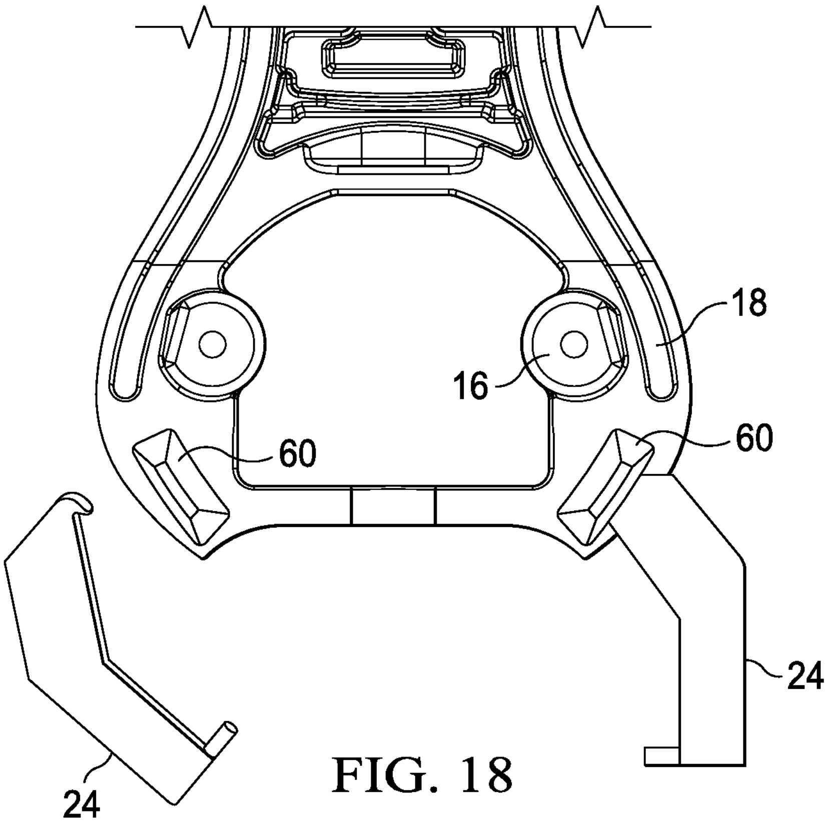
FIG. 18 is a schematic representation of an embodiment of arms mounting to a handle in accordance with an embodiment of the invention.
Figure 19A:
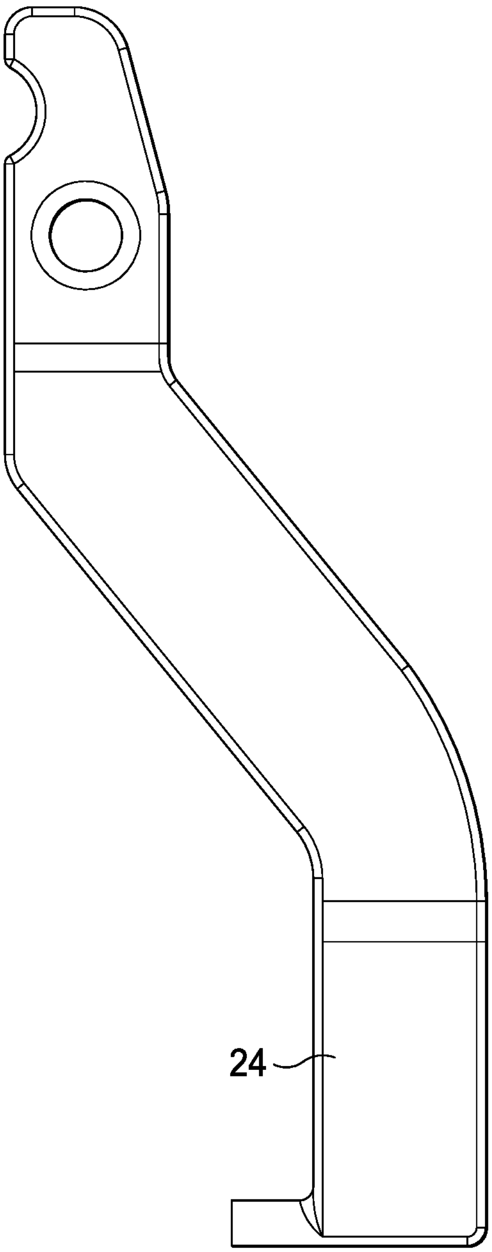
FIG. 19A-B is a schematic representation of an embodiment of an arm.
Figure 19B:
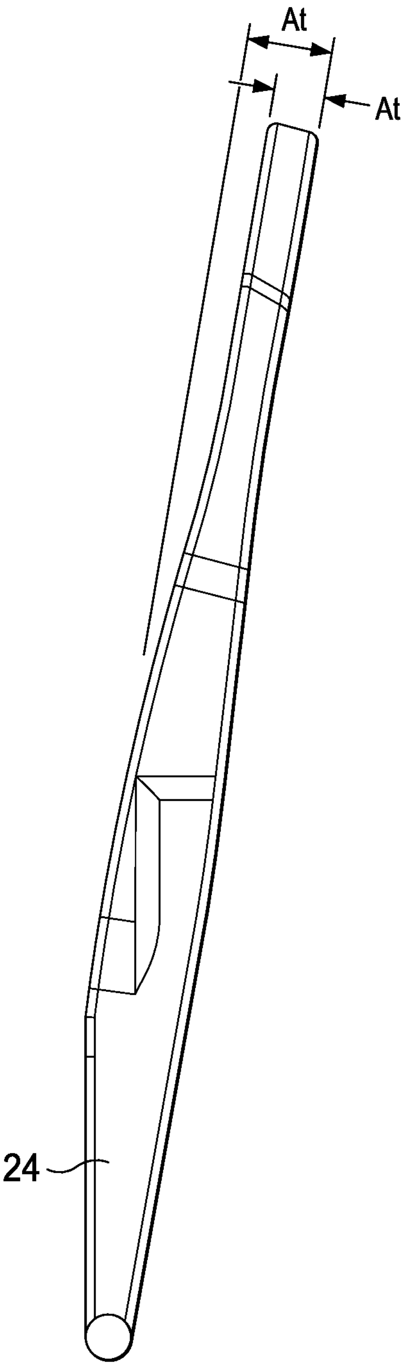
Figure 20:
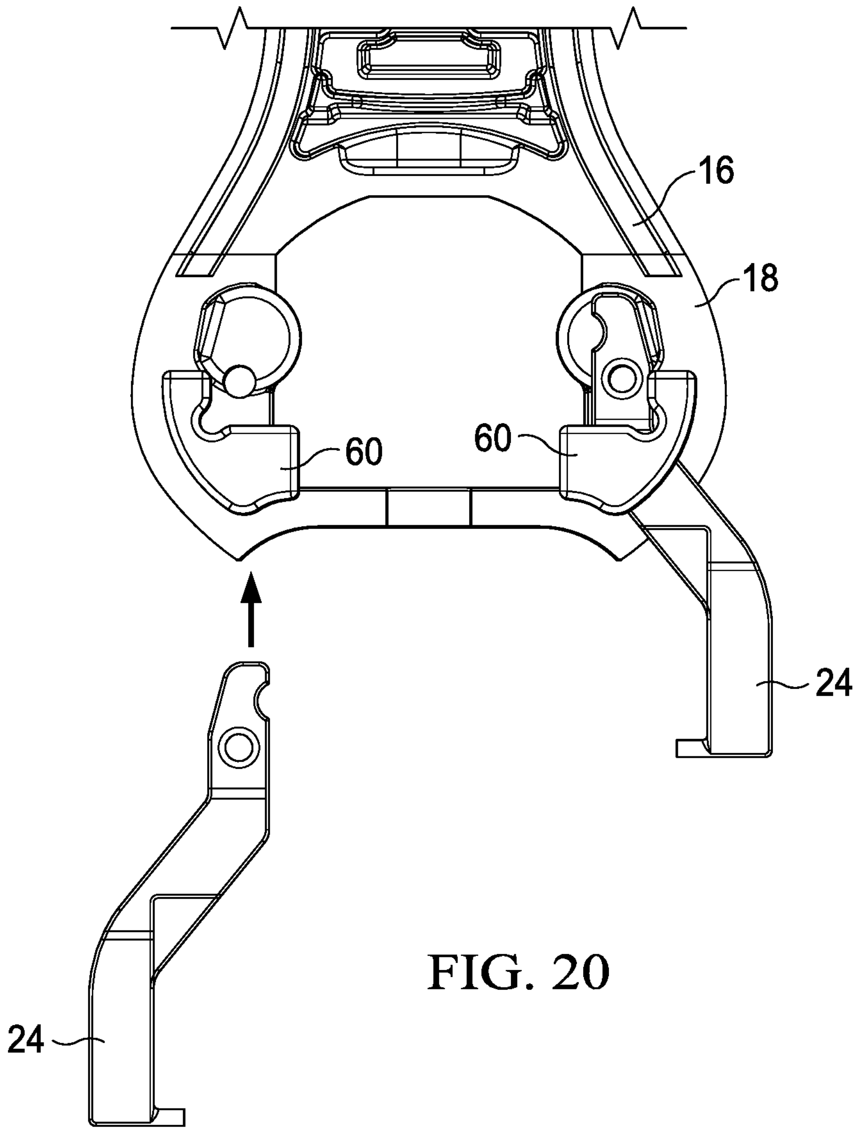
FIG. 20 is a schematic representation of an embodiment of arms mounting to a handle in accordance with an embodiment of the invention.

FIGS. 17-20 show alternative embodiments of arms 24. As shown in FIGS. 17B and 19B, arms 24 can have a variable thickness At, and can have a thicker portion generally central to arm 24 and thinner portions near the ends of arm 24. Such a configuration can permit optimization of strength and weight of arms 24. FIGS. 18 and 20 show alternative connection embodiments in which a hook member on the proximal portion 52 of arm 24 can engage a mating portion of main body 16.

Pivoting head 22 can be rotated about first axis of rotation 26 by a biasing force applied to the pivoting head to rotate the pivoting head 22 about the first axis of rotation 26 to a second position such that second diverging surface 50 rests in contacting relationship with arm 24. Upon removal of the biasing force, spring member 64 can act to rotate pivoting head back to the first position. In an embodiment, pivoting head 22 can be rotated about the first axis of rotation 26, which can be considered a first pivot axis, from the first position through an angle of rotation of between about 0 degrees and about 50 degrees and when rotated the pivot spring applies a biasing torque about the first axis of rotation 26 of less than about 30 N-mm at an angle of rotation of about 50 degrees. In an embodiment, pivoting head 22 can be rotated about the first axis of rotation 26, which can be considered a first pivot axis, from the first position through an angle of rotation of between about 0 degrees and about 50 degrees and when rotated the pivot spring applies a biasing torque about the first axis of rotation 26 of between about 2 N-mm and about 12 N-mm.

In an embodiment in which a fluid benefit delivery member 76 is coupled to the base member 42 of pivoting head 22, the fluid benefit delivery member 76 being flexibly coupled can provide a portion of the restorative, biasing torque as well. For example, in an embodiment the fluid delivery member can contribute about 30% of the restorative, biasing torque about the first axis of rotation 26. In an embodiment, the restorative, biasing torque about the first axis of rotation 26 can be about less than about 10 N-mm and can be about 6 N-mm with about 4.5 N-mm contributed by spring member 64 and about 1.5 N-mm contributed by the fluid benefit delivery member 76. As discussed below, the pivoting torque supplied by the spring member can be considered a first pivoting torque. The pivoting torque supplied by the benefit delivery member, including a fluid benefit delivery member 76 or a heat delivery member 96 can be considered a second pivoting torque. The benefit delivery member can be severable, that is, cut, removed, or otherwise uncoupled from its ability to supply a pivoting torque to the pivoting head. To supply a razor having sufficient torque to permit comfortable shaving, a ratio of the sum of said first and second pivoting torques divided by said angular deflection in radians to said second pivoting torque divided by said angular deflection in radians of said pivoting head with said pivot benefit delivery connection severed is greater than 2 and can be greater than 4. Torque can be measured according to the Static Torque Stiffness Method described below in the Test Methods section.

Figure 21:
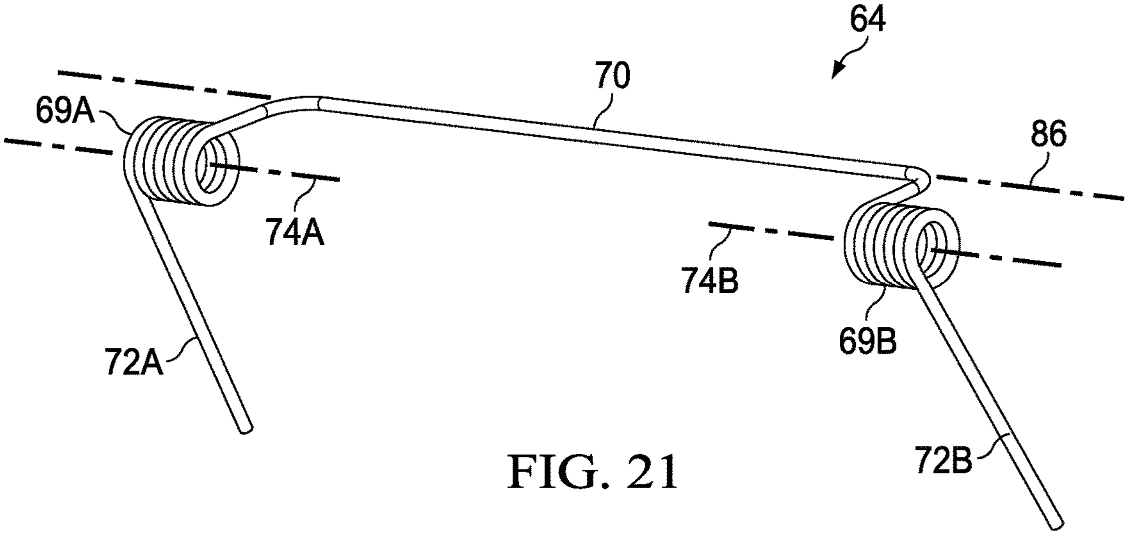
FIG. 21 is a schematic perspective view of an embodiment of a pivot spring in accordance with an embodiment of the invention.

As shown in FIG. 21, spring member 64 can be a torsion spring and can include a first coil spring 69A and a second coil spring 69B coupled by a main bar portion 70. A leg extension 72 can extend from each coil spring 69 a sufficient length to operatively engage arms 24 to provide the biasing force necessary to cause pivoting head 22 to be urged toward the first, rest, position. When the pivoting head is biased to rotate about the first axis of rotation 26 away from the first, rest, position, spring member 64 applies a resisting, restorative force to urge the pivoting head back to the first position. Coil springs 69A and 69B can each define a longitudinal coil axis 74. Longitudinal coil axis 74A of first coil spring 68A can be coaxial with longitudinal coil axis 74B of second coil axis 68B. One or both of longitudinal axes 74 can be substantially parallel to and offset from the first axis of rotation 26, which can be referred to as a pivot axis. Spring member 64 can be made of metal, including steel, and can be stainless steel having an engineering yield stress greater than about 600 MPa. In the illustrated embodiments, coil springs 69 are operatively disposed on each end of pivoting head 22 and a portion of the main bar portion 70 resides between the cover member 40 and base member 42 to provide direct engagement to bias the pivoting head toward a rest position. In the illustrated embodiments it can be understood that there are certain relationships defined between the first axis of rotation 26, the longitudinal coil axes 74, and the main bar portion axis 86. Specifically, as depicted in FIG. 9, the first axis of rotation 26 can be parallel to and offset from both of the longitudinal coil axes 74A, 74B, and can, as well, be parallel to and offset from the main bar portion axis 86. In an embodiment, the first axis of rotation 26 can be parallel to and offset from both of the longitudinal coil axes 74A, 74B a distance of from about 1 mm to about 5 mm. In an embodiment, the first axis of rotation 26 can be parallel to and offset from both of the longitudinal coil axes 74A, 74B a distance of about 2 mm.

In an embodiment, spring member can be made of materials including amorphous polymers with glass transition temperatures above 80 Celsius, metals, elastomers having compression sets less than 25% as measured by ASTM D-395 and combinations thereof.

In an embodiment, spring member comprises creep resistant materials having an increase in tensile strain of less than about 3% from an initial tensile strain when measured using ISO 89901 carried out at 1000 hours at 73 Fahrenheit.

Figure 22:
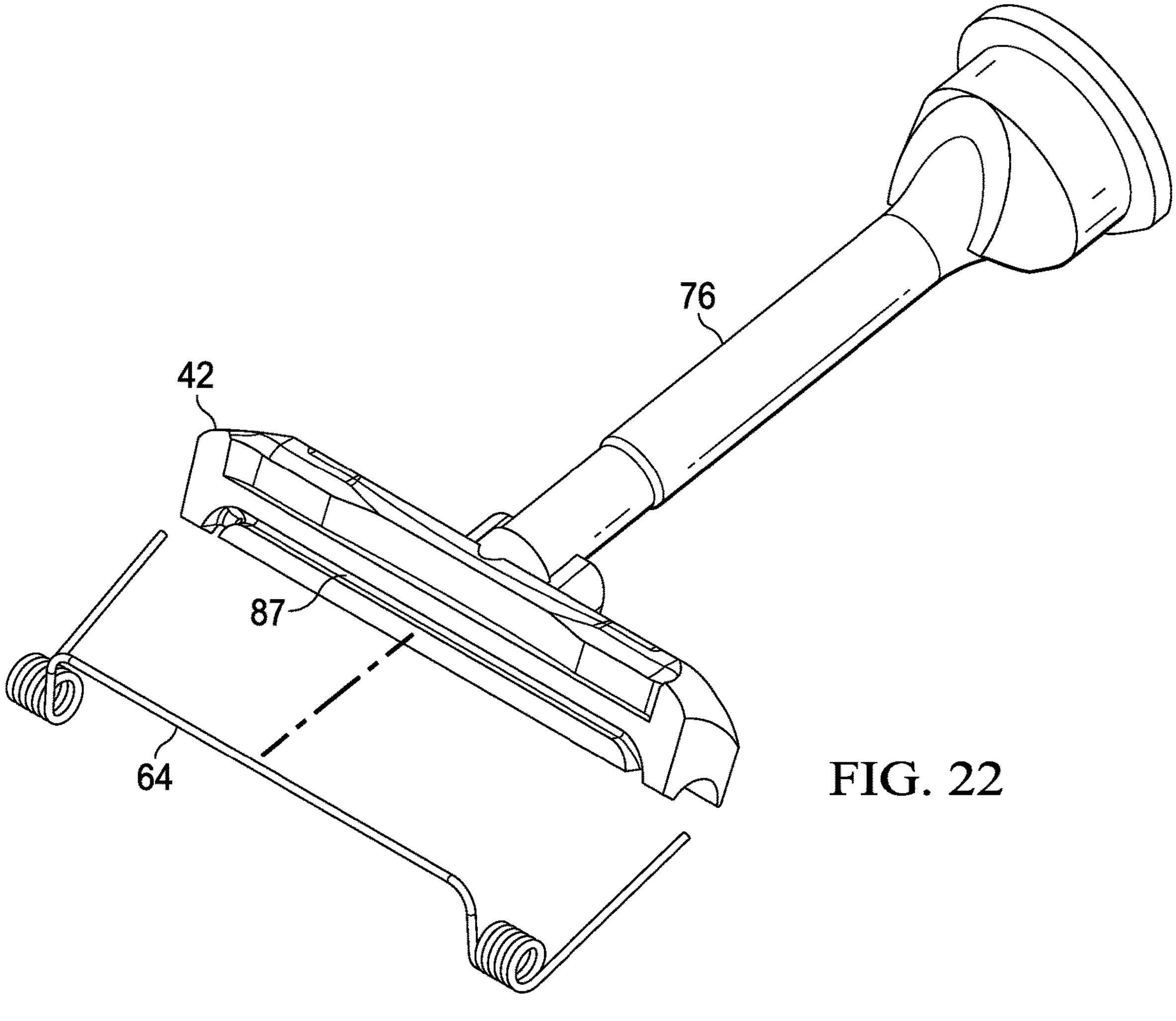
FIG. 22 is a schematic perspective view of an embodiment of a pivot spring and a portion of a pivoting head in accordance with an embodiment of the invention.
Figure 23:
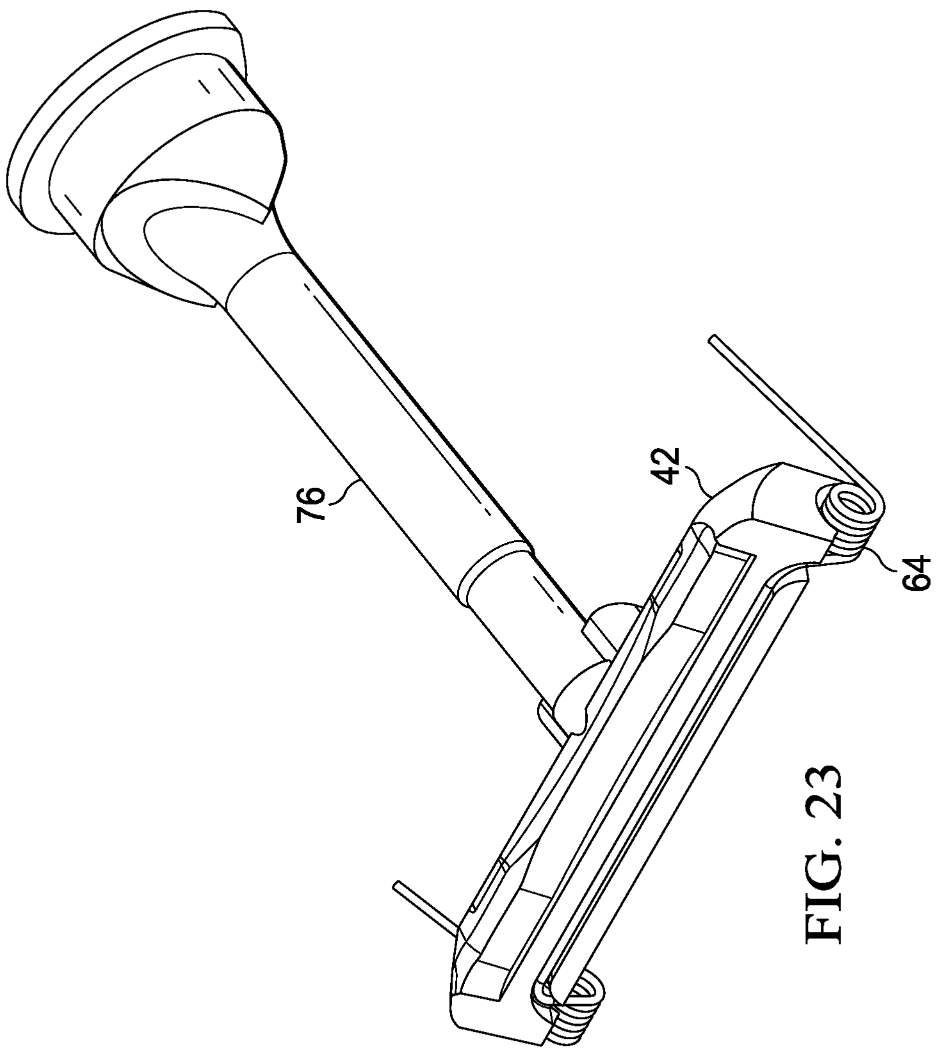
FIG. 23 is a schematic perspective view of an embodiment of a pivot spring and a portion of a pivoting head in accordance with an embodiment of the invention.
Figure 24:
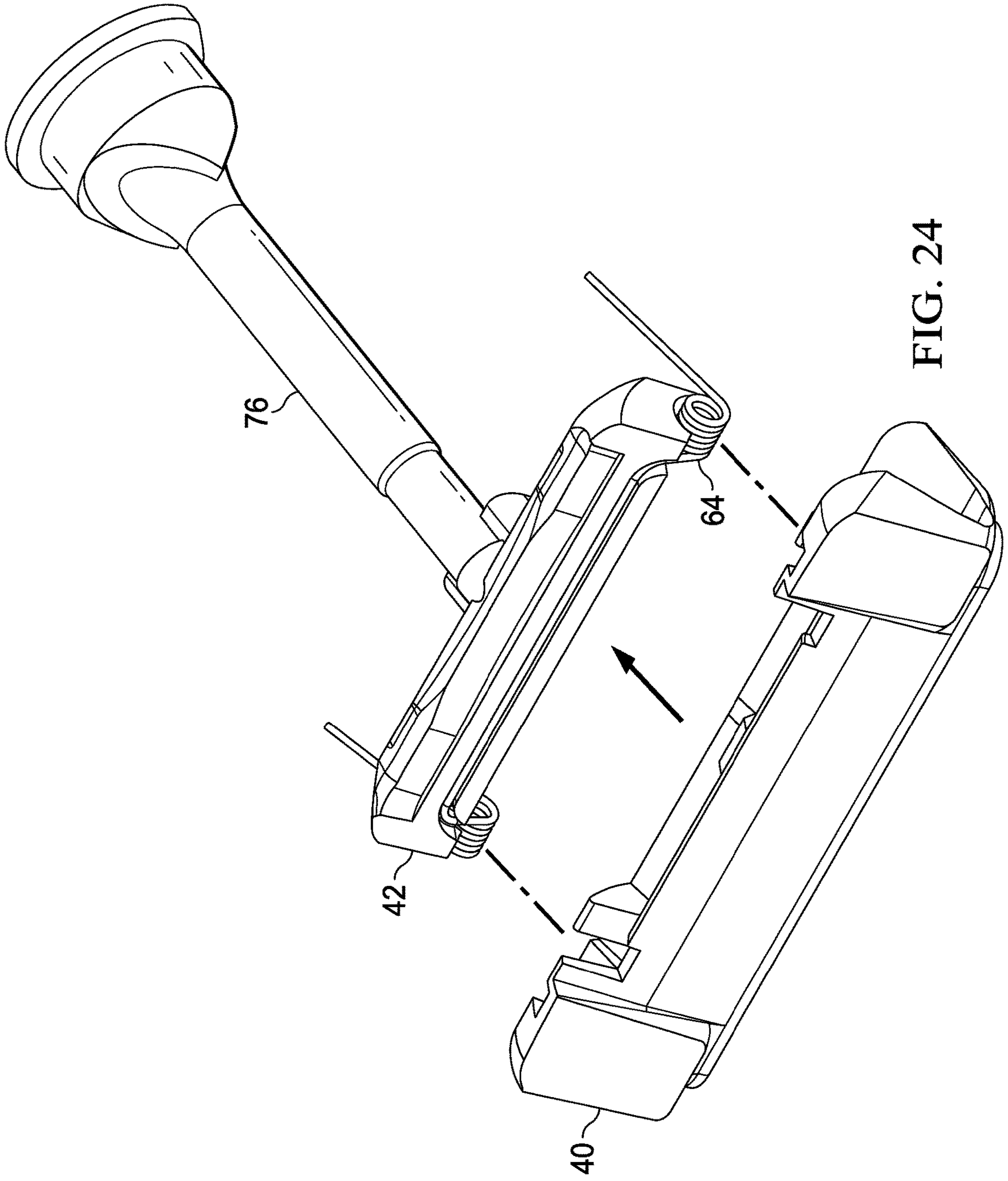
FIG. 24 is a schematic perspective assembly view of an embodiment of a pivot spring and a portion of a pivoting head in accordance with an embodiment of the invention.

FIGS. 22-24 illustrate an embodiment of a base member 42 having at least one channel 87 disposed on a face thereof. In an embodiment, base member 42 includes a channel 87 for housing a portion of spring member 64. The embodiment illustrated in FIGS. 22-24 includes a fluid benefit delivery member 76, but with respect to the channel 87 the base member 42 need not be coupled to the fluid benefit delivery member 76, but could, instead, house components related to a heating surface 82, as described in more detail below. Base member 42 can be molded plastic, and channel 87 can be a molded channel. Likewise, fluid deliver member 76 can be molded flexible plastic and can be molded integrally with base member 42. Channel 87 can have a size and shape conformed to receive the main bar portion 70 of spring member 64, as shown in FIGS. 21-24. FIG. 22 shows spring member 64 prior to being inserted into channel 87; FIG. 23 shows spring member 64 placed into channel 87 with first and second coil springs 68A and 68B disposed at an exterior portion of base member 42. As shown in FIG. 18, cover member 40, also made of molded plastic and made to have mating surfaces with base member 42 can be joined by translating onto and connecting to the base member in the direction indicated by arrows in FIG. 24.

Figure 25:
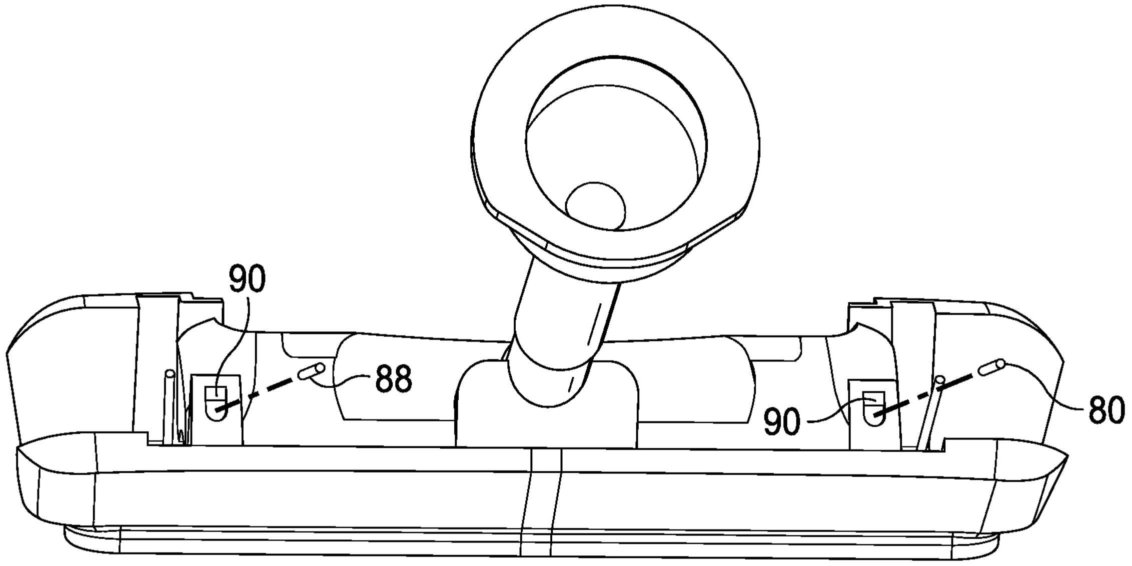
FIG. 25 is a schematic perspective view of a portion of a pivoting head in accordance with an embodiment of the invention.
Figure 26:
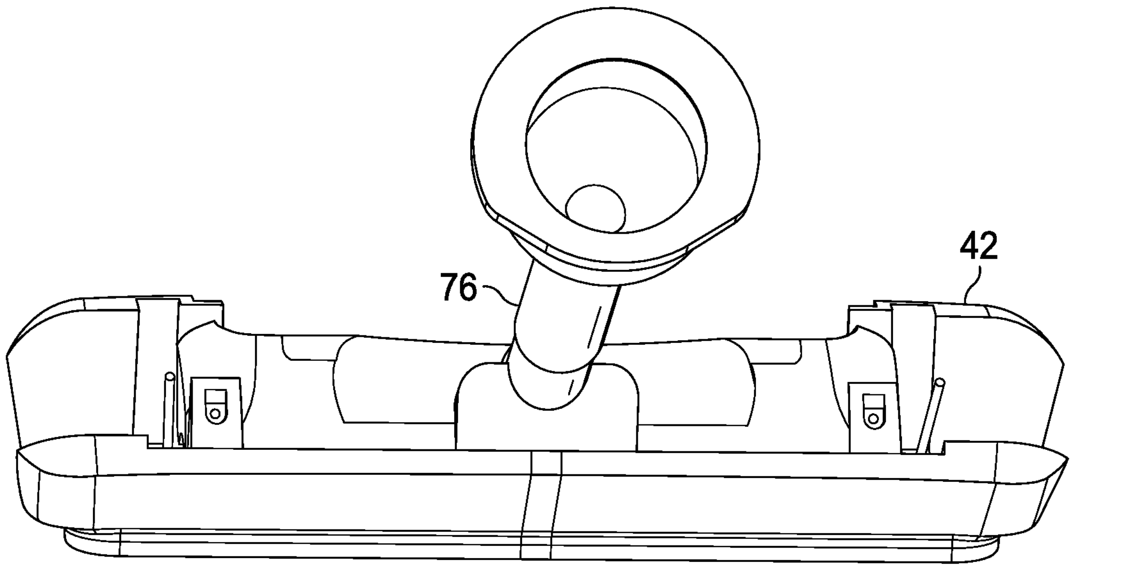
FIG. 26 is a schematic perspective view of a portion of a pivoting head in accordance with an embodiment of the invention.

Once cover member 40 is in mating relationship with base member 42, cover member and base member can be joined, such as by adhesive, press fit, or welding. In an embodiment, as shown in FIGS. 25 and 26, staking pins 89 can be driven into openings 90 in a cold press fit as shown in FIGS. 25 and 26 to cause the base member 42 and cover member 40 to remain in operatively stable mating relationship. In an embodiment that includes a fluid delivery member for a fluid skin benefit, once the base member 42 and cover member 40 are securely mated, a compartment 84 is defined between the parts, which compartment 84 has a volume into which fluid can flow from the handle 12 and from which fluid can flow to openings 90 on the skin interfacing face 80 of pivoting head 22.

Figure 27A:
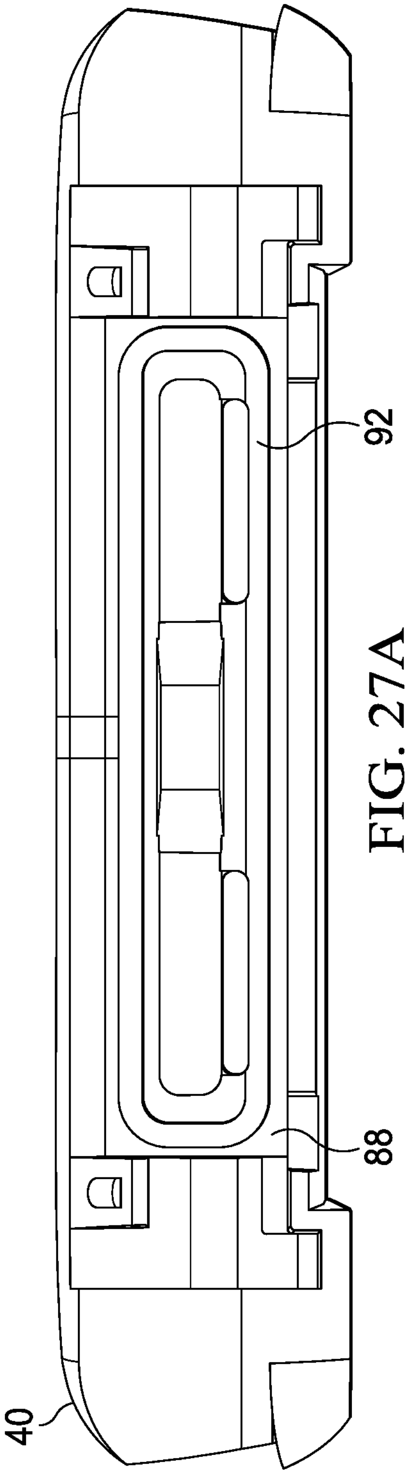
FIG. 27A-B is schematic view of a portion of a pivoting head in accordance with an embodiment of the invention.
Figure 27B:
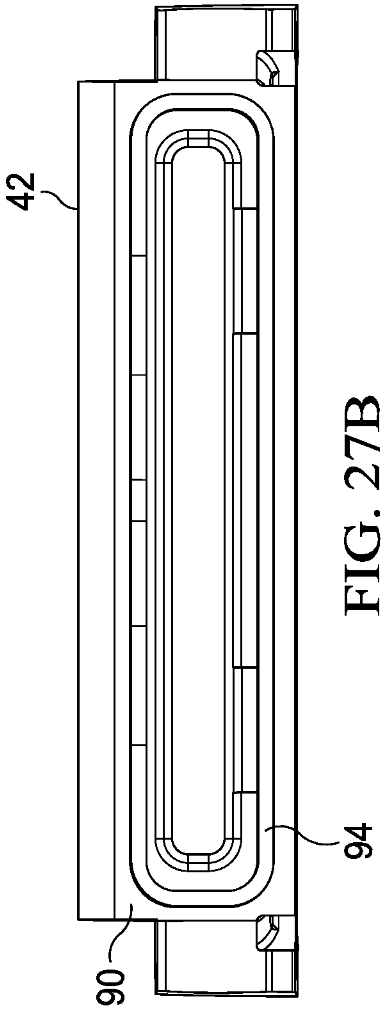

Fluid containment in compartment 84 can be achieved by a sealing relationship between cover member 40 and base member 42. FIG. 27A shows the mating surface of a cover member 40 and FIG. 27B shows the first mating surface 88 of a base member 42. In the embodiment shown in FIGS. 27 A-B, sealing can be achieved by the first mating face 88 of cover member 40 that, when operatively connected to base member 42 can mate in a juxtaposed, contacting relationship with a second mating face 90 of base member 42. A gasket member 92 can extend outwardly from first mating face 88 and can sealingly fit in a corresponding gasket groove 94 on base member 42.

Figure 29:
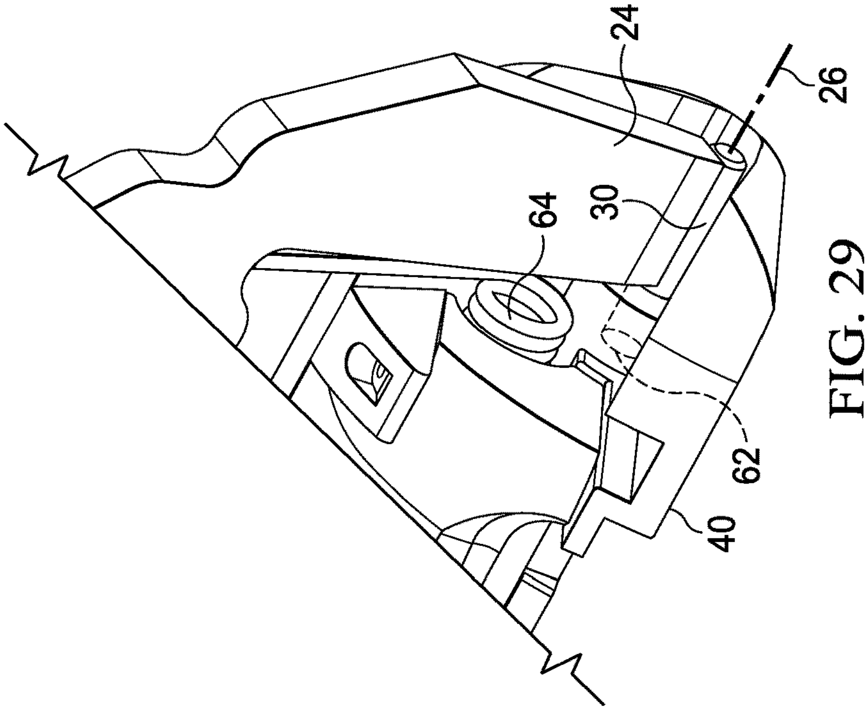
FIG. 29 is schematic perspective view of a portion of a pivoting head in accordance with an embodiment of the invention.
Figure 28:
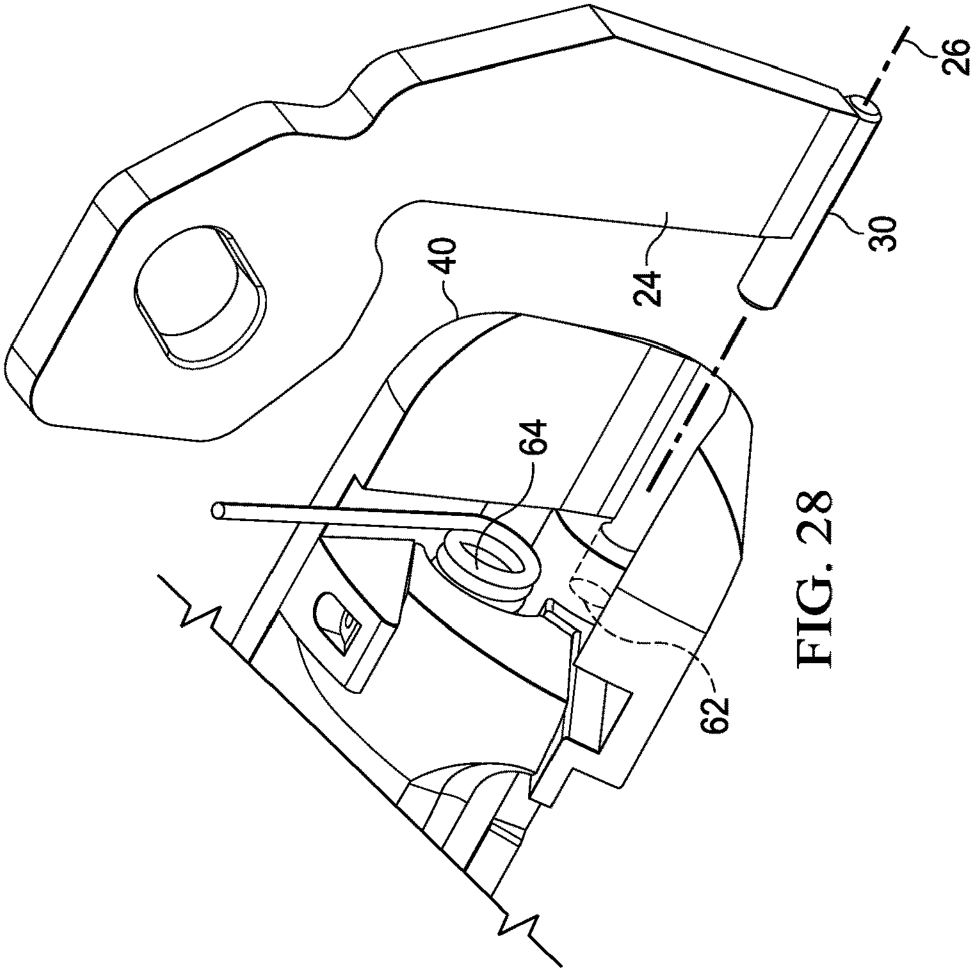
FIG. 28 is schematic perspective assembly view of a portion of a pivoting head in accordance with an embodiment of the invention.
Figure 30A:
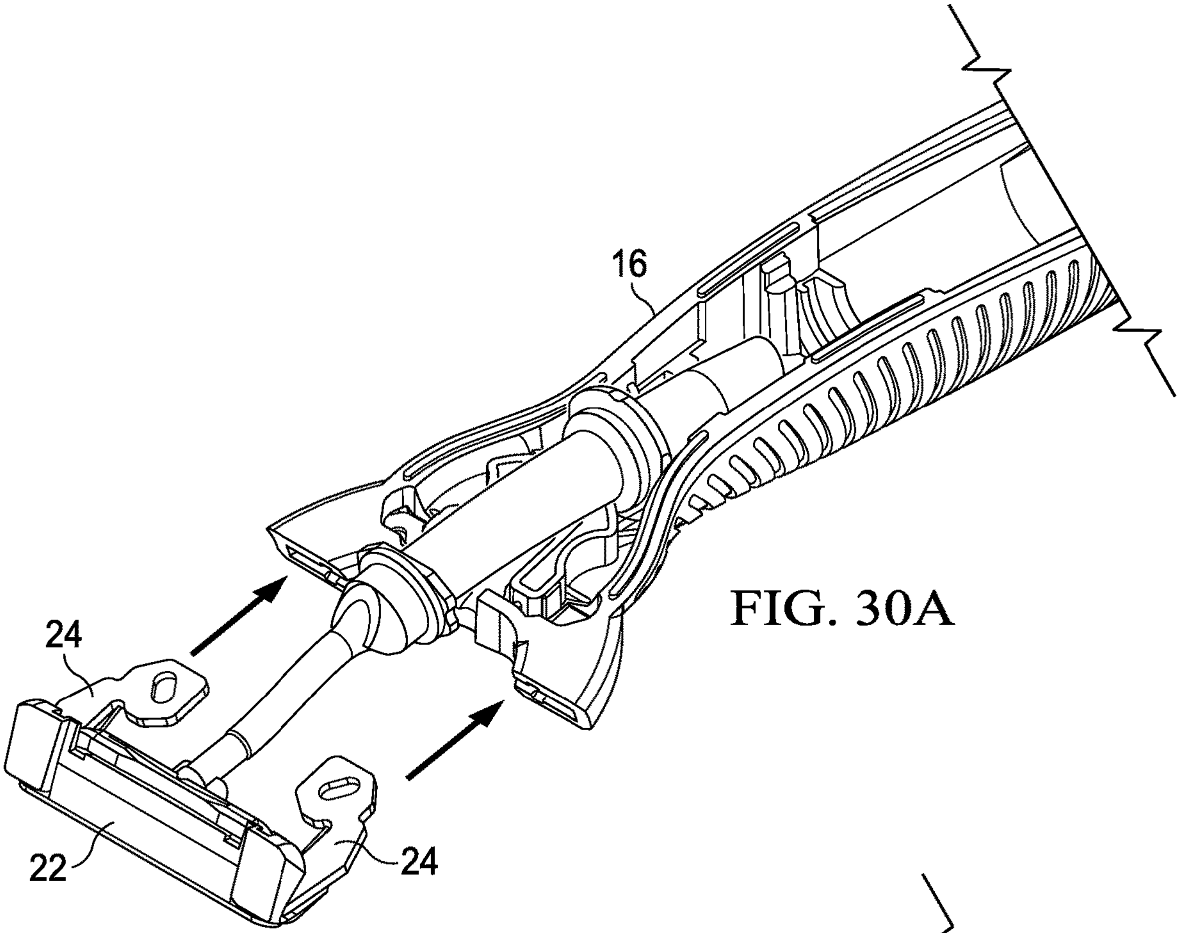
FIG. 30A-B is schematic perspective assembly view of a portion of a handle in accordance with an embodiment of the invention.
Figure 30B:
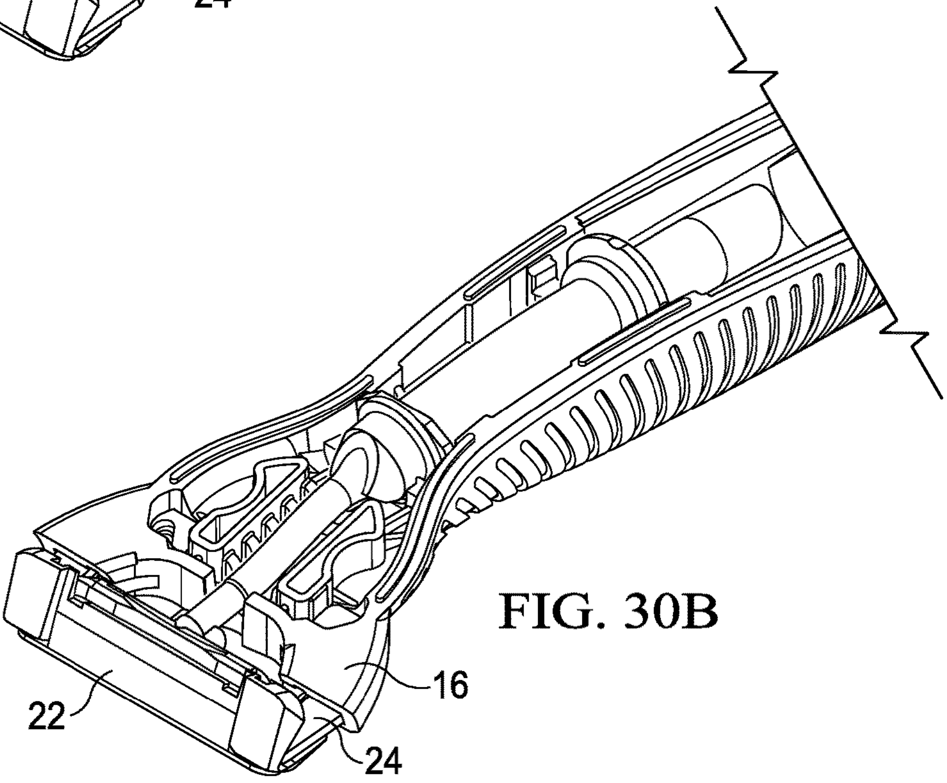
Figure 31:
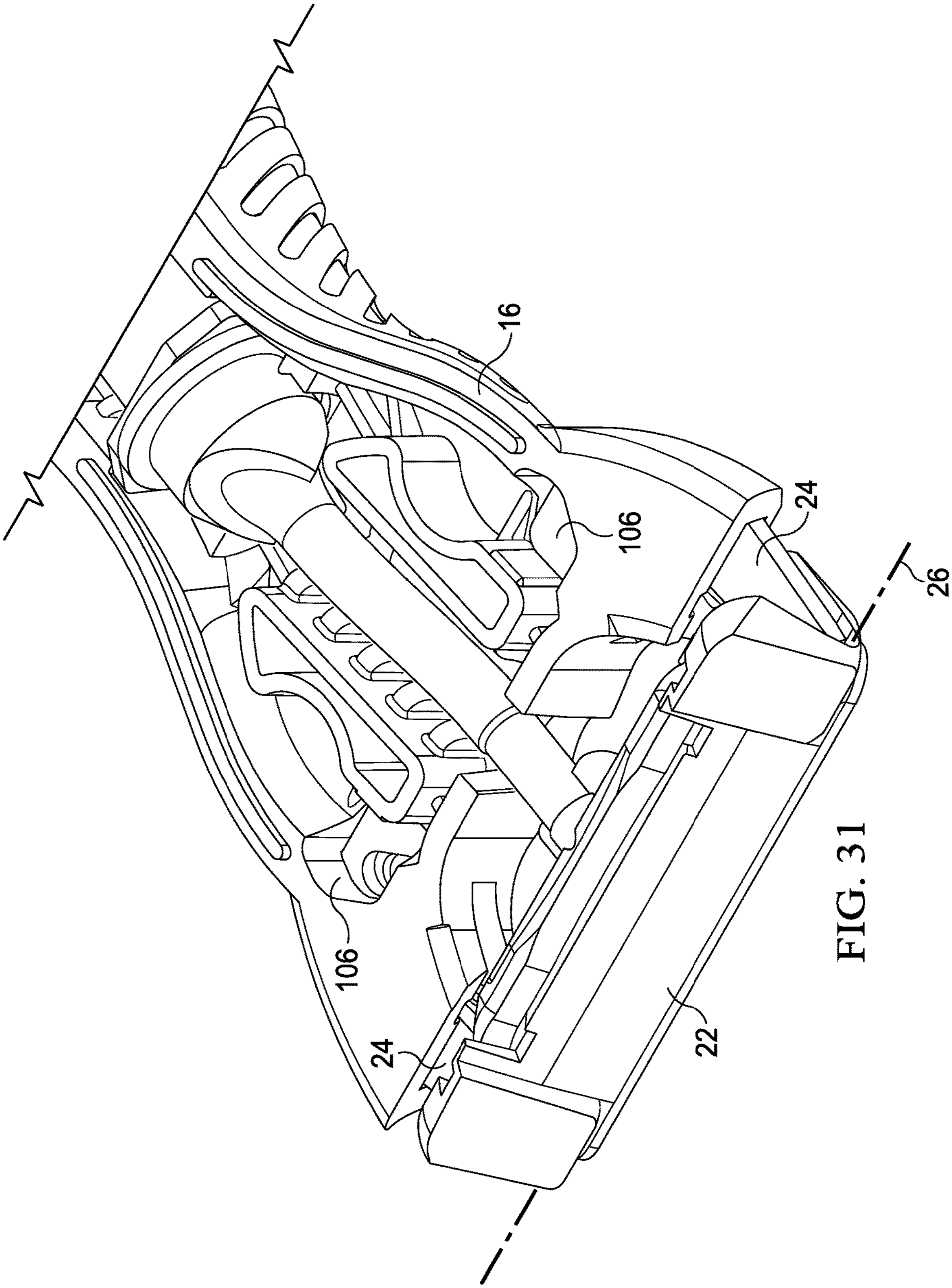
FIG. 31 is schematic perspective view of a portion of a handle in accordance with an embodiment of the invention.
Figure 32:
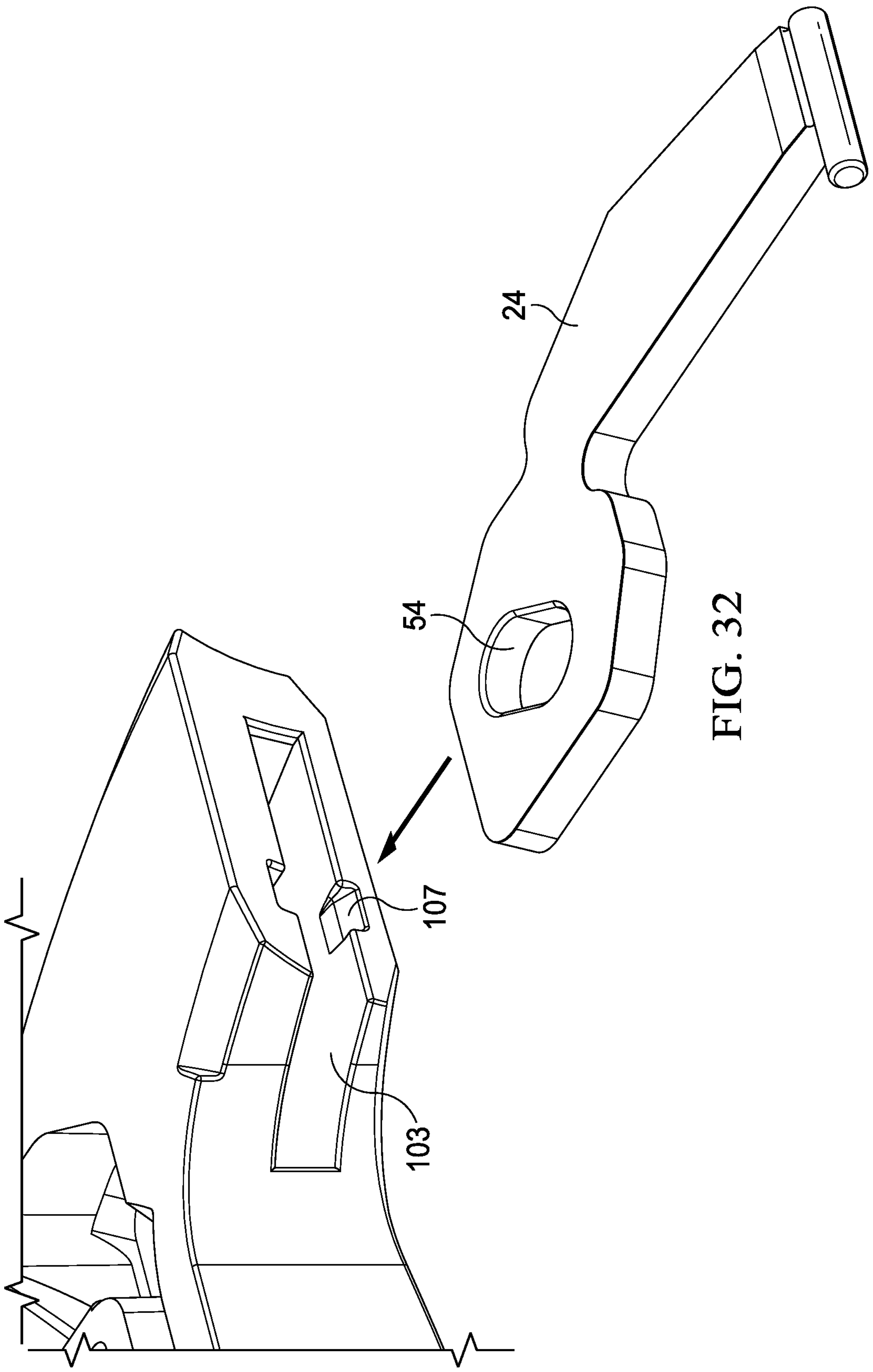
FIG. 32 is schematic perspective assembly view of a portion of a handle in accordance with an embodiment of the invention.

An embodiment of a pivoting head 22 can be assembled onto handle 12 in a manner illustrated in FIGS. 28-33. As shown in FIG. 28, pins 30 of arms 24 can be inserted into bearing recess 62 of cover member 40 by translating in the direction of the arrow of FIG. 28, which direction aligns with the longitudinal pin axis 67 (as shown in FIG. 14) and first axis of rotation 26. As shown in FIG. 28, spring member 64 is disposed in operative relationship between cover member 40 and base member 42. Once pin 30 is inserted into bearing recess 62, as shown in FIG. 29, pin 30 and arm 24 can freely rotate in bearing recess 62. Arms 24 can be held in place in any suitable manner while they are slid in the direction of the arrows in FIG. 30, which shows before (A) and after (B) depictions of the arm securement in slots 103 of main body 16. Once in place, as shown in FIG. 31, openings 54 of arms 24 can be exposed through a corresponding access opening 106 in main body 16. As shown in FIG. 32, one or more extensions 107 on or in slot 103 can provide for an interference fit to hold arms in place for the next step.

Figure 33:
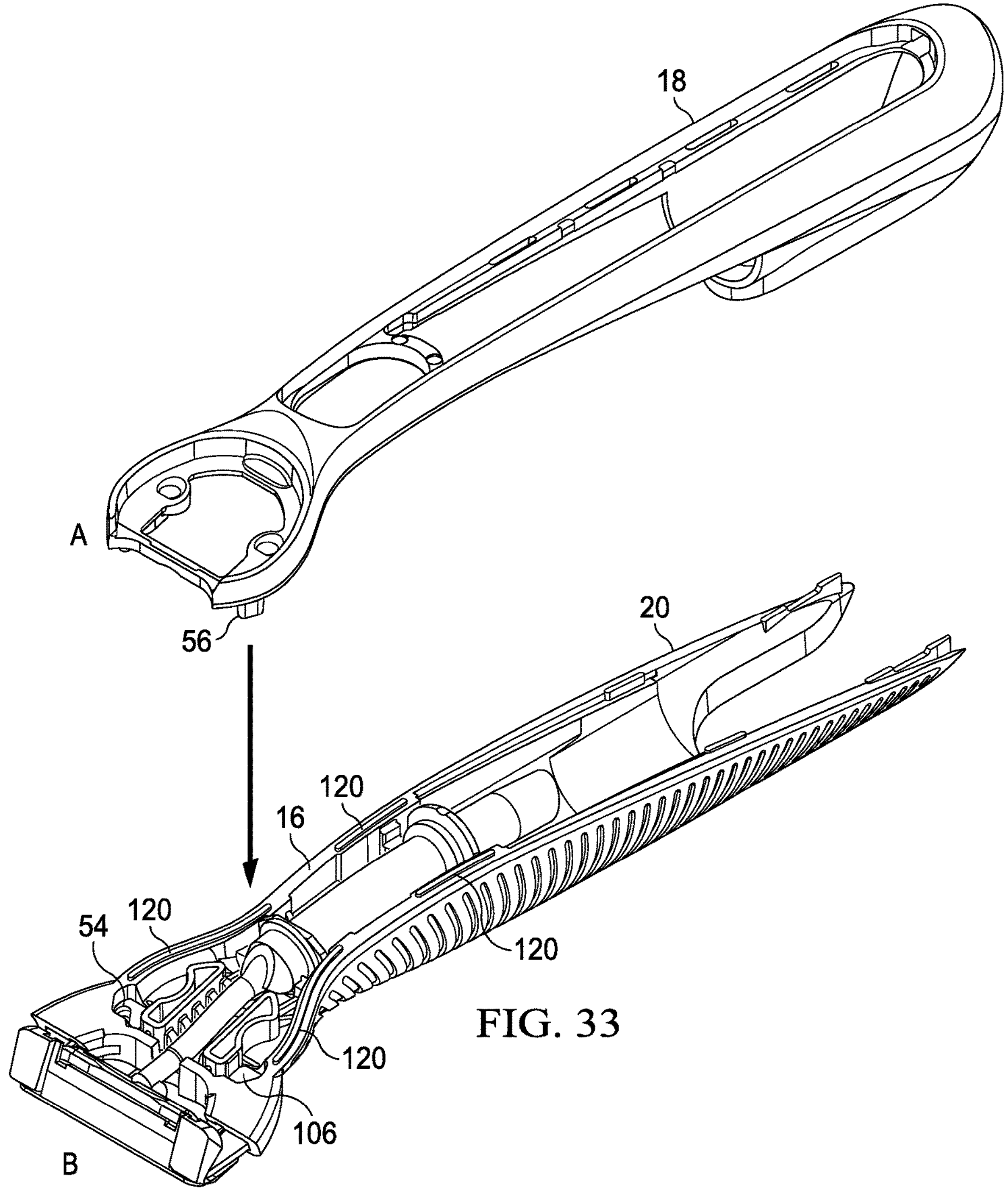
FIG. 33 is schematic perspective assembly view of a portion of a handle in accordance with an embodiment of the invention.

Referring now to FIG. 33, there is shown certain handle 12 elements being assembled to secure pivoting head 22 to handle 12. An embodiment of main frame 18 is shown translating in the direction of the arrows in FIG. 33 from a first position (A) to join secondary frame 20 (B). Main frame 18 can be joined to secondary frame 20 by adhesive applied at adhesive grooves 120 on secondary frame 20 which can mate with corresponding adhesive bosses on main frame 18. Main frame 18 can be disposed on a portion of secondary frame 20 in a mating relationship such that protuberances 56 are inserted through access openings 106 of main body 16 and openings 54 of arms 24. Protuberances 56 can provide positive metal-to-metal coupling of arms 24 to handle 12. In an embodiment adhesive can be applied at the connection of protuberances 56 and openings 54 to provide for additional securement of arms (and, therefore, pivoting head 12) to main frame 18 (and, therefore, handle 12).

Figure 34:
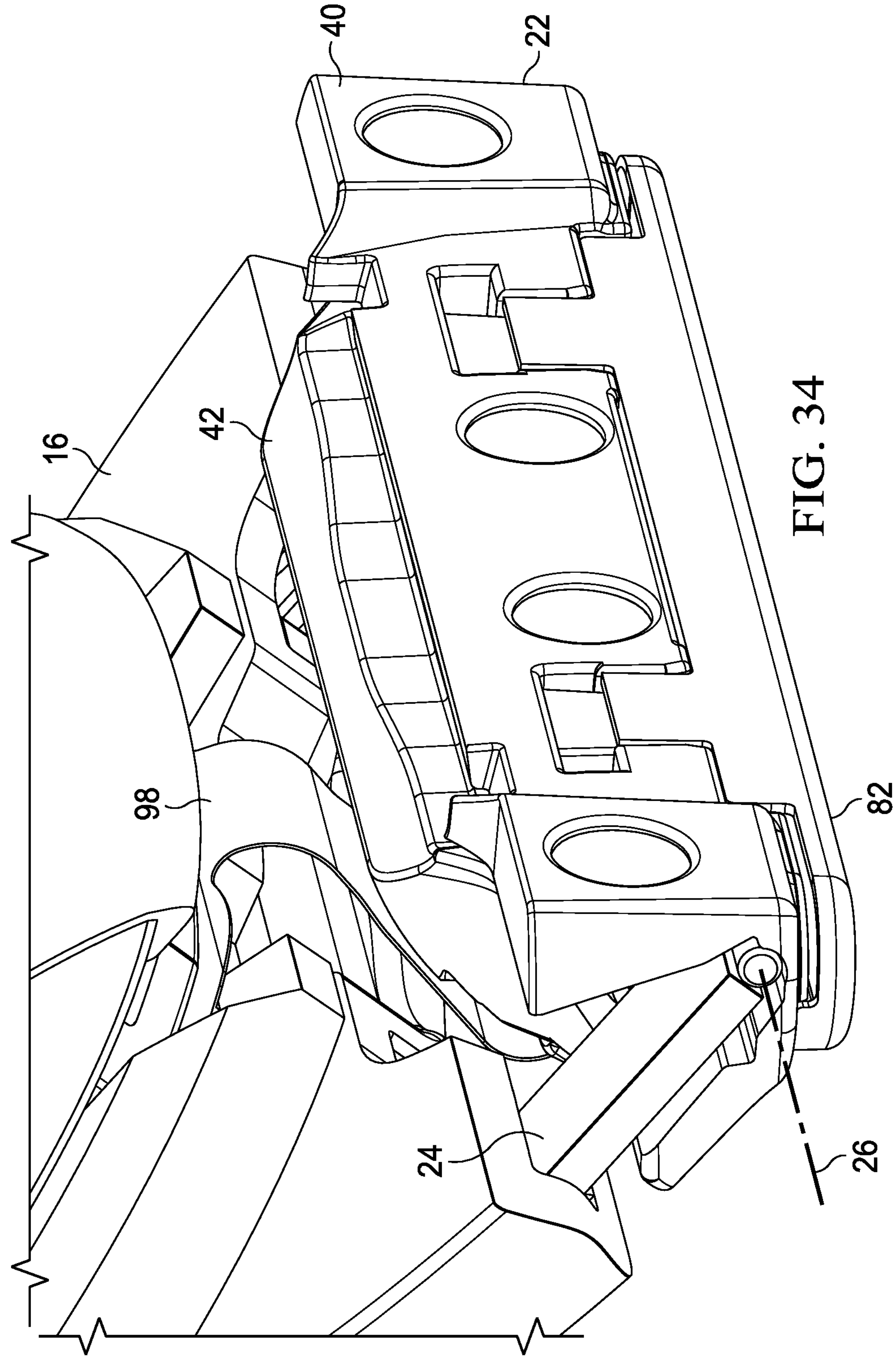
FIG. 34 is schematic perspective view of a pivoting head in accordance with an embodiment of the invention.
Figure 35:
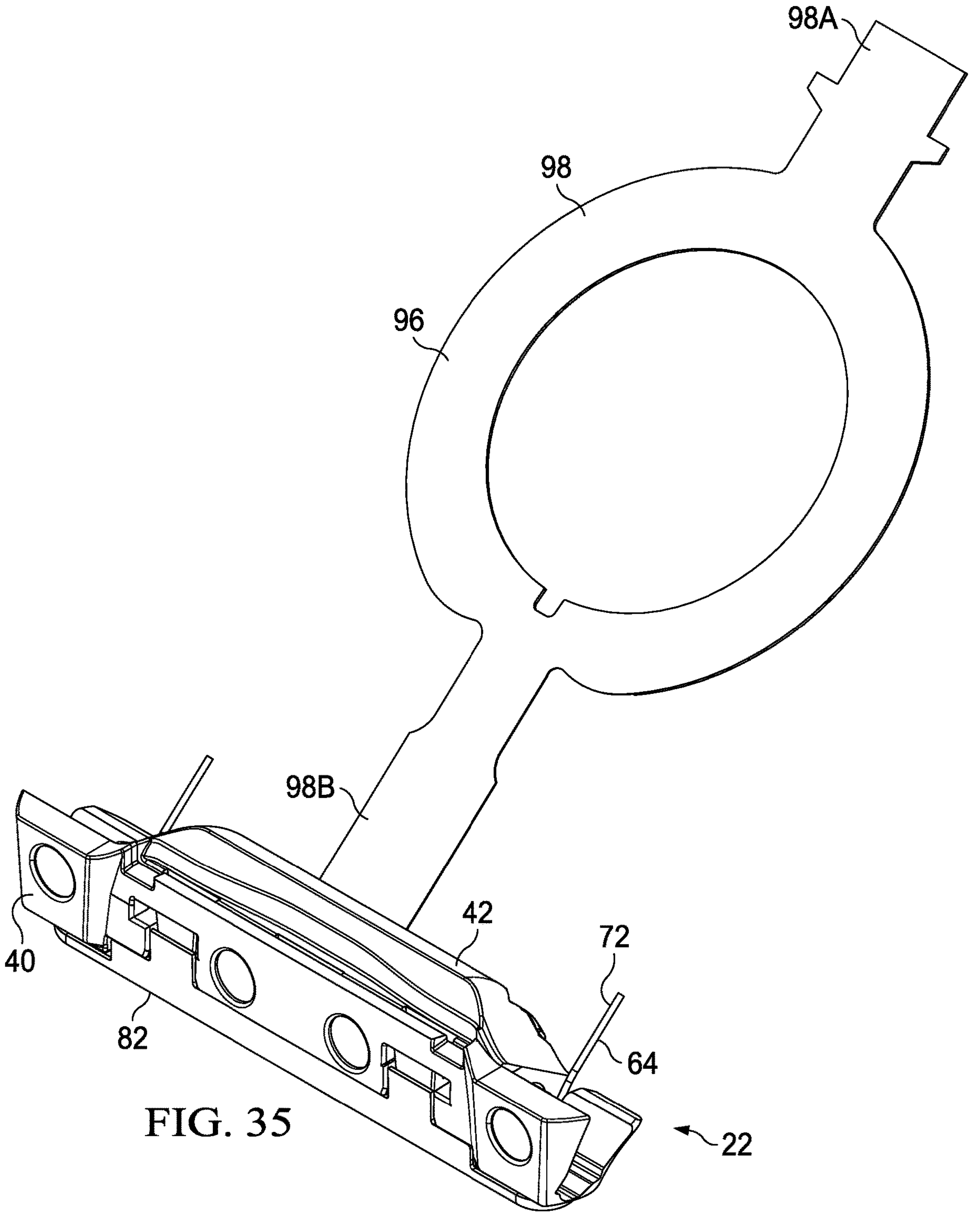
FIG. 35 is schematic perspective view of a pivoting head in accordance with an embodiment of the invention.
Figure 36:
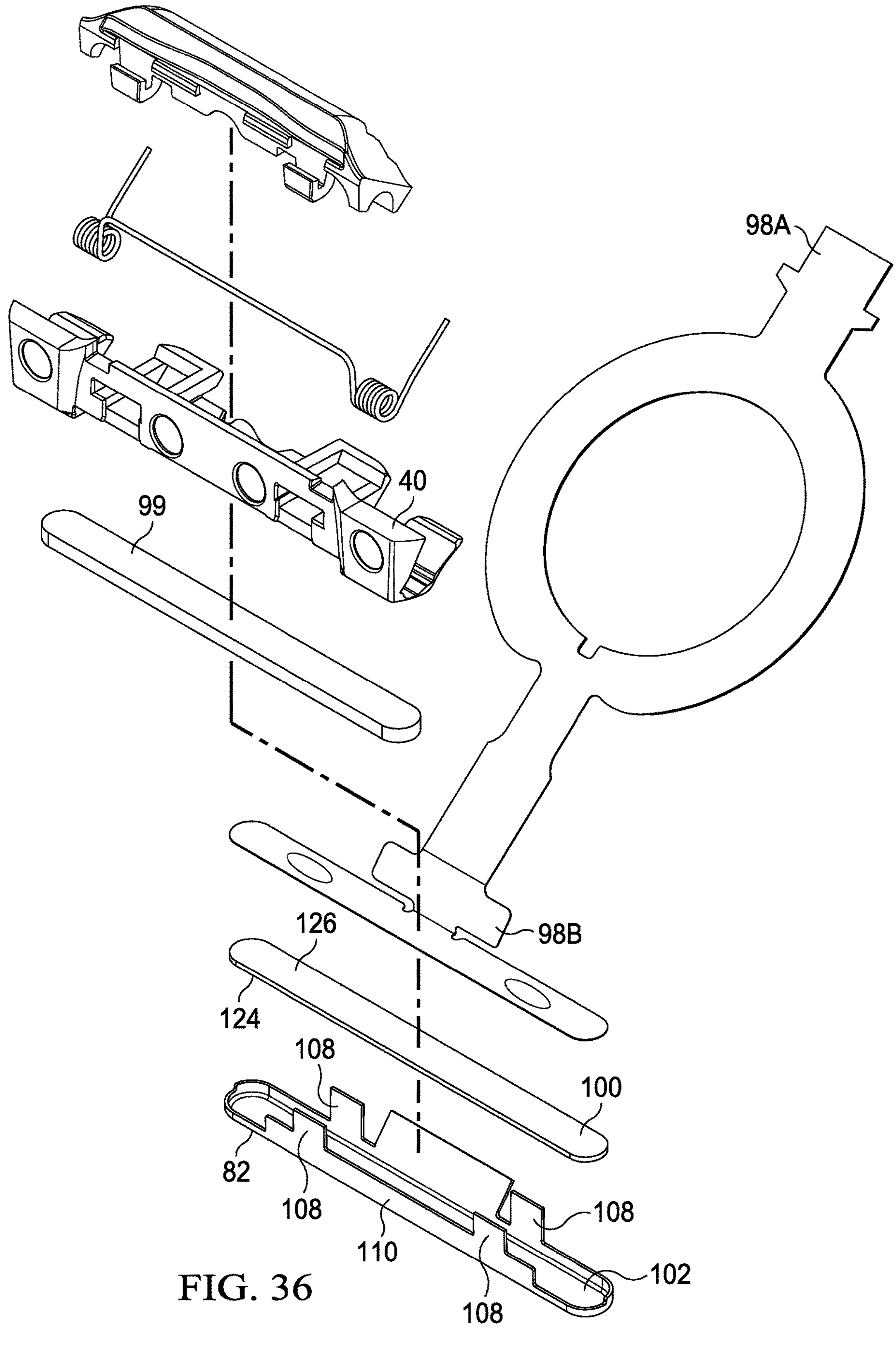
FIG. 36 is schematic perspective assembly view of a pivoting head in accordance with an embodiment of the invention.

Referring now to FIGS. 34-36, an embodiment of a pivoting head having a heat delivery member 96 for delivering heat as a skin benefit is described. Pivoting head 22 for delivering heat can have components common to those described above for delivering fluid, such as one or more arms 24, one or more spring members 64, a cover member 40 and a base member 42, and these common components can be configured as described above, or in a similar manner However, the pivoting head 22 for delivering a heat benefit can also have a heat delivery member 96 comprised of heat delivery components, including a flexible conductive strip 98 for conducting electricity from a first proximal portion 98A operatively attached in handle 12 to a second distal portion 98B operatively disposed in pivoting head 22 and delivering heat to the skin at a heating surface 82.

FIG. 35 shows an embodiment of a pivoting head 22 for a razor delivering a heat skin benefit. The pivoting head can include a cover member 40 connected to a base member 42 and a spring member 64 partially disposed between the cover member 40 and the base member 42. The pivoting head 22 shown in FIG. 35 can include components shown in the assembly view of FIG. 36. As shown in FIG. 36, in an embodiment spring member 64 as described above can be disposed between the cover member 40 and the base member 42, substantially as described above. Other components can be disposed on the outside of cover member 40 and can be attached in a layered relationship having sizes that correspond to the narrow lower face of the cover member 40.

As shown in FIG. 36, the heat delivery member 96 may include a face plate 102 for delivering heat to or proximal to the skin's surface during a shaving stroke for an improved shaving experience. In certain embodiments, the face plate 102 may have an outer skin contacting heating surface 82 comprising a relatively hard coating (that is harder than the material of the face plate 102), such as titanium nitride to improve durability and scratch resistance of the face plate 102. Similarly, if the face plate 102 is manufactured from aluminum, the face plate 102 may go through an anodizing process. The hard coating of the skin contact surface may also be used to change or enhance the color of the skin application surface 82 of the face plate 102. The heat delivery element 96 may be in electrical communication with a portion of the handle 12. As will be described in greater detail below, the heat delivery element 16 may be mounted to the pivoting head 22 and in communication with the power source (not shown).

Continuing to refer to FIG. 36, one possible embodiment of the heat delivery element 96 is shown that may be incorporated into the shaving razor 10 of FIG. 4. The face plate 102 may be as thin as possible, but stable mechanically. For example, the face plate 102 may have a wall thickness of about 100 micrometers to about 200 micrometers. The face plate 102 may comprise a material having a thermal conductivity of about 10 to 30 W/mK, such as steel. The face plate 102 can be manufactured from a thin piece of steel that results in the face plate 102 having a low thermal conductivity thus helping minimize heat loss through a perimeter wall 110 and maximizes heat flow towards the skin interfacing surface 80. Although a thinner piece of steel is preferred for the above reasons, the face plate 102 may be constructed from a thicker piece of aluminum having a thermal conductivity ranging from about 160 to 200 W/mK. The heat delivery element 96 may include a heater (not shown), e.g., a resistive heat element portion of flexible conductive strip 98, that is in electrical contact with a micro-controller and a power source (not shown), e.g. a rechargeable battery, positioned within the handle 12.

The heat delivery member 96 may include the face plate 102, the flexible conductive strip 98 heater, a heat dispersion layer 100, a compressible thermal insulation layer 99, and a portion of cover member 40. The face plate 102 may have a recessed inner surface 122 opposite the skin application surface 82 configured to receive the heater 98, the heat dispersion layer 100 and the compressible thermal insulation layer 99. The perimeter wall 110 may define the inner surface 122. The perimeter wall 110 may have one or more tabs 108 extending from the perimeter wall 110, transverse to and away from the inner surface 122. For example, FIG. 36 illustrates four extending from the perimeter wall 110.

The heat dispersion layer 100 may be positioned on and in direct contact with the inner surface 122 of the face plate 102. The heat dispersion layer 100 may have a lower surface 124 directly contacting the inner surface 122 of the face plate 102 and an upper surface 126 (opposite lower surface 37) directly contacting the heater 98. The heat dispersion layer 100 can be defined as a layer of material having a high thermal conductivity and can be compressible. For example, the heat dispersion layer 100 may comprise graphite foil. Potential advantages of the heat dispersion layer 100 include improving lateral heat flow (spreading the heat delivery from the heater 98 across the inner surface 122 of the face plate 102, which is transferred to the skin application surface 82) resulting in more even heat distribution and minimization of hot and cold spots. The heat dispersion layer 100 may have an anisotropic coefficient of thermal conductivity in the plane parallel to the face plate 102 of about 200 to about 1700 W/mK (preferably 400 to 700 W/mK) and vertical to the face plate 102 of about 10 to 50 W/mK and preferably 15 to 25 W/mK to facilitate sufficient heat conduction or transfer. In addition, the compressibility of the heat dispersion layer 100 allows the heat dispersion layer 100 adapt to non-uniform surfaces of the inner surface 122 of the face plate 102 and non-uniform surfaces of the heater 98, thus providing better contact and heat transfer. The compressibility of the heat dispersion layer 100 also minimizes stray particulates from pushing into the heater 98 (because the heat dispersion layer 100 may be softer than the heater), thus preventing damage to the heater 98. In certain embodiments, the heat dispersion layer 100 may comprise a graphite foil that is compressed by about 20% to about 50% of its original thickness. For example, the heat dispersion layer 100 may have a compressed thickness of about 50 micrometers to about 300 micrometers more preferably 80 to 200 micrometers.

The heater 98 may be positioned between two compressible layers. For example, the heater 98 may be positioned between the heat dispersion layer 100 and the compressible thermal insulation layer 99. The two compressible layers may facilitate clamping the heater 98 in place without damaging the heater 98, thus improving securement and assembly of the heat delivery element 96. The compressible thermal insulation layer 99 may help direct the heat flow toward the face plate 102 and away from the cover member 40. Accordingly, less heat is wasted, and more heat may be able to reach the skin during shaving. The compressible thermal insulation layer 99 may have low thermal conductivity, for example, less than 0.30 W/mK and preferably less than 0.1 W/mK. In certain embodiments, the compressible thermal insulation layer 38 may comprise an open cell or closed cellular compressible foam. The compressible thermal insulation layer 99 may be compressed 20-50% from its original thickness. For example, the compressible thermal insulation layer 99 may have a compressed thickness of about 400 μm to about 800 μm.

The cover member 40 may be mounted on top of the compressible thermal insulation layer 99 and secured to the face plate 102. Accordingly, the heater 98, the heat dispersion layer 100 and the compressible thermal insulation layer 99 may be pressed together between the face plate 102 and the cover member 40 and assembled as described more fully below. The heat dispersion layer 100, the heater 98, and the compressible thermal insulation layer 99 may fit snugly within the perimeter wall 110. The pressing of the various layers together may result in more efficient heat transfer across the interfaces of the different layers in the heat delivery element 96. In absence of this compression force the thermal transfer across the interfaces can be insufficient. Furthermore, the pressing of the layers together may also eliminate secondary assembly processes, such as the use of adhesives between the various layers. The compressible thermal insulation layer 99 may fit snugly within the perimeter wall 110.

Thus, in an embodiment, the first layer in contacting relationship with cover member 40 can be a compressible thermal insulation layer 99 such as a foam member. A portion of the heater in the form of a flexible conductive strip 98 can be sandwiched between a foam thermal insulation layer 99 and a graphite foil strip heat dispersion layer 100. The layers of foam thermal insulation layer 99, flexible conductive strip 98 and graphite foil strip can be connected in layered, contacting relationship to the narrow lower face of the cover member 40 by a faceplate 102. Faceplate 102 can have a smooth outer surface that corresponds to heating surface 82, and tabs 108 that can be used to connect the heat delivery components to the pivoting head 22.

Figure 37A:
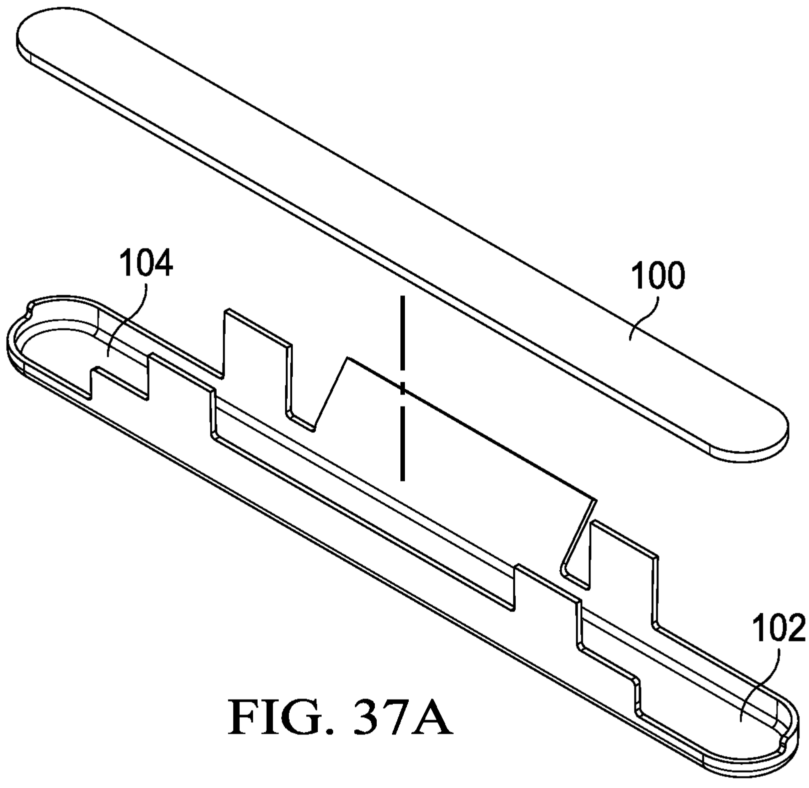
FIG. 37A-B is schematic perspective assembly view of a portion of a pivoting head in accordance with an embodiment of the invention.
Figure 37B:
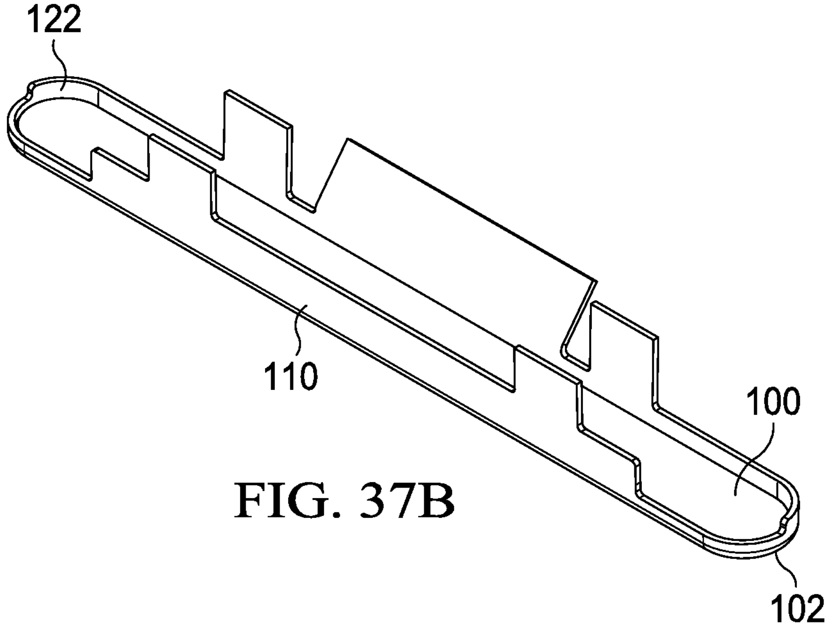
Figure 38B:
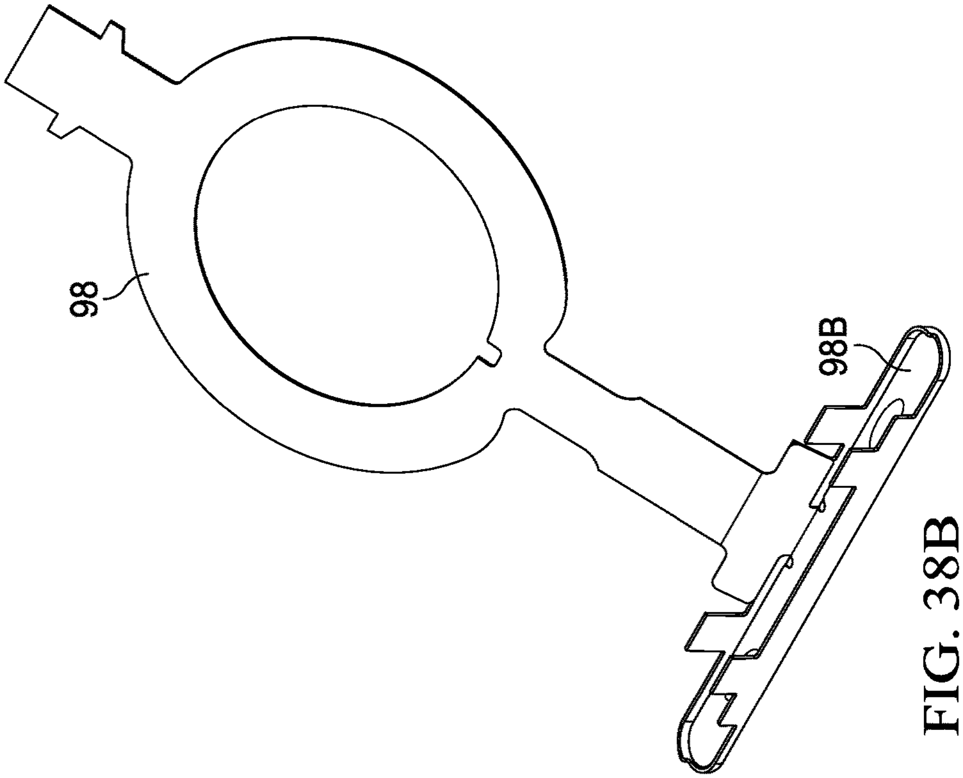
FIG. 38A-B is schematic perspective assembly view of a portion of a pivoting head in accordance with an embodiment of the invention.
Figure 38A:
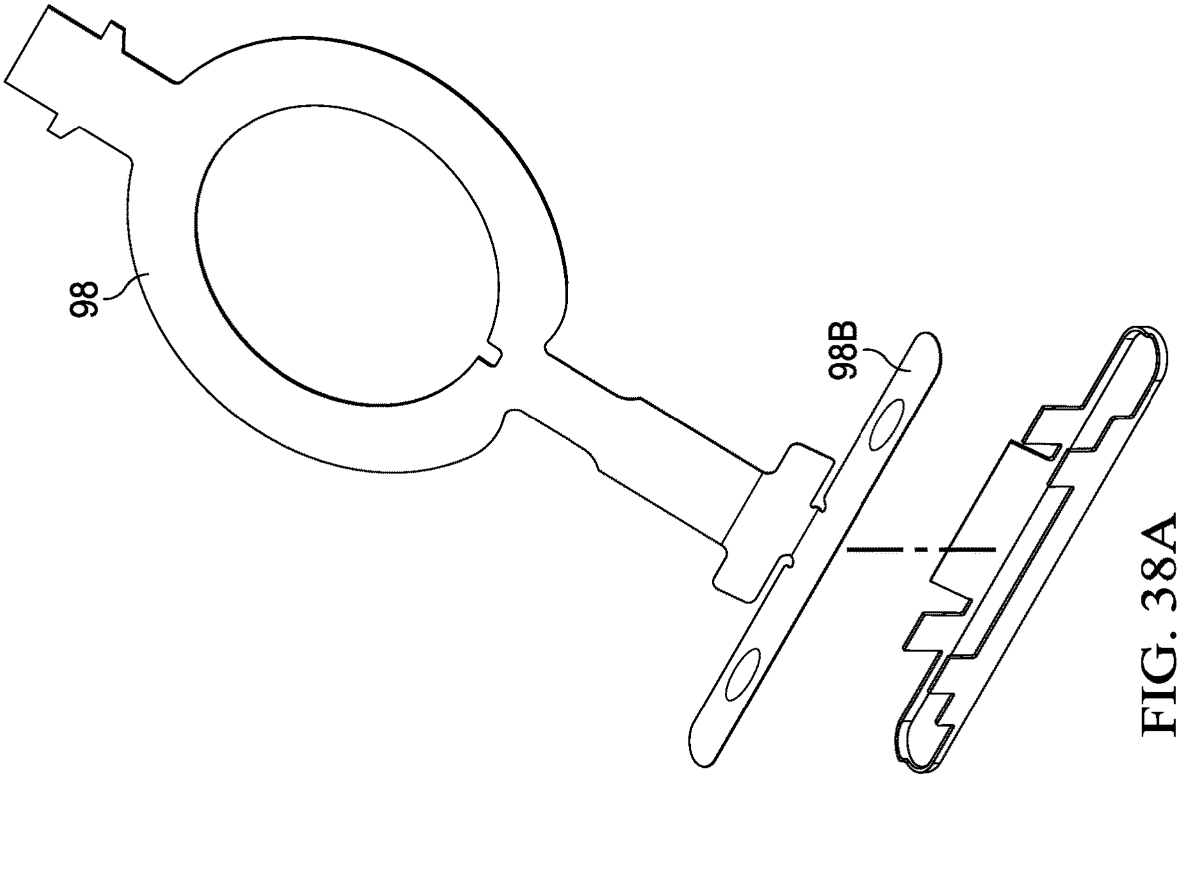
Figure 39B:
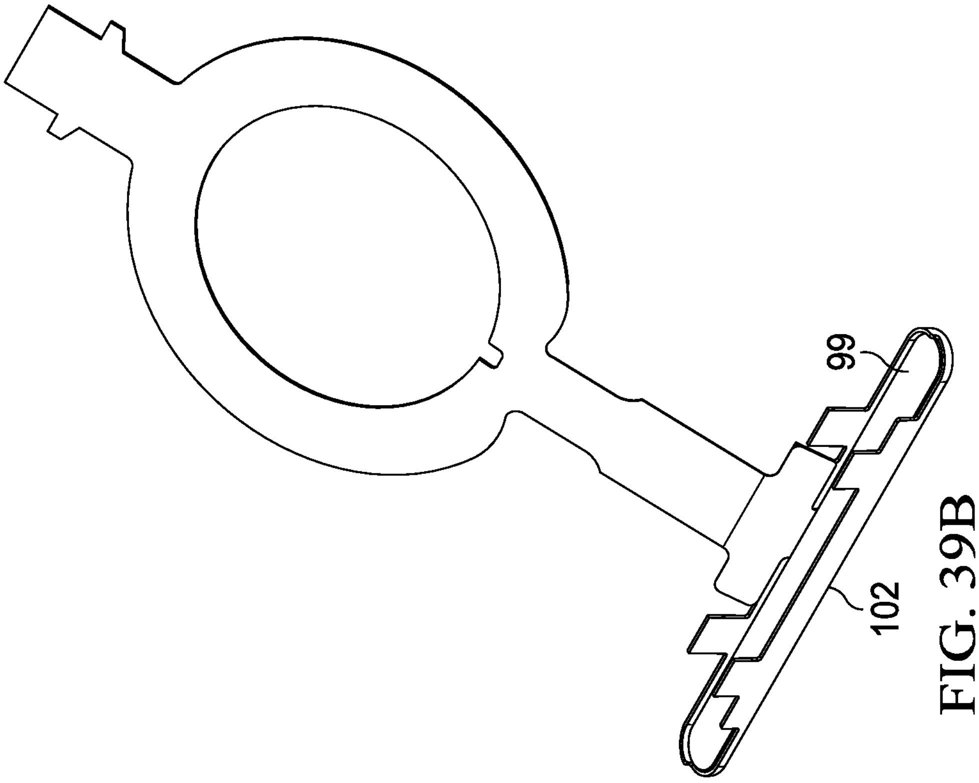
FIG. 39A-B is schematic perspective assembly view of a portion of a pivoting head in accordance with an embodiment of the invention.
Figure 39A:
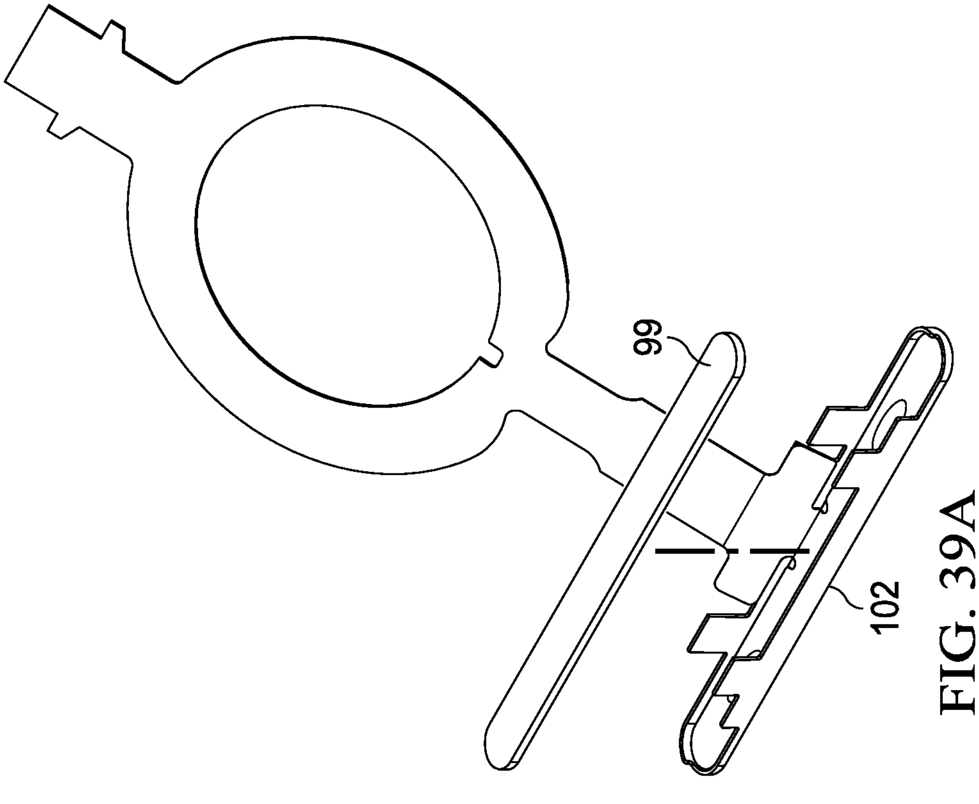
Figure 40B:
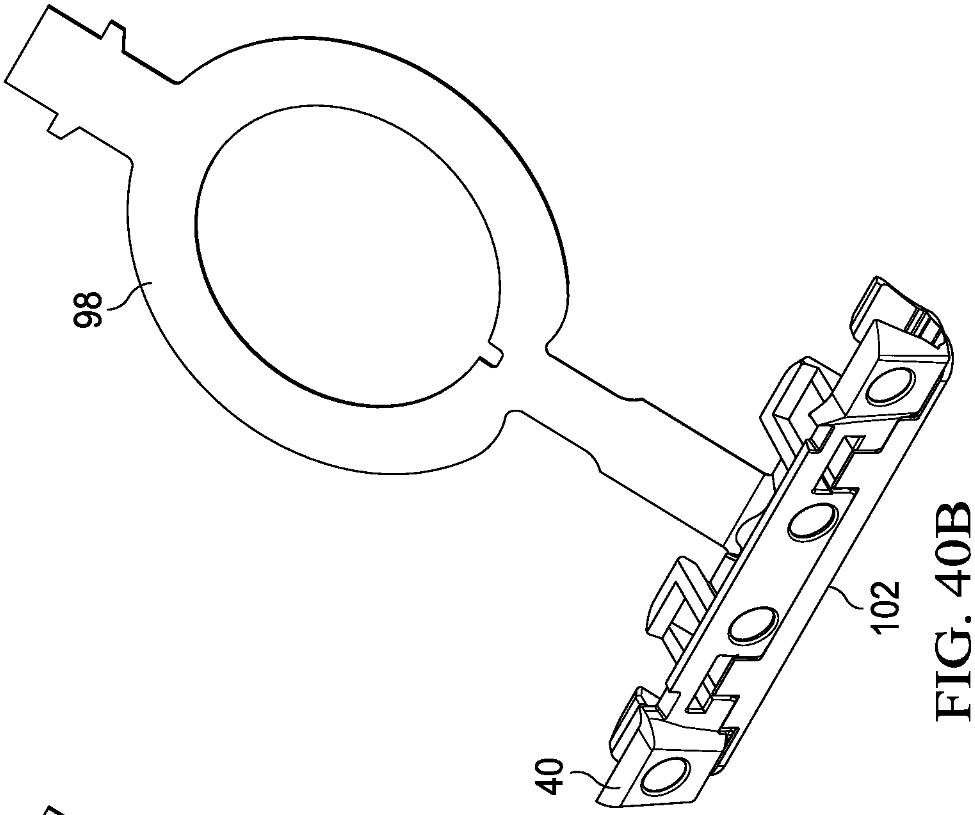
FIG. 40A-B is schematic perspective assembly view of a portion of a pivoting head in accordance with an embodiment of the invention.
Figure 40A:
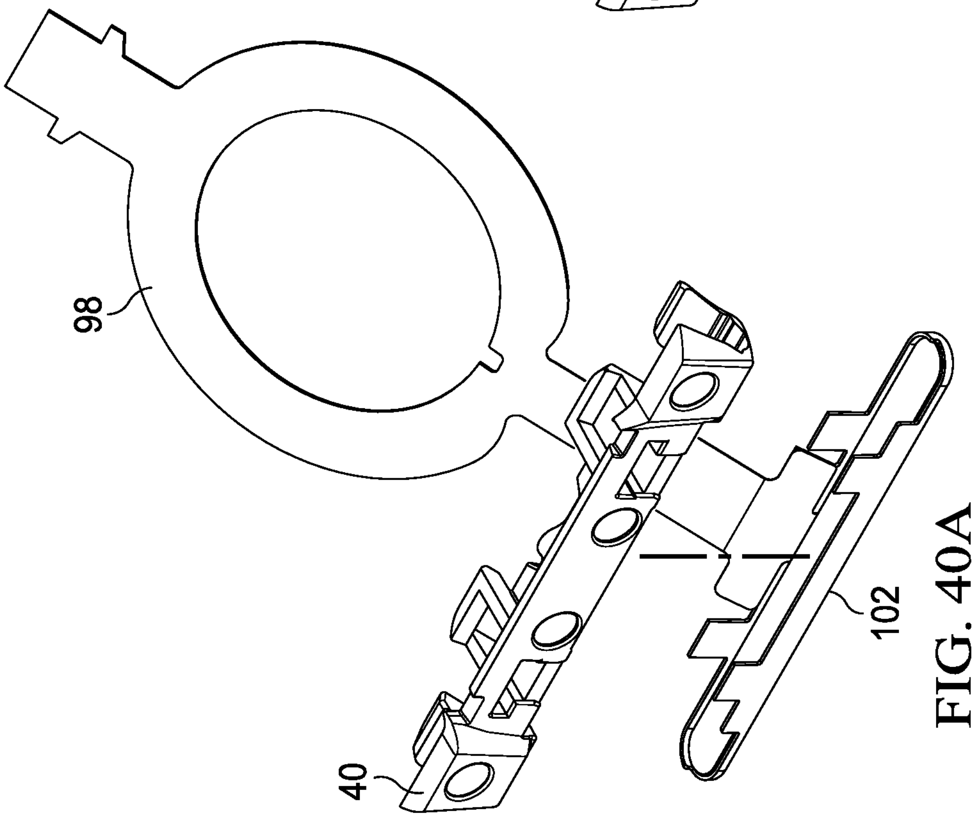
Figure 41A:
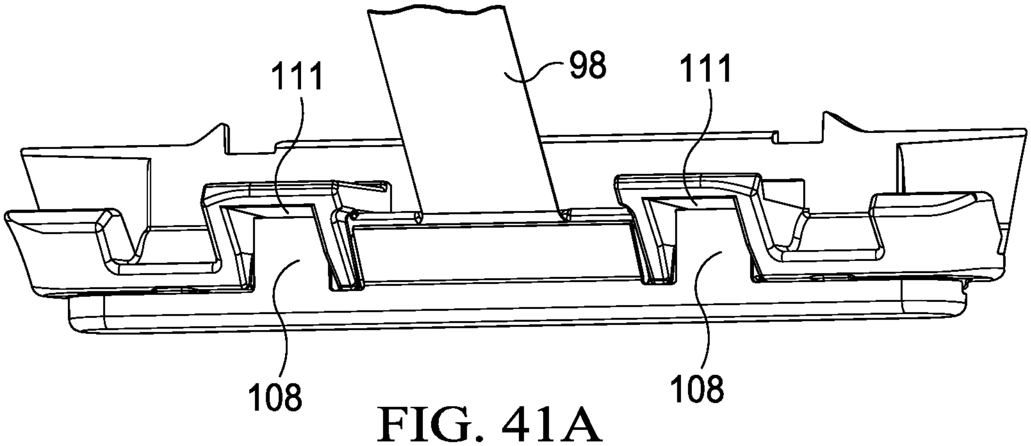
FIG. 41A-D is schematic perspective assembly view of a portion of a pivoting head showing steps of assembly in accordance with an embodiment of the invention.
Figure 41B:
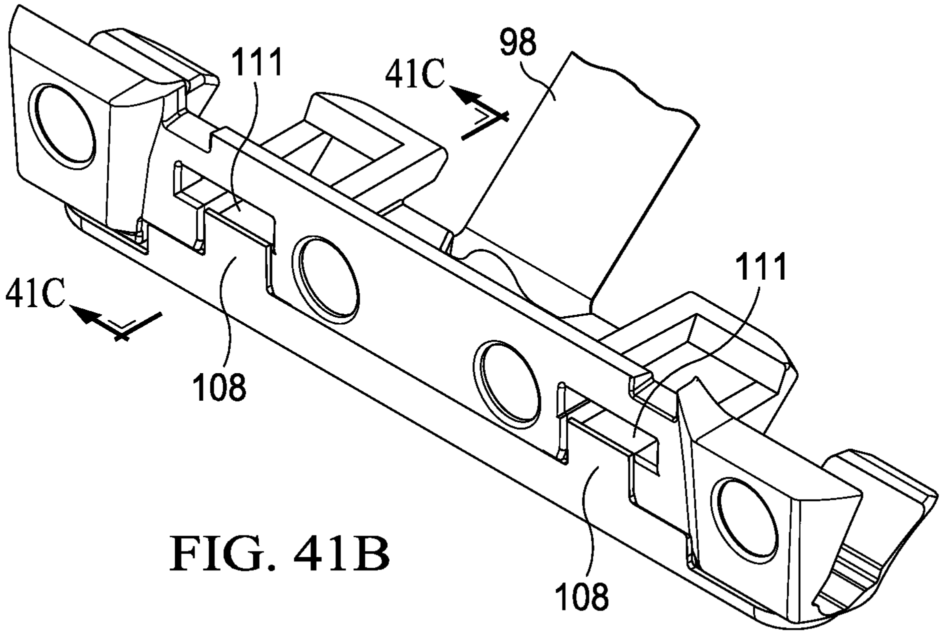
Figure 41D:
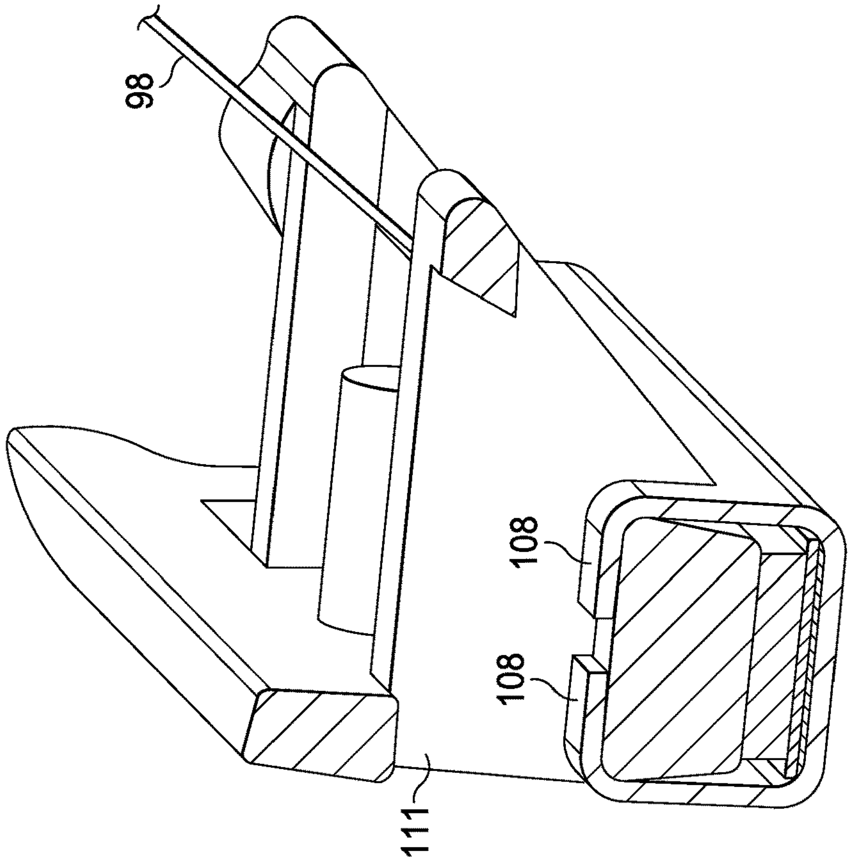
Figure 41C:
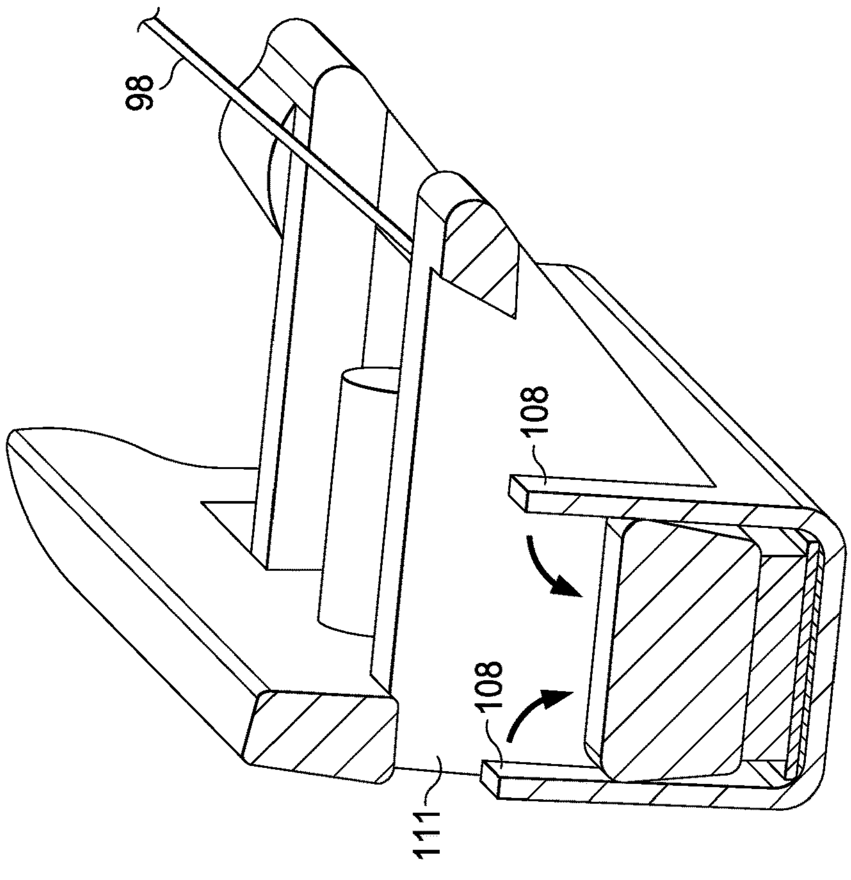
Figure 42:
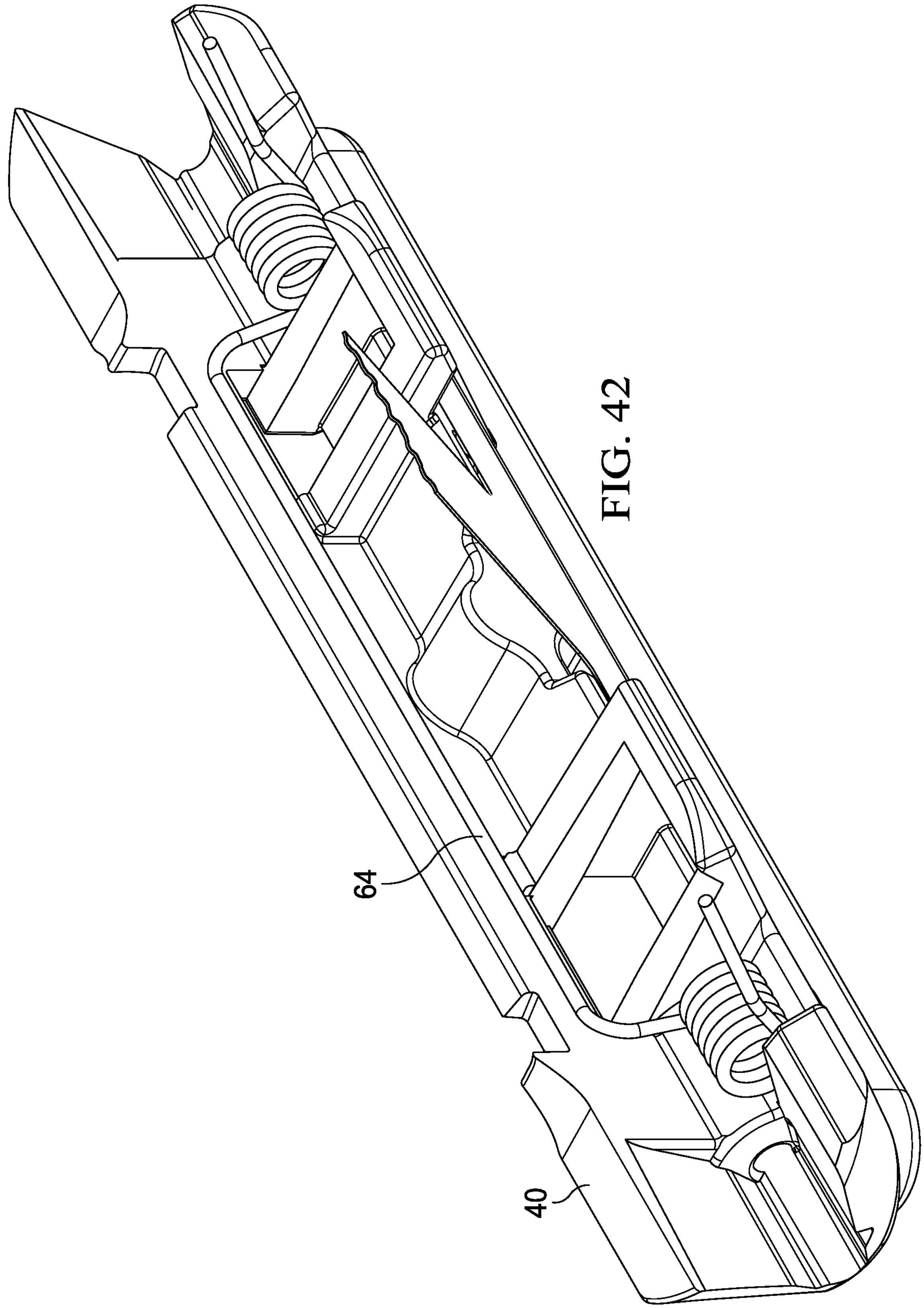
FIG. 42 is schematic perspective view of a portion of a pivoting head in accordance with an embodiment of the invention.

Assembling a pivoting head for delivering a heat skin benefit can be described with reference to FIGS. 37-49. Referring to the assembly view of FIG. 37, a graphite foil strip heat dispersion layer 100 can be placed onto a trough 104 of faceplate 102, such as onto the recessed inner surface 122 of faceplate 102. In a next step, as shown in the assembly view of FIG. 38, distal portion 98B of flexible conductive strip 98 can be shaped and fit into the trough 104 of faceplate 102. Next, as shown in the assembly view of FIG. 39, a compressible thermal insulation layer 99 member can be placed into trough 104 of faceplate 102. As with the other members placed in trough 104, foam thermal insulation layer 99 can be sized and shaped accordingly to fit in trough 104. Next, as shown in FIG. 40, cover member 40 can be placed on top of the other layered components in and faceplate 102.

Figure 43A:
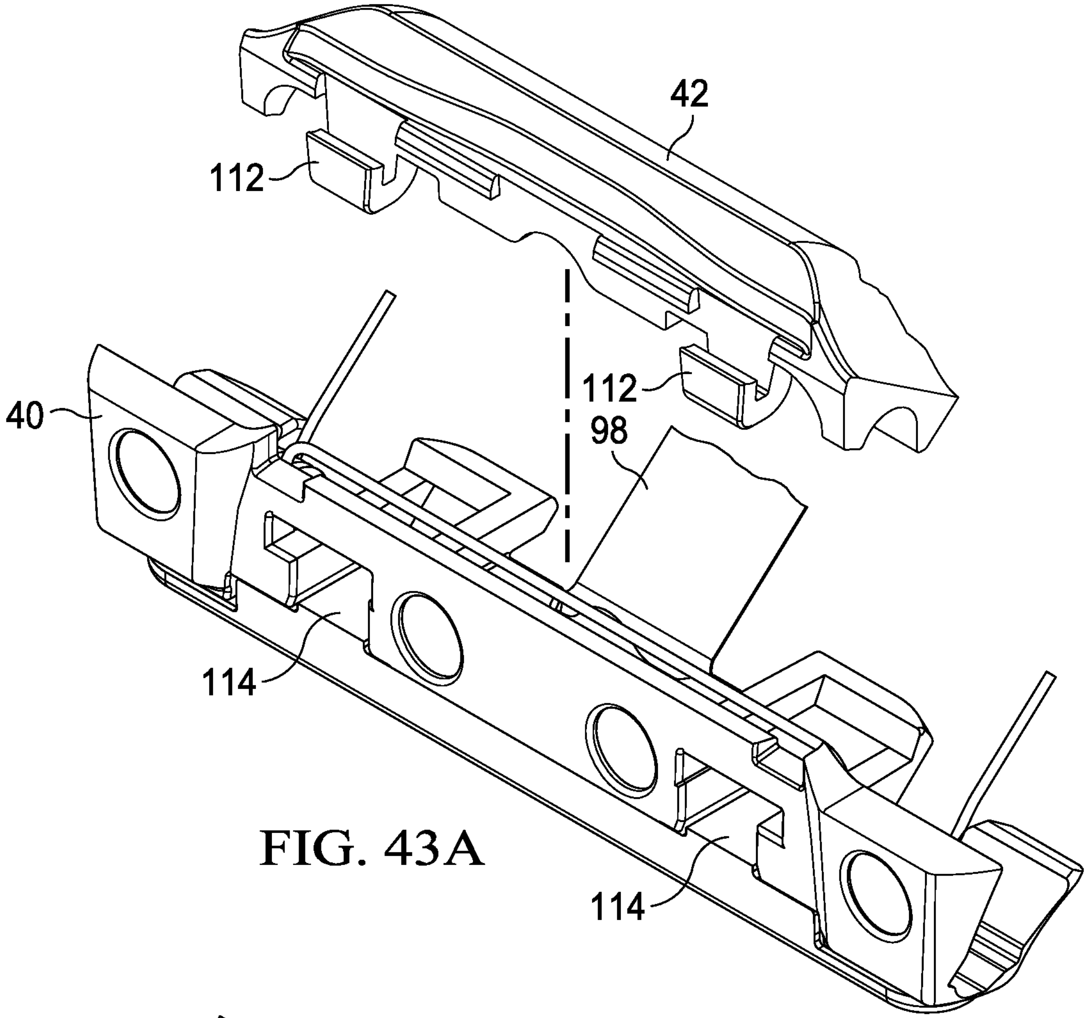
FIG. 43A-F is schematic perspective assembly view of a portion of a pivoting head showing steps of assembly in accordance with an embodiment of the invention.
Figure 43B:
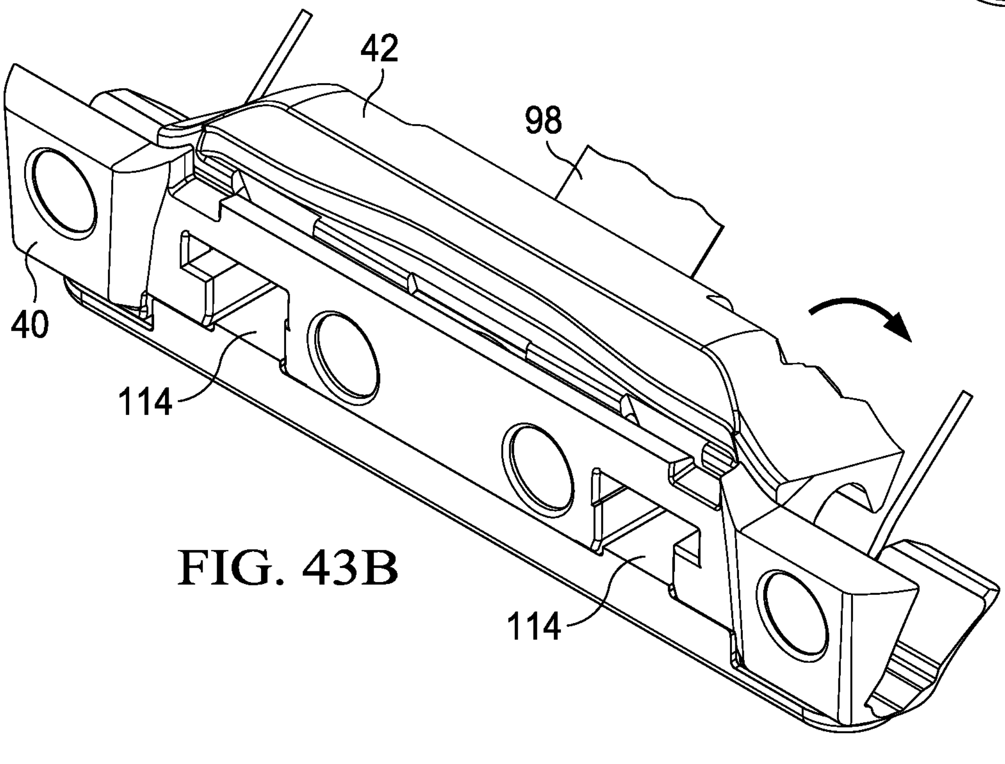
Figure 43C:
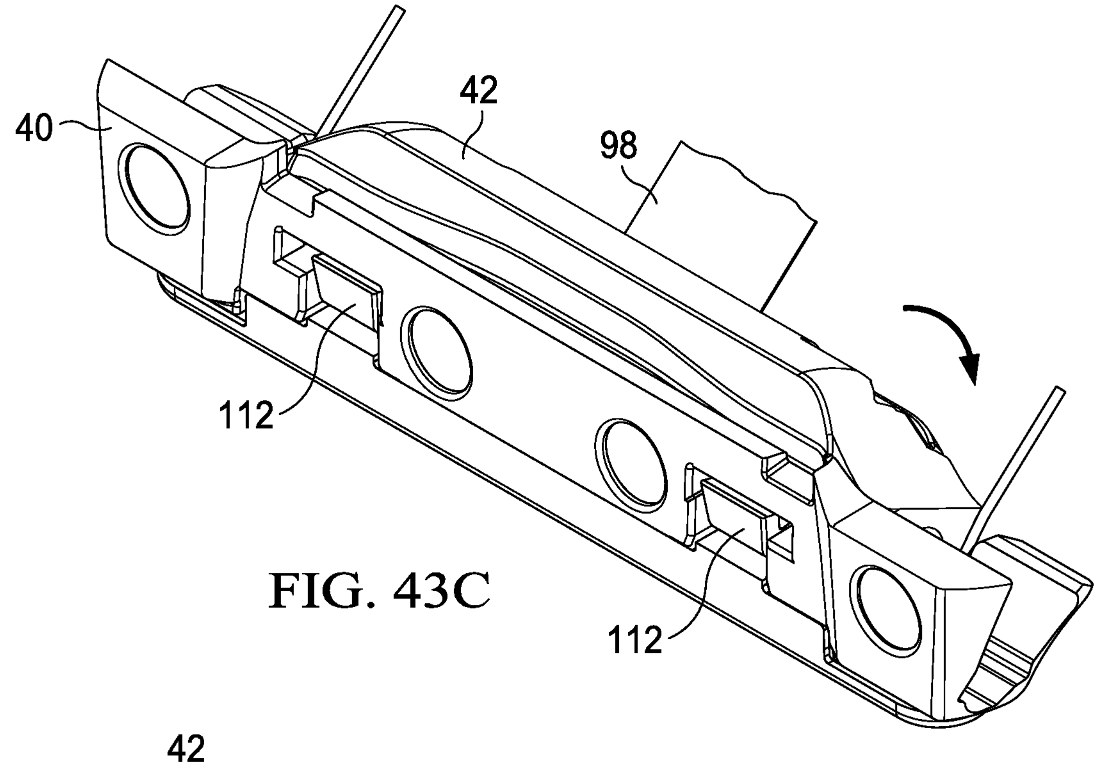
Figure 43D:
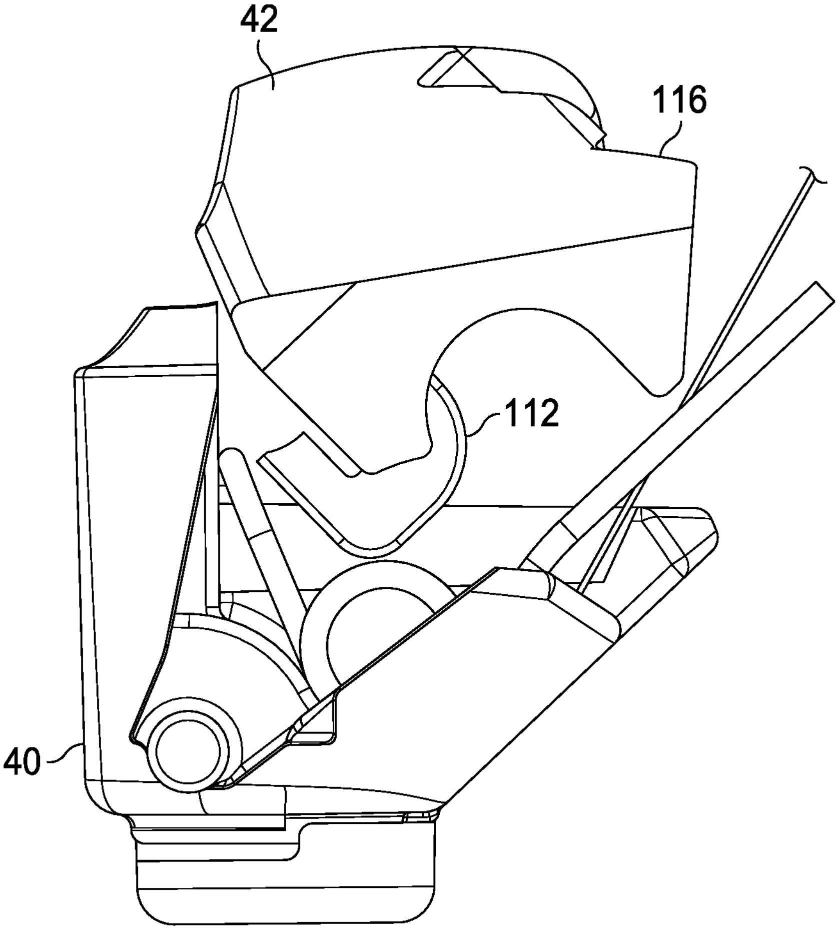
Figure 43E:
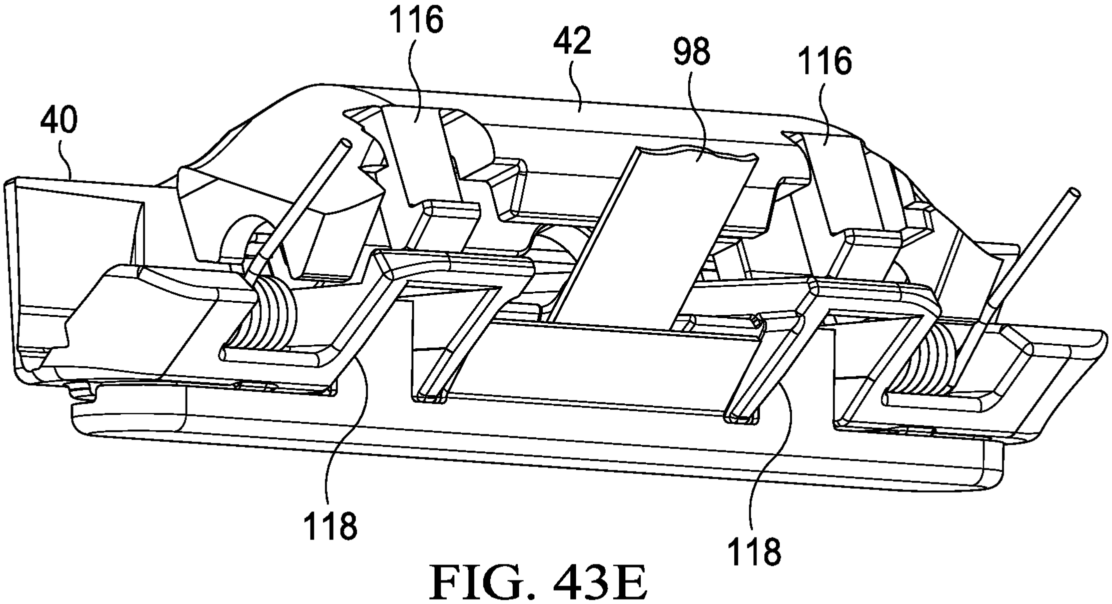
Figure 43F:
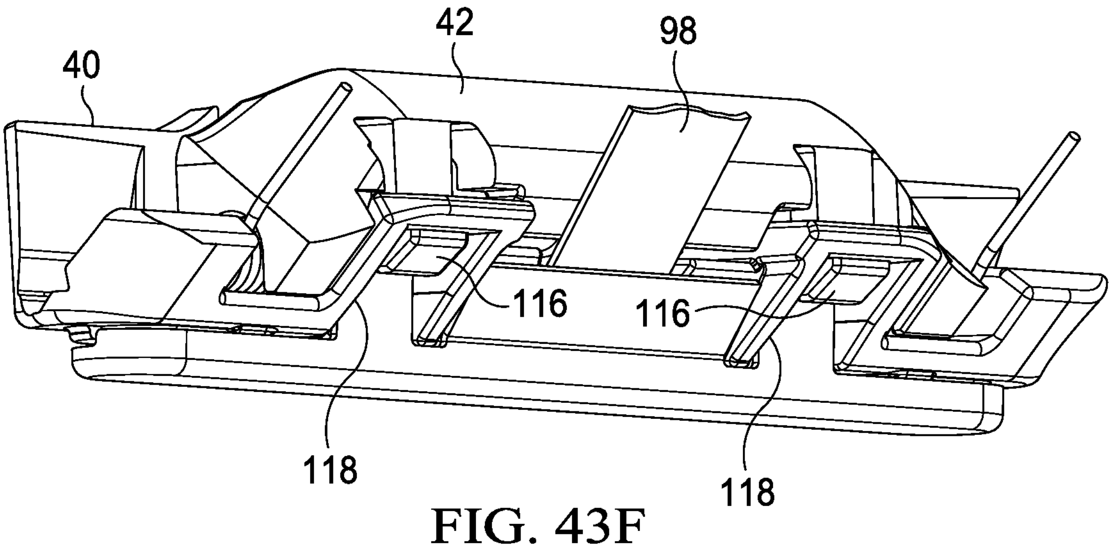

Once cover member 40 is placed on top of the layered members in an on trough 104, faceplate 102 can be secured to the cover member 40 via tabs 108 as shown in the assembly view of FIG. 41 A-D. As shown, one or more tabs 108, including a pair of tabs labeled 1 and 2 in FIG. 41A and 3 and 4 in FIG. 41B, can be folded into receiving openings 111 on cover member 40, as shown in the cross-sectional perspective assembly view of FIG. 41C and 41D. As described with respect to FIG. 42, spring member 64 as described above, can be placed in cover member 40 and seated in corresponding form-fitting recesses, including a channel 87, of cover member 40. Finally, base member 42 can be connected to cover member in a sequence described with respect to the assembly view of FIG. 43 A-F. As shown in FIG. 43A-C, one or more first latching members 112 on base member 42 can be placed into and hooked into one or more first latch receiving portions 114 of cover member 40, and, as shown in FIG. 43 C-F, base member 42 can be rotated and pressed onto cover member 40 such that one or more second latching members 116 can be snapped into cooperating second latch receiving portions 118.

Figure 44:
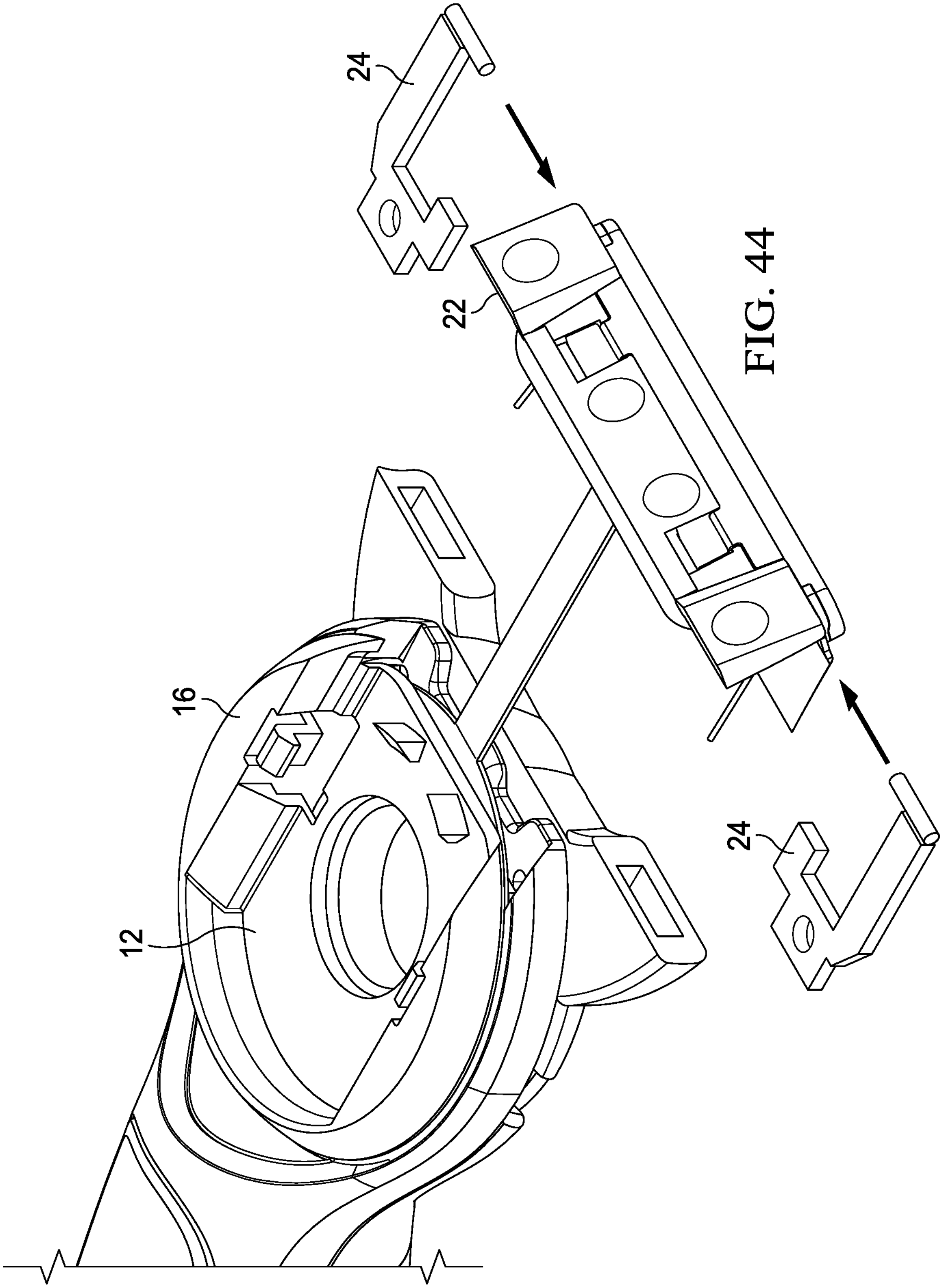
FIG. 44 is schematic perspective assembly view of a portion of a pivoting head in accordance with an embodiment of the invention.
Figure 45:
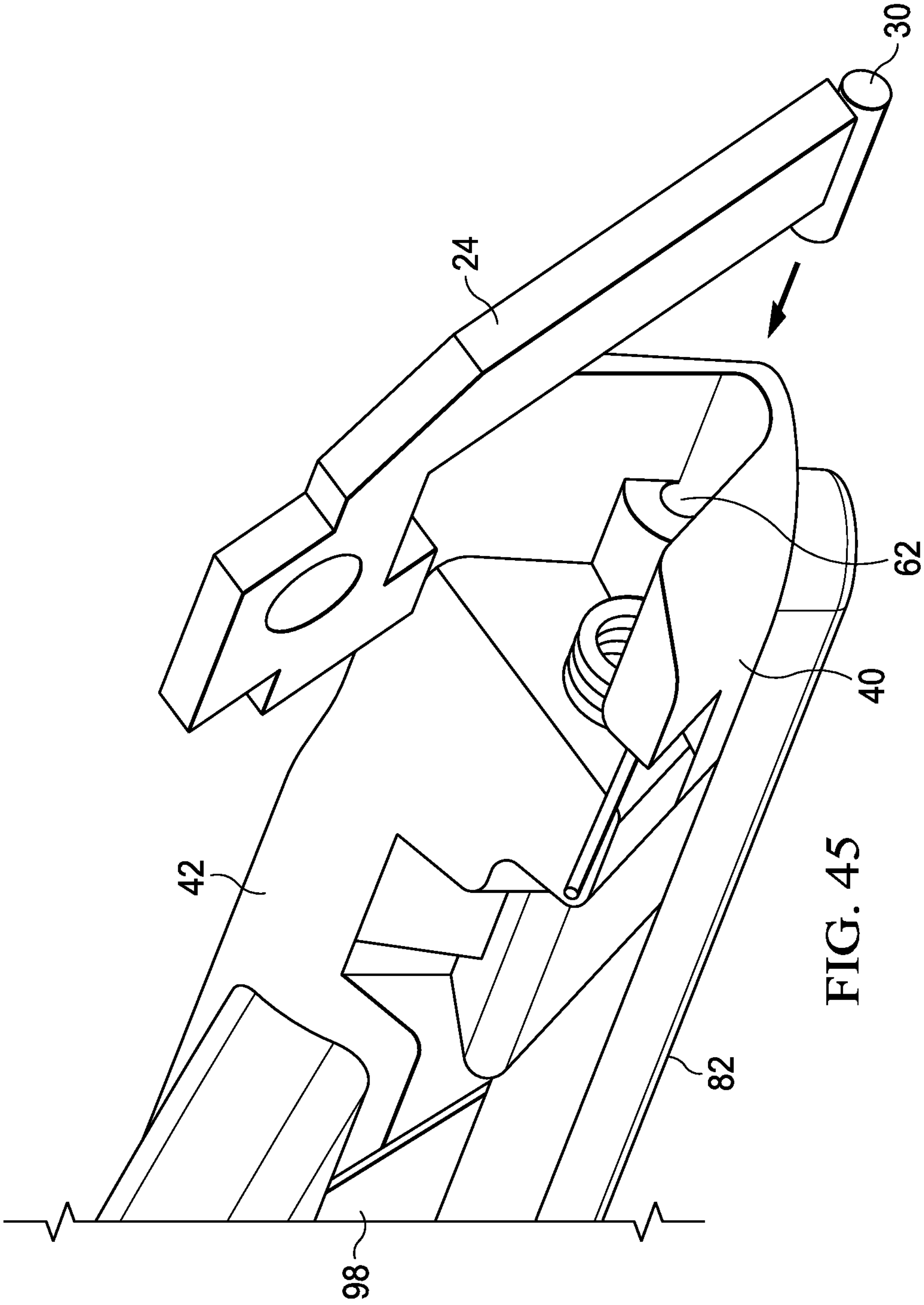
FIG. 45 is schematic perspective assembly view of a portion of a pivoting head in accordance with an embodiment of the invention.
Figure 46:
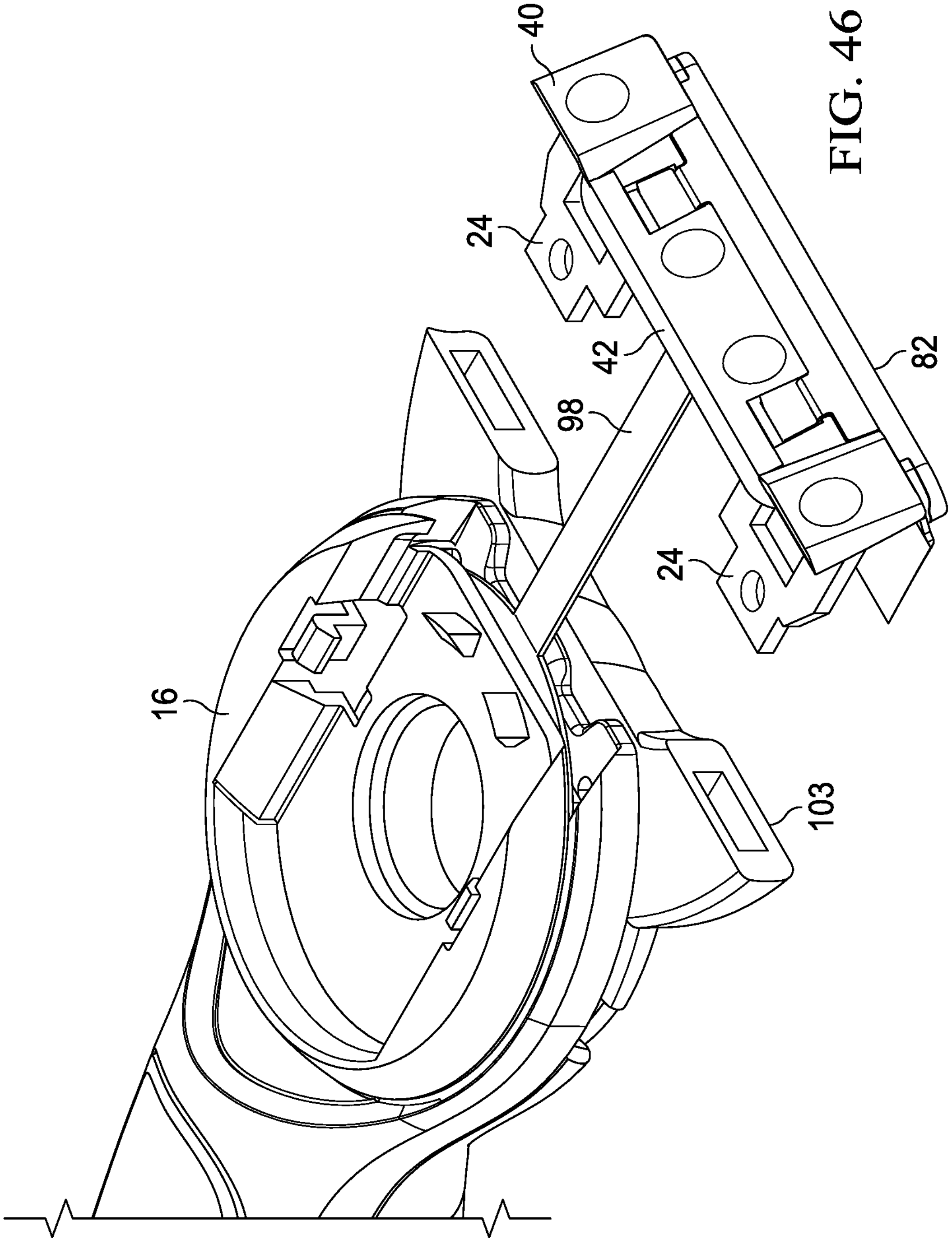
FIG. 46 is schematic perspective assembly view of a portion of a pivoting head in accordance with an embodiment of the invention.
Figure 47:
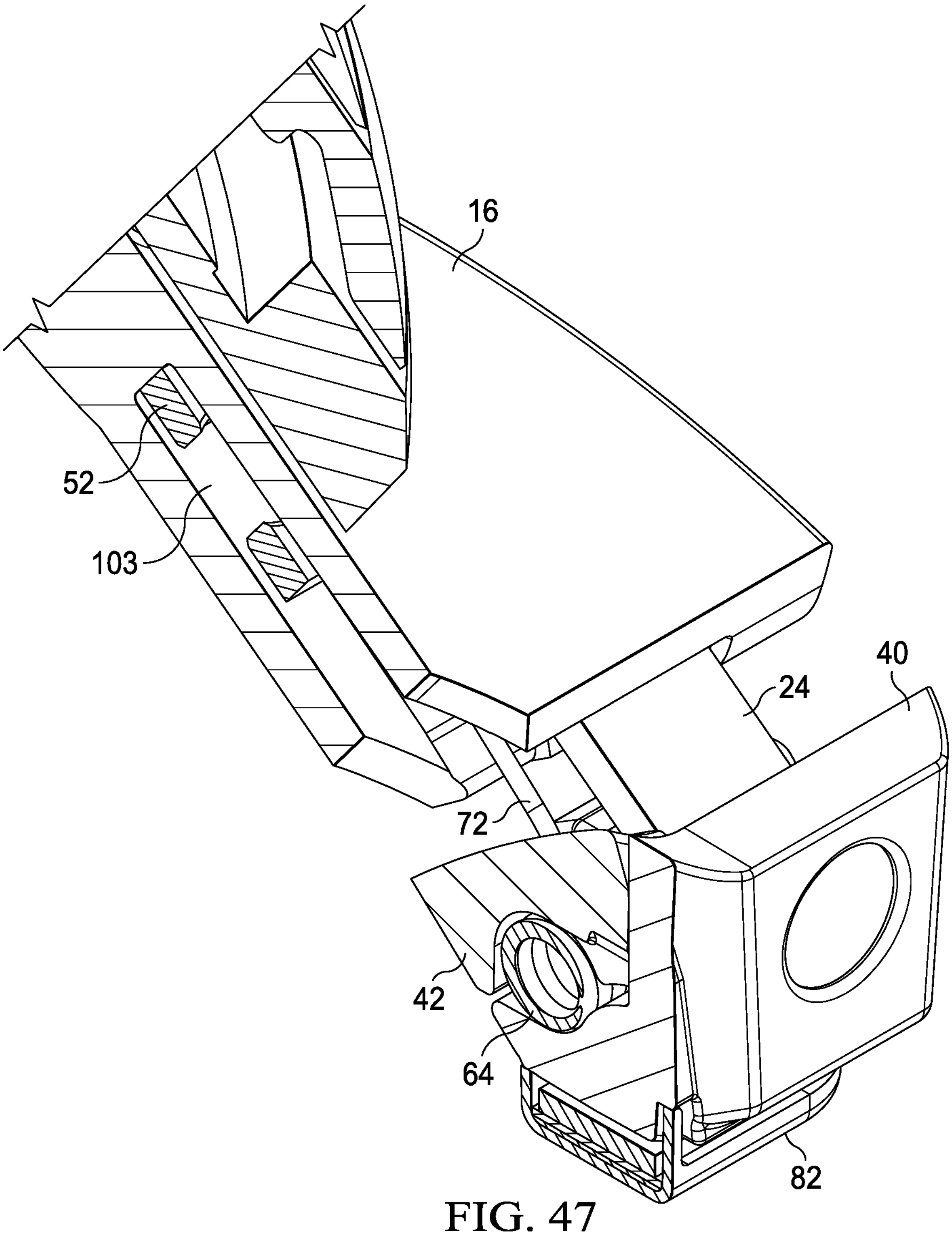
FIG. 47 is schematic perspective cut away view of a portion of a pivoting head in accordance with an embodiment of the invention.
Figure 48:
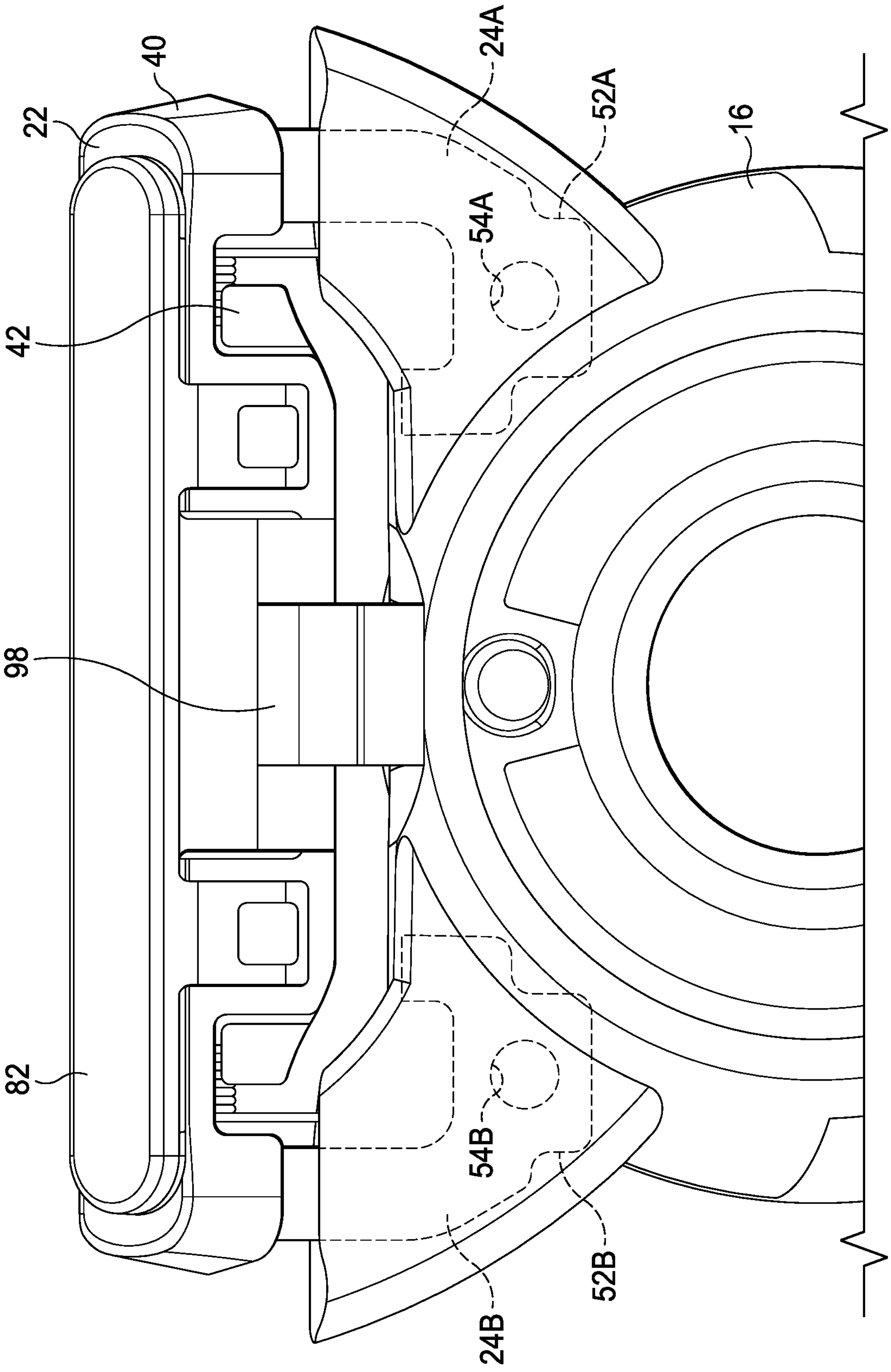
FIG. 48 is schematic perspective view of a portion of a pivoting head in accordance with an embodiment of the invention.
Figure 49:
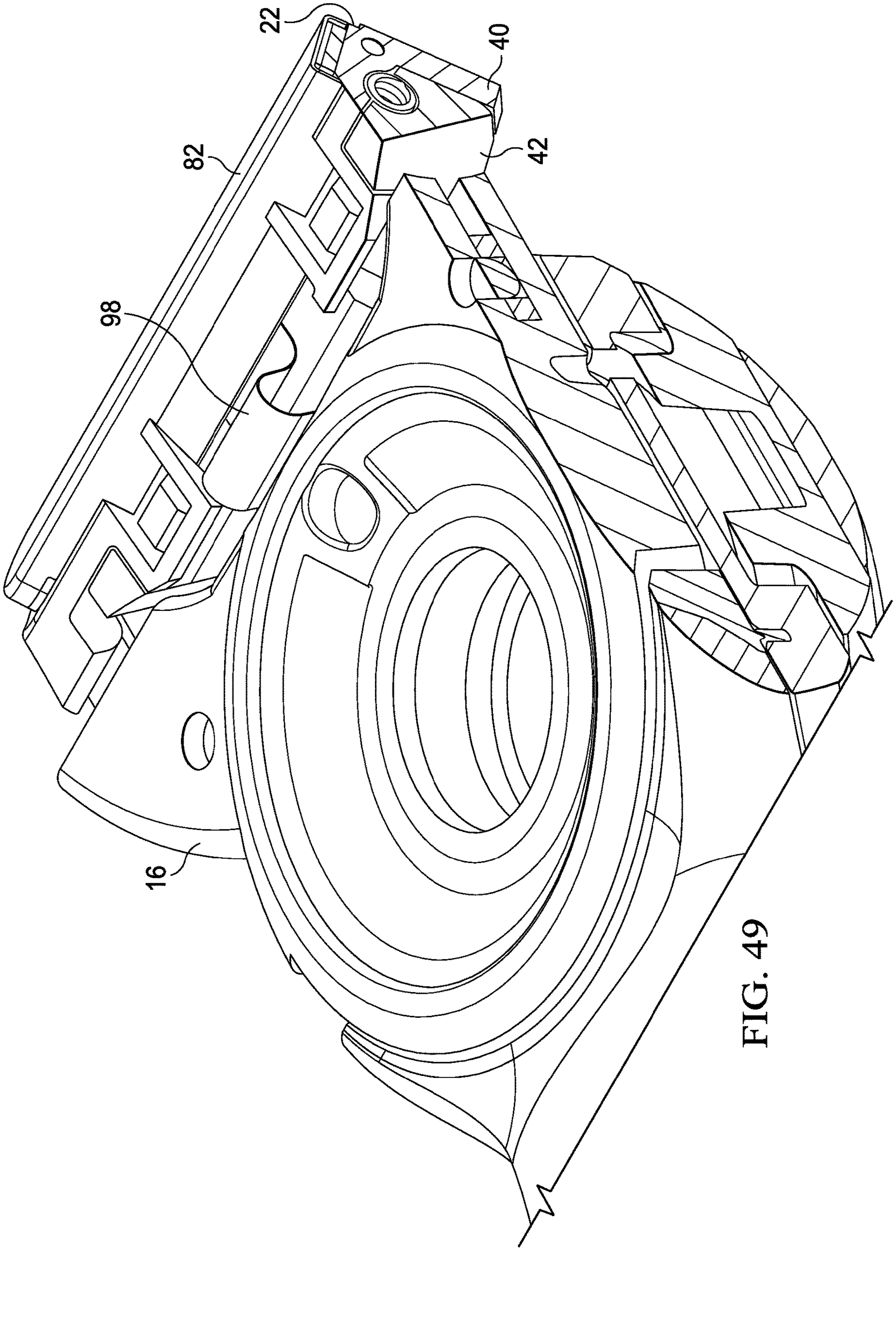
FIG. 49 is schematic perspective assembly view of a portion of a pivoting head in accordance with an embodiment of the invention.

Once base member 40 is securely snapped into place on cover member 42, the illustrated embodiment of pivoting head 22 is ready to be coupled to handle 12. As shown in FIGS. 44 and 45 arms 24 can be inserted in the direction of the arrows into the bearing recess 62 of cover member 40 by sliding pins 30 into the bearing recesses 62, as described above. As shown in FIG. 46, arms 24 can then be inserted in the direction of arrows into slots 103 of main body 16. As shown in the cut away perspective view of FIG. 47, a slot 103 is shown having disposed therein the proximal portion of arm 24 as well as a leg extension 72 of spring member 64. Once arms 24 are in place into slots 103 and in place as shown in FIG. 48, portions of main body 16 can be cold stamped in the direction of the arrows to secure arms 24 to main body 16 of handle 12. As shown in the partial cut away perspective view of FIG. 49, portions of the main body 16 corresponding to openings 54 of arms 24 can be permanently plastically deformed by pressing into the openings 54. This operation, known as cold stamping or cold staking, permits secure coupling of arms 24, and therefore, pivoting head 22, to main body 16 (and, therefore, handle 12).

As disclosed above, pivoting head 22 can be pivoted about a pivot axis, i.e., axis of rotation 26 under the biasing force of a spring member 64. However, other pivot mechanisms can be employed for both the first axis of rotation 26 and secondary axis of rotation 27. In general, pivoting head 22 can be in pivotal relation to the handle 12 via, for example, a spring, a joint, a hinge, a bearing, or any other suitable connection that enables the pivoting head to be in pivotal relation to the handle. The pivoting head may be in pivotal relation to the handle 12 via mechanisms that contain one or more springs and one or more sliding contact bearings, such as a pin pivot, a shell bearing, a linkage, a revolute joint, a revolute hinge, a prismatic slider, a prismatic joint, a cylindrical joint, a spherical joint, a ball-and-socket joint, a planar joint, a slot joint, a reduced slot joint, or any other suitable joint, or one or more springs and one or more rolling element bearings, such as a ball bearing, a cylindrical pin bearing, or rolling element thrust bearing. Sliding contact bearings can typically have friction levels of 0.1 to 0.3. Rolling element bearings can typically have friction of 0.001 to 0.01. Lower friction bearings are preferred the further a pivot mechanism is offset from its axis of rotation to assure smooth motion and prevent the bearing from sticking.

Typically, pivot mechanisms about first axis of rotation 26 allow rotational motions ranging from about 0 degrees from the cartridge rest position to about 50 degrees. A rotational stiffness for a pivot mechanism about first axis of rotation 26 may be measured by deflecting the pivot 25 degrees about the first axis of rotation 26 and measuring the required torque about this first axis of rotation 26 to maintain this position. The torque levels at 50 degrees of rotation can be generally less than 20 N-mm. The rotational stiffness (torque measured about the axis of rotation divided by degrees of angular rotation) associated with the first axis of rotation 26 can be generally less than 0.3 N-mm per degree of rotation and preferably between 0.05 N-mm per degree of rotation and 0.18 N-m per degree of rotation.

Typically, additional pivot mechanisms about secondary axis of rotation 27 (shown in FIGS. 1 and 4) allow rotational motions ranging from −12.5 degrees to +12.5 degrees. A rotational stiffness for a pivot mechanism about secondary axis of rotation may be measured by deflecting the pivot −5 degrees and +5 degrees about secondary axis of rotation 27 and measuring the required torques about the secondary axis of rotation to maintain this position. The rotational stiffness may be calculated by dividing the absolute value of the difference in these measured torques by the 10 degrees difference in angular motion. The rotational stiffness associated with pivot mechanisms about secondary axis of rotation 27 generally range from about 0.8 to about 2.5 N-mm per degree of rotation.

As disclosed above, components of the pivoting head 22 and the pivoting mechanism that enable rotation about first axis of rotation 26 for the embodiments were shown in detail. The handle 12 was connected to the pivoting head 22 by a pair of arms 24, a spring member 26, and a benefit pivot delivery connection. In the embodiments disclosed above, the spring member can be comprised of a metal. But the spring member 64 can also be comprised of a stress-relaxation resistant material such as a metal, polyetheretherketone, or silicone rubber, all of which can prevent the razor 10 or razor handle 12 from taking a "set," or permanently deforming at deflected angle when the razor 10 or razor handle 12 is stored improperly due to the stress relaxation of the components that connect the pivoting head 22 to the proximal end of the handle.

The benefit pivot delivery connection can be a connection through which a skin deliver benefit component passes from the handle 12 to the pivoting head 22 to deliver a skin benefit through the cartridge 15 to the skin interfacing face 80. As discussed below, a fluid benefit delivery member 76 and a heat delivery member 96 can be configured so as to facilitate proper pivoting of the pivoting head about first axis of rotation 26 and secondary axis of rotation 27.

Figure 50:
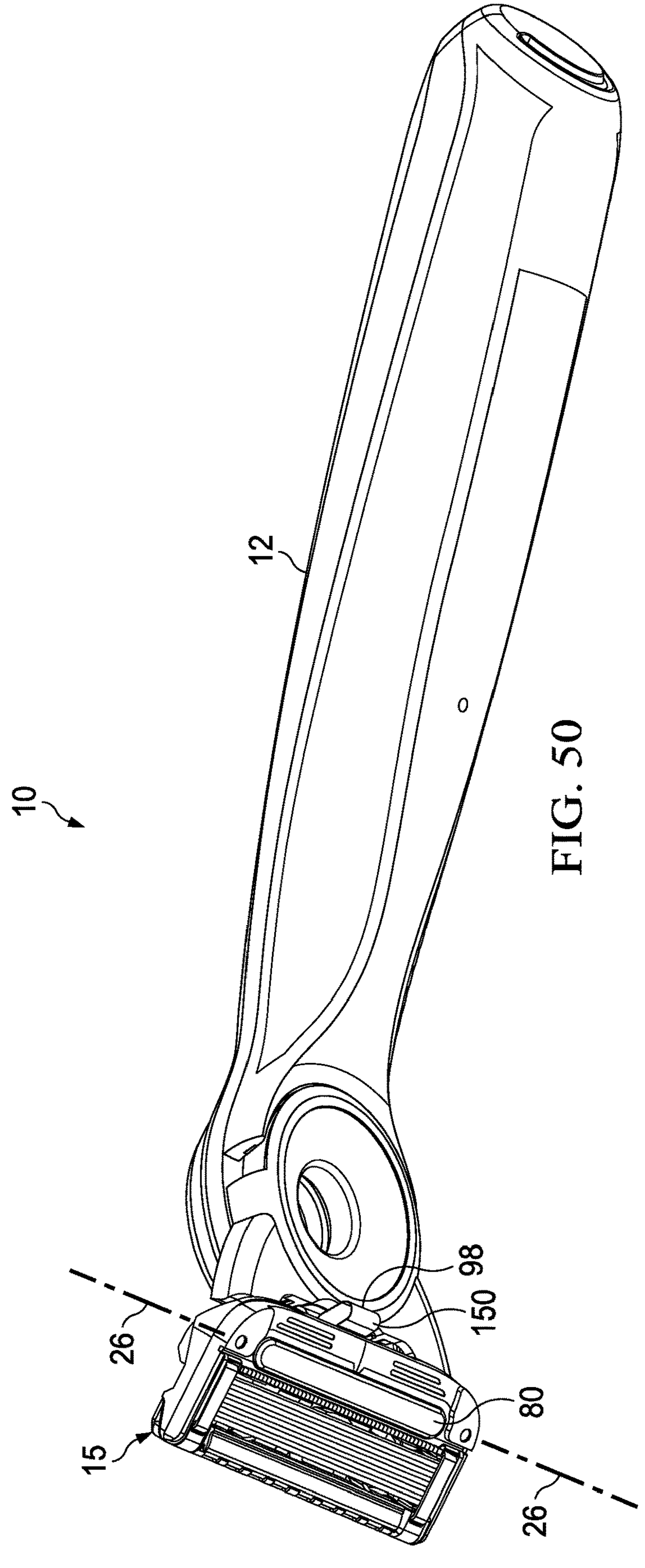
FIG. 50 is a perspective view of a razor handle in accordance with an embodiment of the invention.
Figure 51:
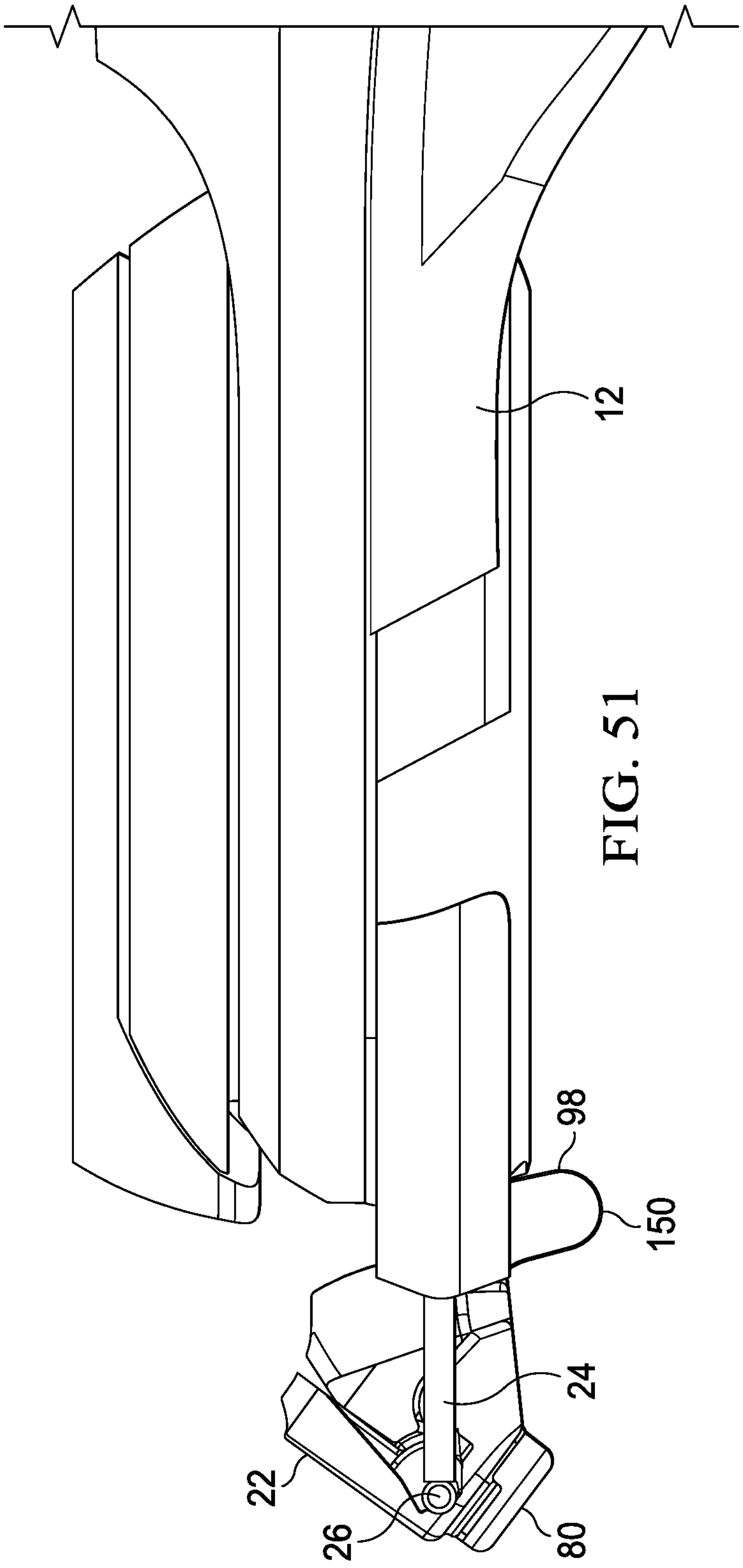
FIG. 51 is a partial side view of a razor handle in accordance with an embodiment of the invention.

Referring to FIG. 50, a razor 10 is shown in which the flexible conductive strip 98 of heat delivery member 96 bridges a gap between the handle 12 and the pivoting head onto which is attached a blade cartridge 15. As shown in FIG. 50, and in more detail in FIG. 51, the flexible conductive strip 98 is longer than the distance to be traversed between the handle 12 and the pivoting head 22, resulting in a loop 150 of the flexible conductive strip 98. This loop 150, which can be generally U-shaped or S-shaped, can minimize the effect of the flexible conductive strip 98 on the biasing torque force required to pivot the pivoting head 22 about the first axis of rotation 26. In general, this loop 150 of the benefit delivery member contributes to a ratio of biasing torque provided by the sum of the benefit member and the spring member 64, and the biasing torque provided by the spring member alone, which torque ration is discussed in more detail below.

Figure 52:
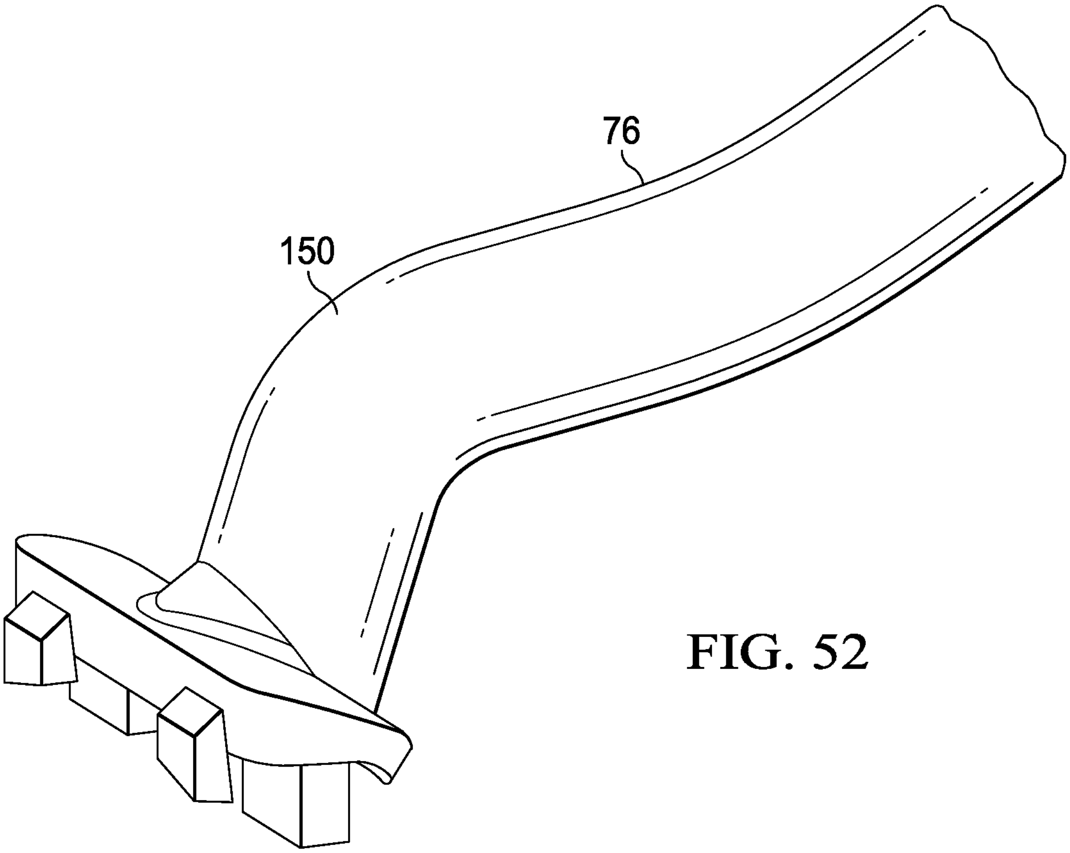
FIG. 52 is a perspective view of a portion of a fluid benefit delivery member in accordance with an embodiment of the invention.
Figure 53:
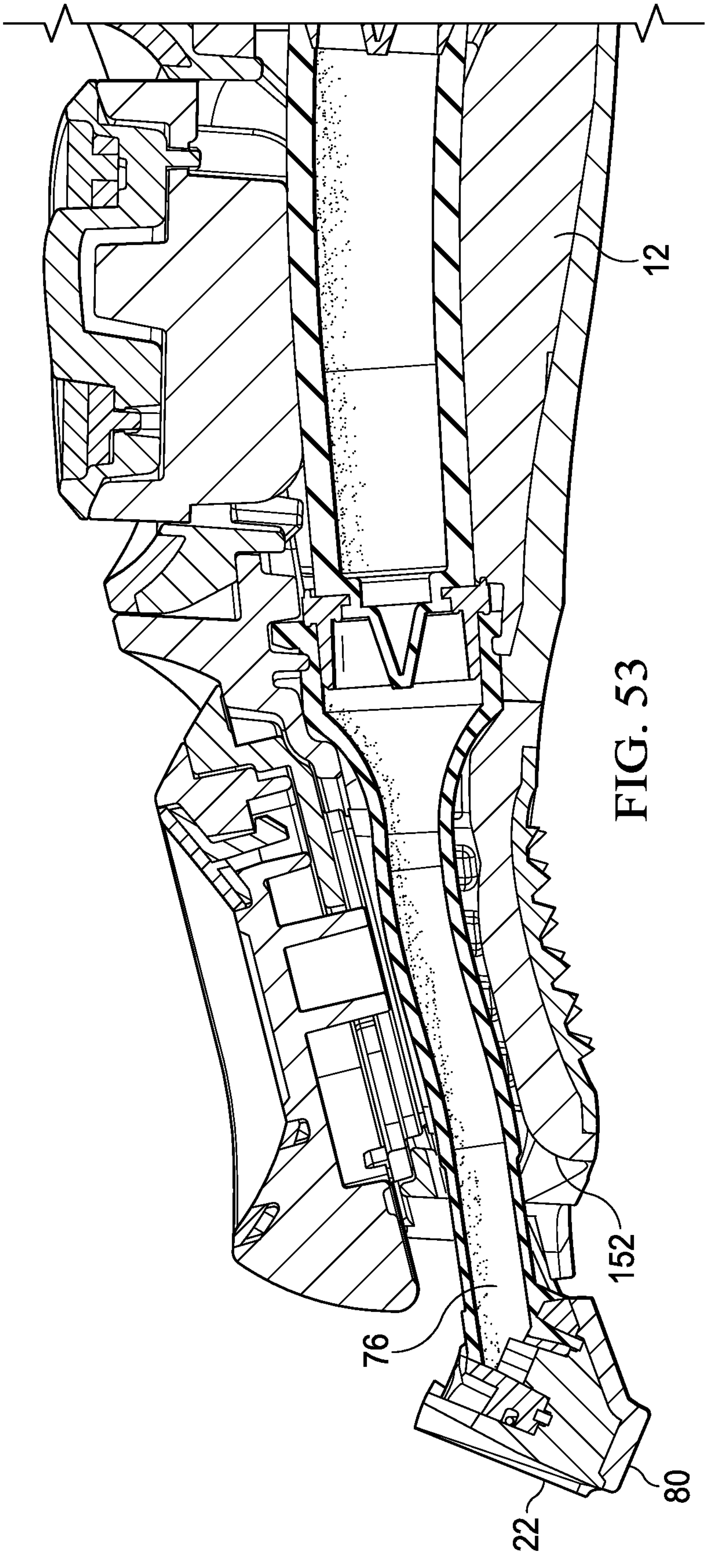
FIG. 53 is a cut away view of a portion of a razor handle showing a fillet radius in accordance with an embodiment of the invention.

In like manner, as depicted in FIG. 52, a fluid delivery benefit member, such as a flexible plastic tube, can also have a loop 150 portion such that excess length of the flexible tube allows for minimizing the effect of the fluid benefit delivery member 76 on the biasing torque force required to pivot the pivoting head 22 about the first axis of rotation 26. In an embodiment, the installed length of fluid benefit delivery member 76, as shown in FIG. 53 can be from 1 mm to 3 mm less than the free length of the fluid benefit delivery member 76. This forced compression contributes to the loop 150 portion and has been found to aid in further minimizing the effect of the fluid benefit delivery member 76 on the biasing torque force required to pivot the pivoting head 22 about the first axis of rotation 26.

Additional features found to further minimizing the effect of the fluid benefit delivery member 76 on the biasing torque force required to pivot the pivoting head 22 about the first axis of rotation 26 can be understood with reference to FIGS. 53-61. In FIG. 53, a portion of handle 12 at the location where fluid delivery member exits the handle 12 and begins to traverse the distance to the pivoting head, a fillet radius of curvature 152 of from between about 1 mm and about 5 mm is provided. The radius of curvature can be understood to reduce the stress applied to the surface of the fluid delivery member at the point of bending due to the pivoting of pivoting head 22 during use.

Figure 54:
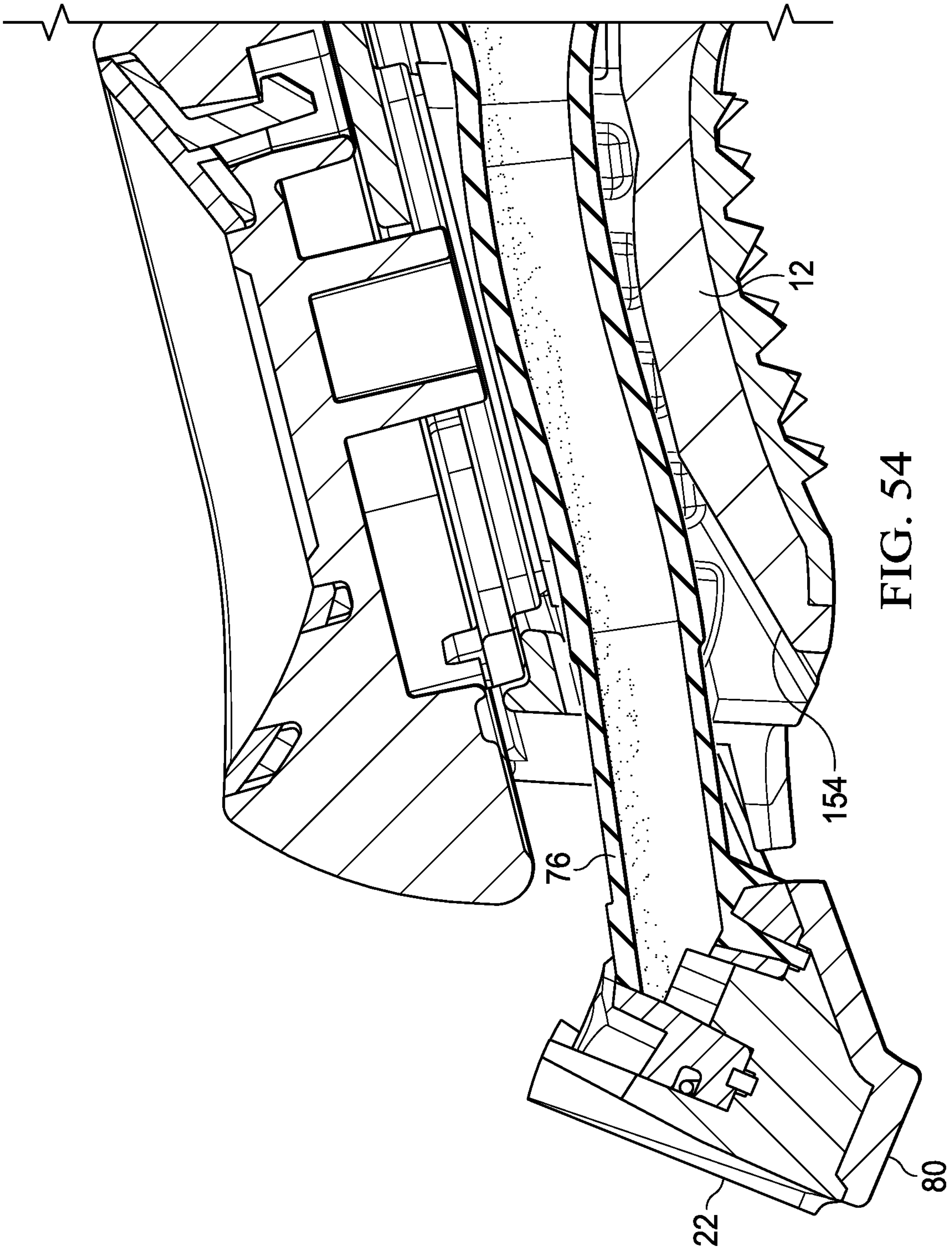
FIG. 54 is a cut away view of a portion of a razor handle showing a chamfer in accordance with an embodiment of the invention.

In a similar manner, as shown in FIG. 54, at a portion of handle 12 at the location where fluid delivery member exits the handle 12 and begins to traverse the distance to the pivoting head, a chamfer 154 is provided, as shown. The chamfer can have a chamfer angle of about 5 degrees to about 30 degrees at the proximal end of the handle, and can have a chamfer length of about 3 mm to about 15 mm. Like the radius of curvature 152, the chamfer 154 is believed to reduce the stress applied to the surface of the fluid delivery member at the point of bending due to the pivoting of pivoting head 22 during use.

Figure 54A:
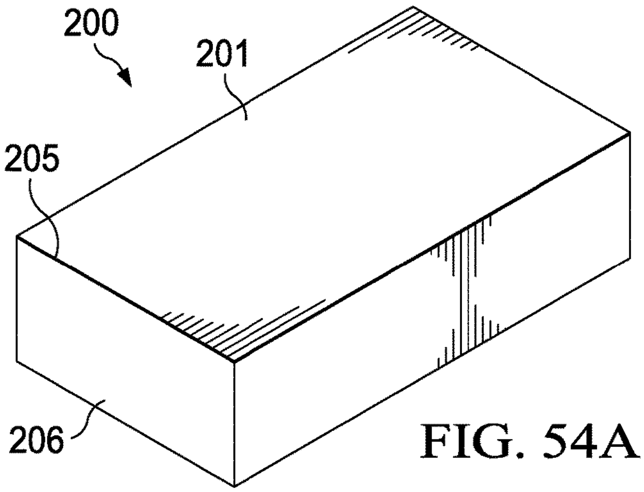
FIG. 54A-C is a schematic perspective view of the geometry of a chamfer as shown in FIG. 54.
Figure 54B:
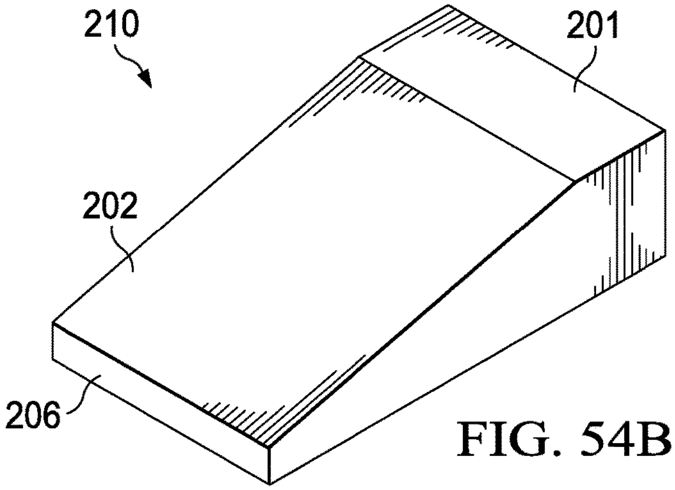
Figure 54C:
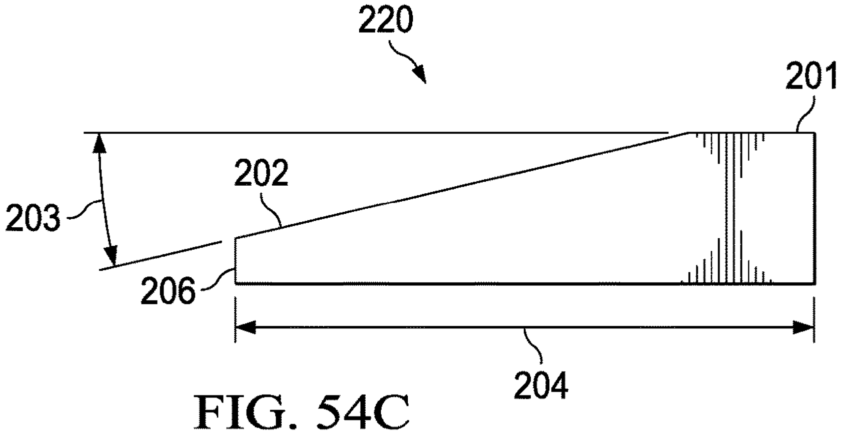

The dimensions of a chamfer can be defined as shown in the view of FIG. 54A-C. In view 200, a block 201 is shown with an edge 205 to be chamfered and a front face 206. In view 210, block 201 is shown after edge 205 has been chamfered creating chamfer 202. In view 220, chamfer 202 is shown having a chamfer length 204 and a chamfer angle 203. In general, the torque associated with a pivot benefit delivery member can be reduced by cutout in the surrounding structure of the pivoting benefit delivery member that is a chamfer with a chamber angle between about 5 degrees and 30 degrees and chamfer length from 3 mm to 15 mm.

Figure 55:
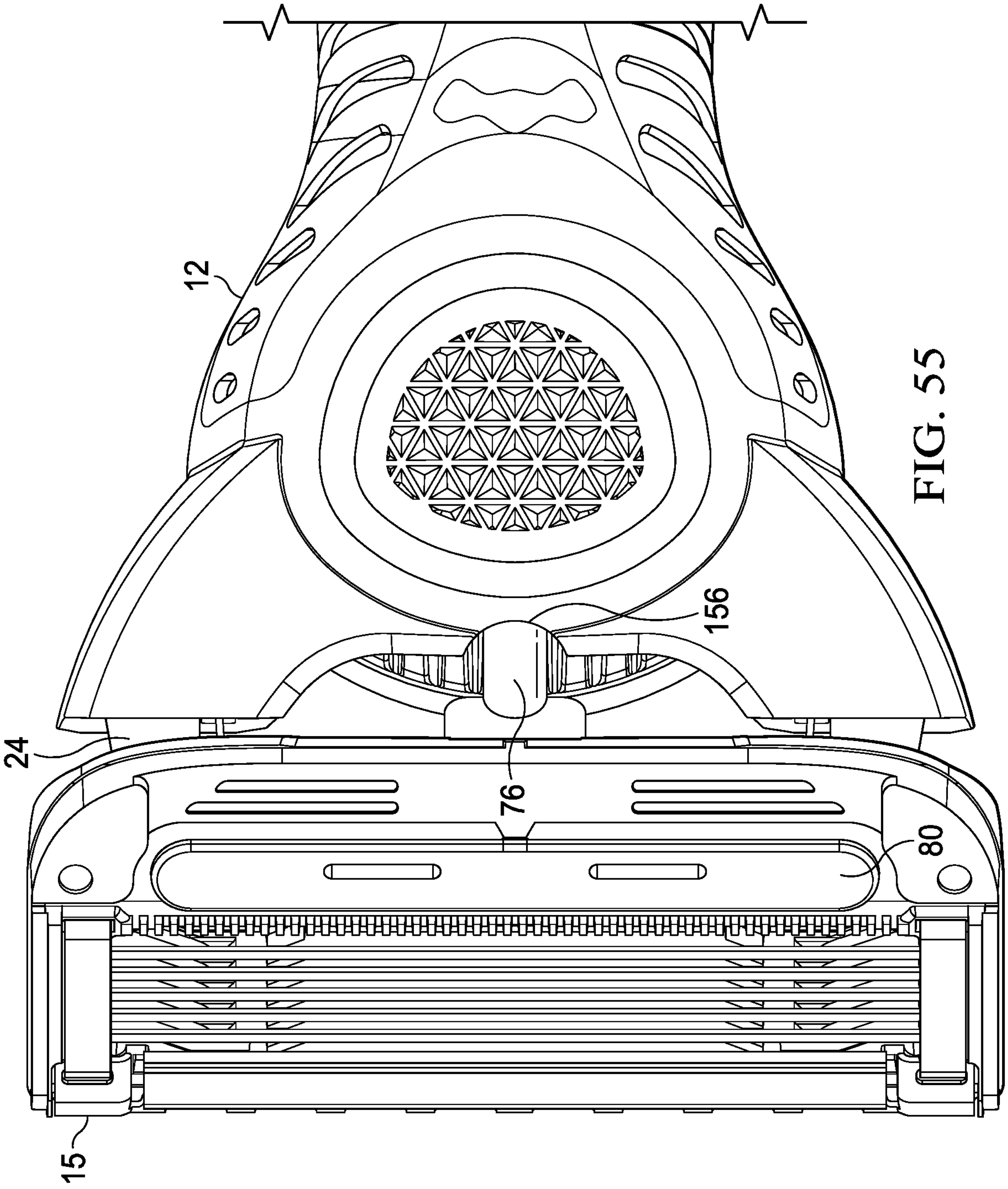
FIG. 55 is a plan view of a portion of a razor handle showing a slot in accordance with an embodiment of the invention.

Further, an additional feature found to minimize the effect of the fluid benefit delivery member 76 on the biasing torque force required to pivot the pivoting head 22 about the first axis of rotation 26 can be understood from FIG. 55 as a slot 156 on the handle 12 at the location of the exit of the fluid benefit delivery member 76. In an embodiment, the slot can have a width measured generally parallel to the axis of rotation 26 of about 3 mm to about 10 mm, and a length measured perpendicular to the width of from about 2 mm to about 15 mm.

Figure 56:
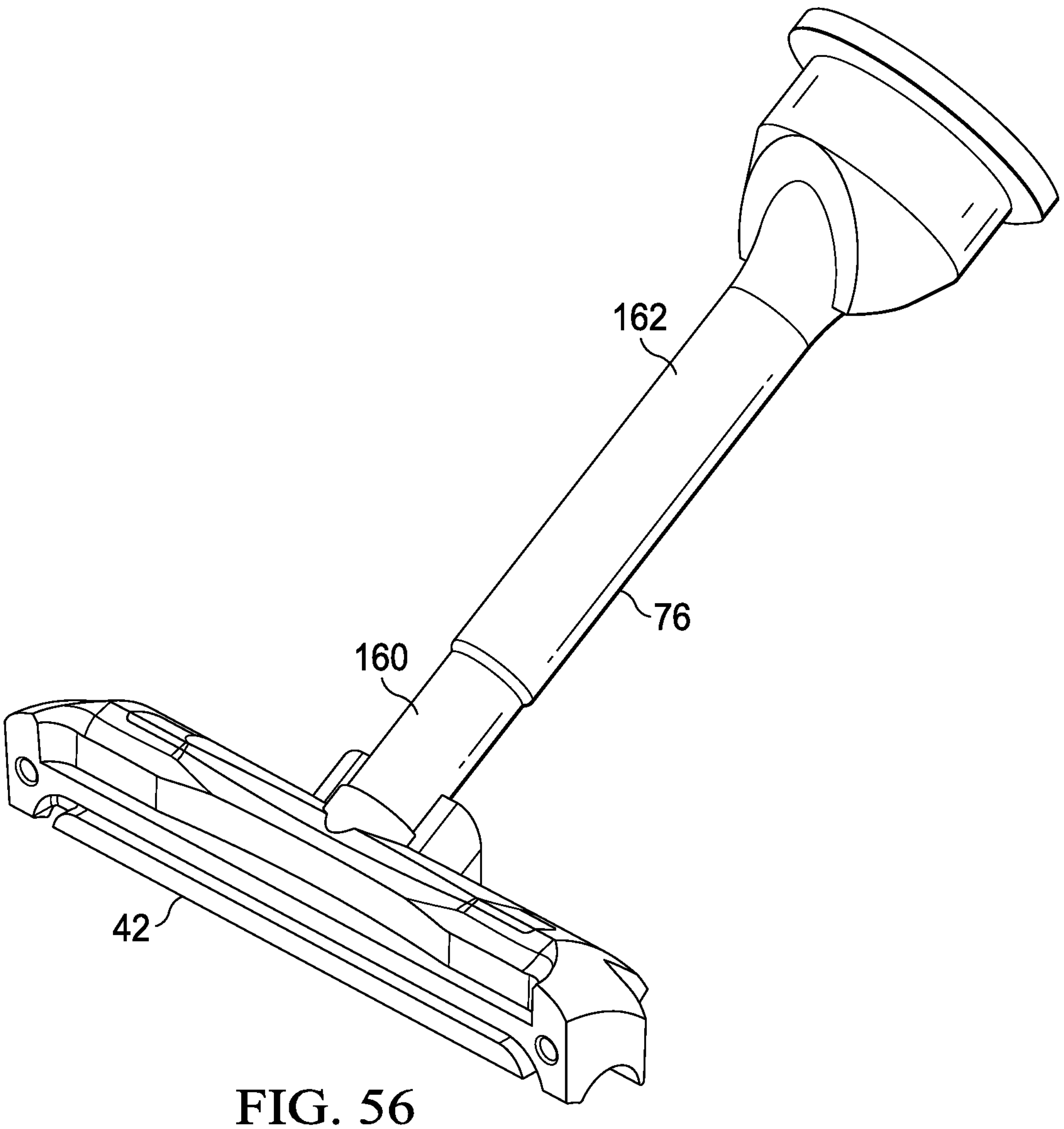
FIG. 56 is a perspective view of a fluid benefit delivery member attached to a portion of a pivoting head in accordance with an embodiment of the invention.

Any of the above described configurations of the fluid delivery member and handle can be combined with any of various configurations of the fluid delivery member itself, as depicted in FIGS. 56-60. For example, as depicted in FIG. 56, fluid benefit delivery member 76, which can be a flexible molded plastic tube, can be configured such that a distal portion 160 has a thinner wall diameter than a proximal portion 162. As shown in FIG. 56, the proximal portion 162 which can be connected in fluid communication with other components in the handle 12 (not shown), can have a diameter and/or wall thickness that provides for durability and greater physical integrity during manufacture and use. However, the distal portion 160 which connects to the cover member 42 of the pivoting head, can comprise a relatively smaller diameter or a relatively thinner wall thickness, thereby providing for greater flexibility and less effect on the biasing torque force required to pivot the pivoting head 22 about the first axis of rotation 26.

Figure 57:
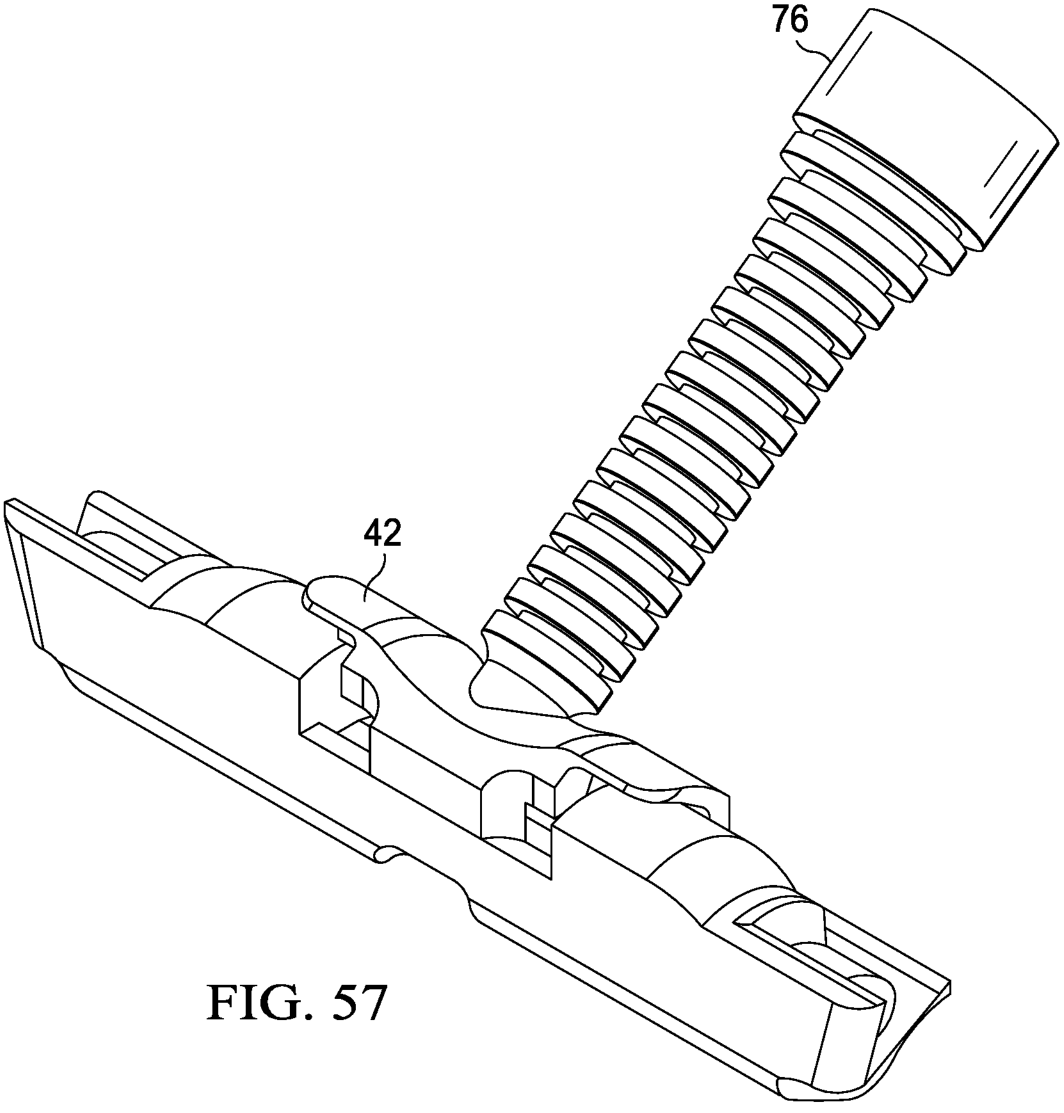
FIG. 57 is a perspective assembly view of a fluid benefit delivery member being attached to a portion of a pivoting head in accordance with an embodiment of the invention.

In FIG. 57, an alternative embodiment of fluid benefit delivery member 76 is shown in which the tube wall of the fluid benefit delivery member 76 is ribbed or corrugated. It is believed that such a design, by permitting much of the wall to be relatively thinner, can, when joined to the base member 42 provide for greater flexibility and less effect on the biasing torque force required to pivot the pivoting head 22 about the first axis of rotation 26.

Figure 58:
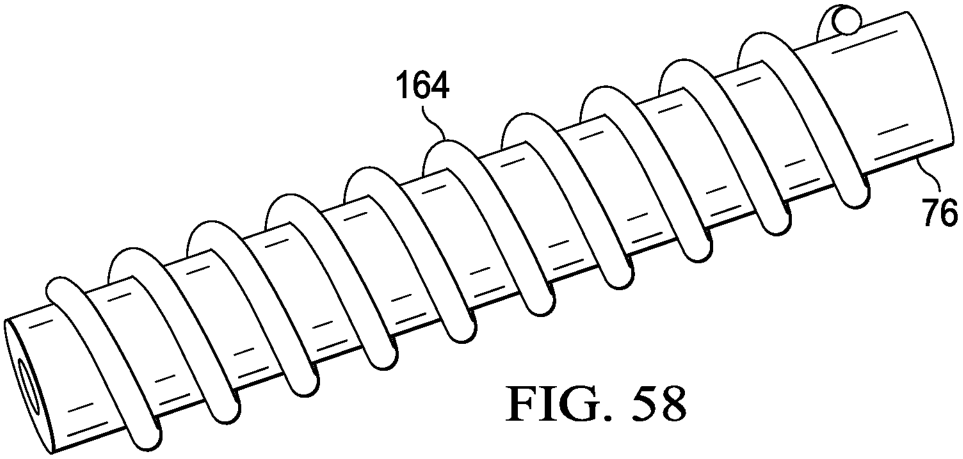
FIG. 58 is a perspective view of a portion of a fluid benefit delivery member in accordance with an embodiment of the invention.
Figure 59:
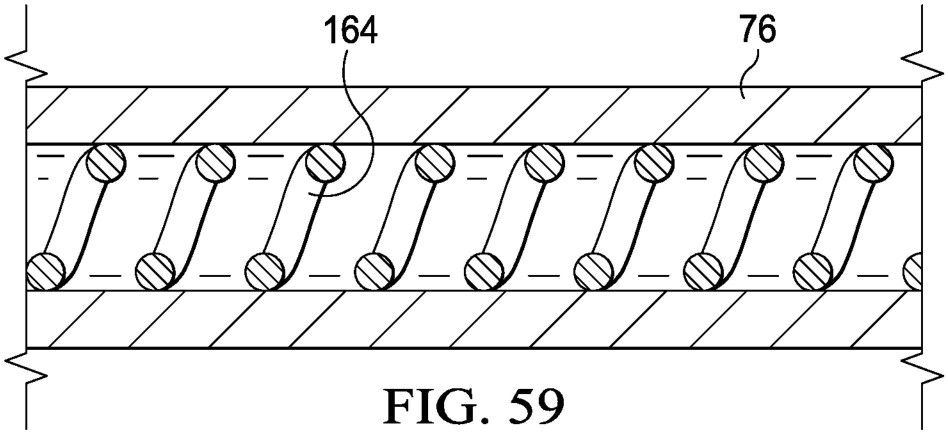
FIG. 59 is a cross sectional view of a portion of a fluid benefit delivery member in accordance with an embodiment of the invention.
Figure 60:
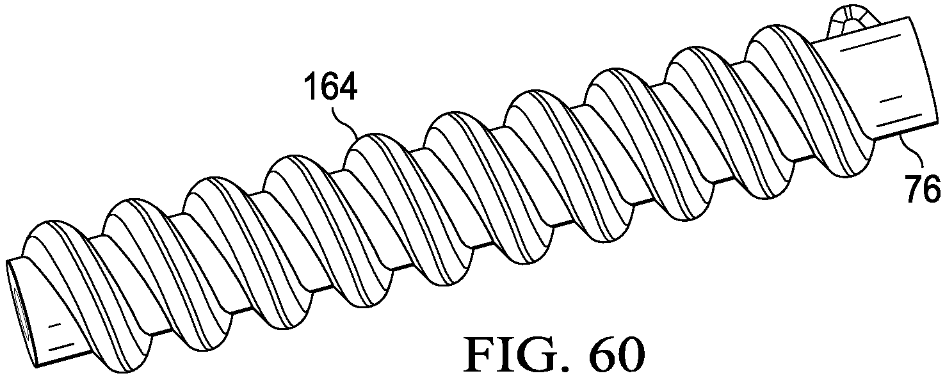
FIG. 60 is a perspective view of a portion of a fluid benefit delivery member in accordance with an embodiment of the invention.

Alternative embodiments of fluid benefit delivery member 76 utilizing coil springs to reinforce strength and provide for flexibility are depicted in FIGS. 58-60. As depicted in FIG. 58, a coil spring 164, which can be made of plastic or metal, can configured about the outside of fluid benefit delivery member 76. As depicted in the cross-sectional view of FIG. 59, a coil spring 164, which can be made of plastic or metal, can configured about the inside of fluid benefit delivery member 76. As depicted in FIG. 60, a coil spring 164, which can be made of plastic or metal, can configured to be molded into the walls of fluid benefit delivery member 76.

Figure 61:
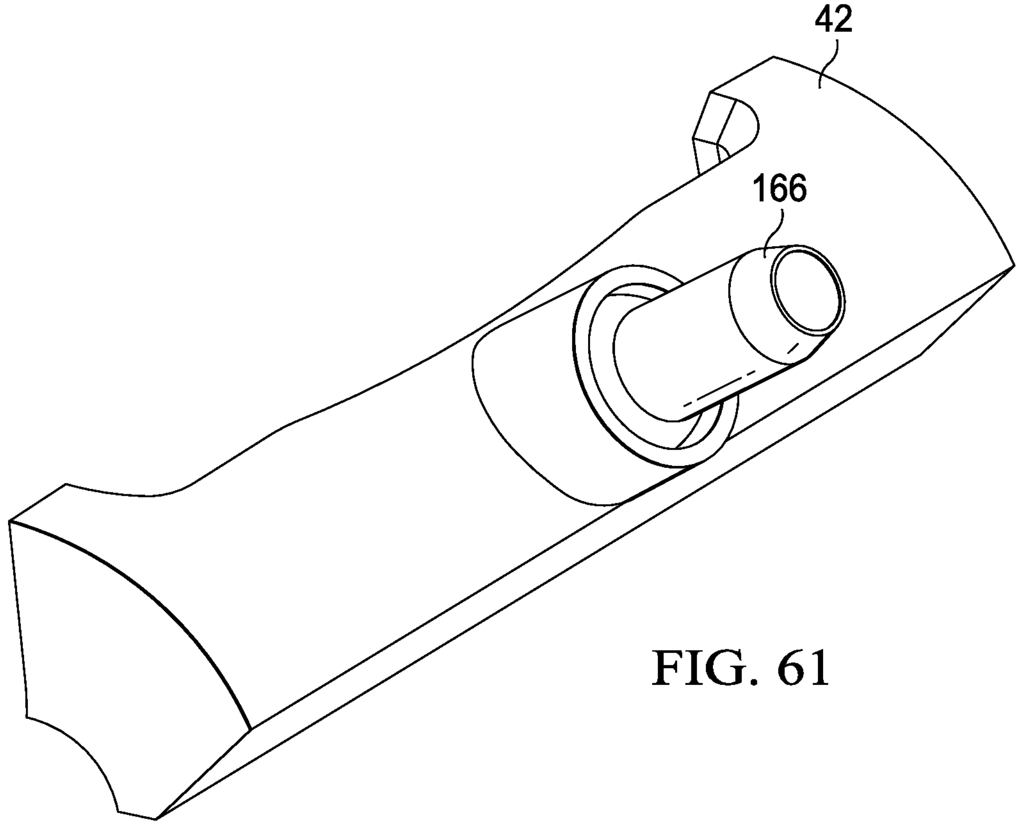
FIG. 61 is a perspective view of a portion of a pivoting head with a connection for a fluid benefit delivery member in accordance with an embodiment of the invention.

FIG. 61 depicts one embodiment of a feature to join fluid deliver member 76 to the base member 42. As shown, a ball and socket joint component 166 can be present on the base member 42. The distal end of a tubular fluid delivery member can be joined by pressing or gluing onto the receiving end of the ball and socket joint component 166.

Figure 62:
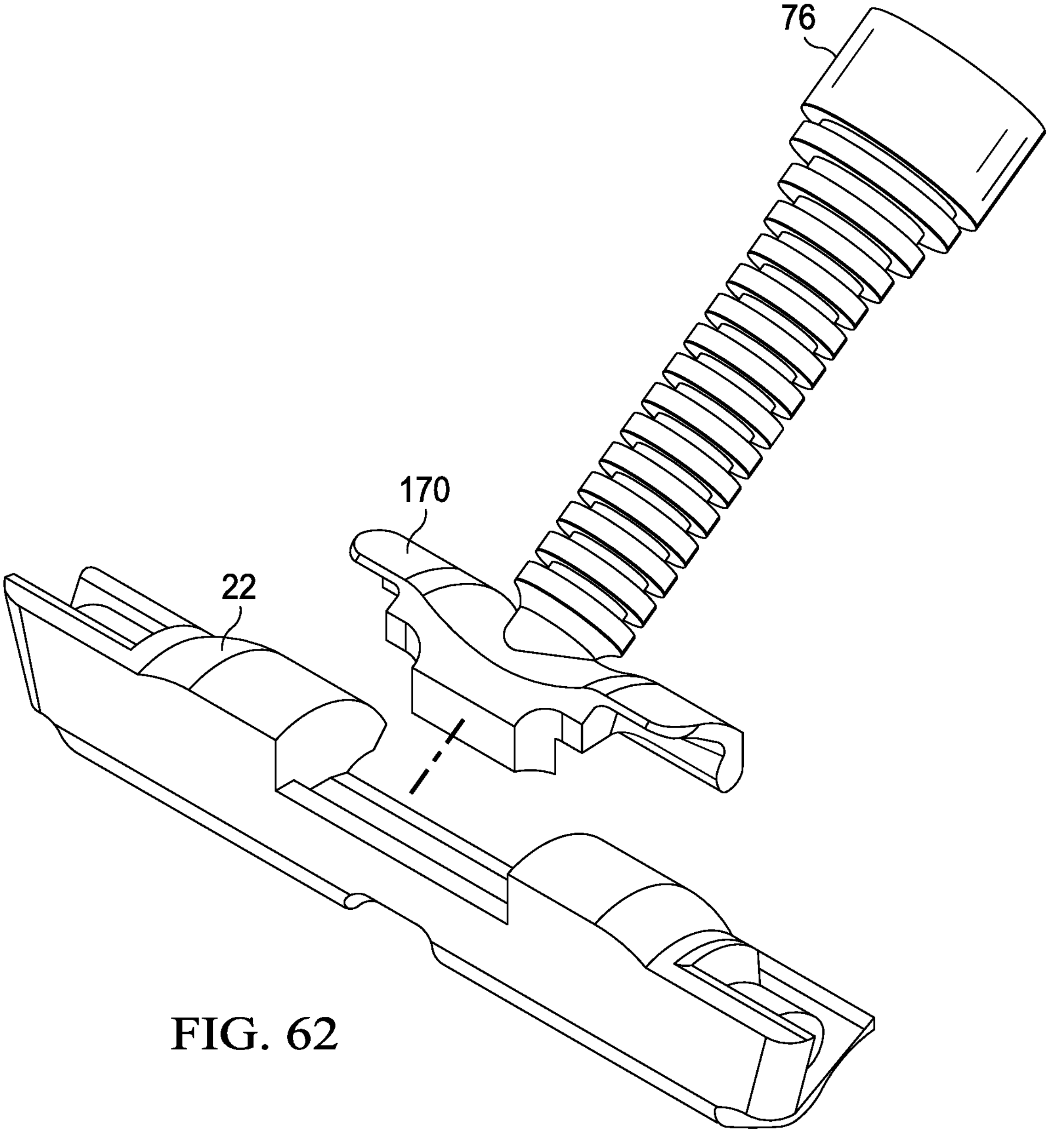
FIG. 62 is a perspective view of a fluid benefit delivery member and a portion of a pivoting head in accordance with an embodiment of the invention.

The joining of the fluid benefit delivery member 76 to the pivoting head 22 can be a two-component embodiment, as shown in FIG. 62. In a two-component embodiment, the fluid benefit delivery member 76 can be molded with an integral pivoting head connection member 170 that can attach to the mating portion of the pivoting head 22 in any suitable manner, such as snap fit, friction fit, adhesive joining, or the like. In this embodiment, a spring member 64 (not shown) can be added externally to the pivoting head 22 to provide for a biasing force on pivoting head.

Figure 63:
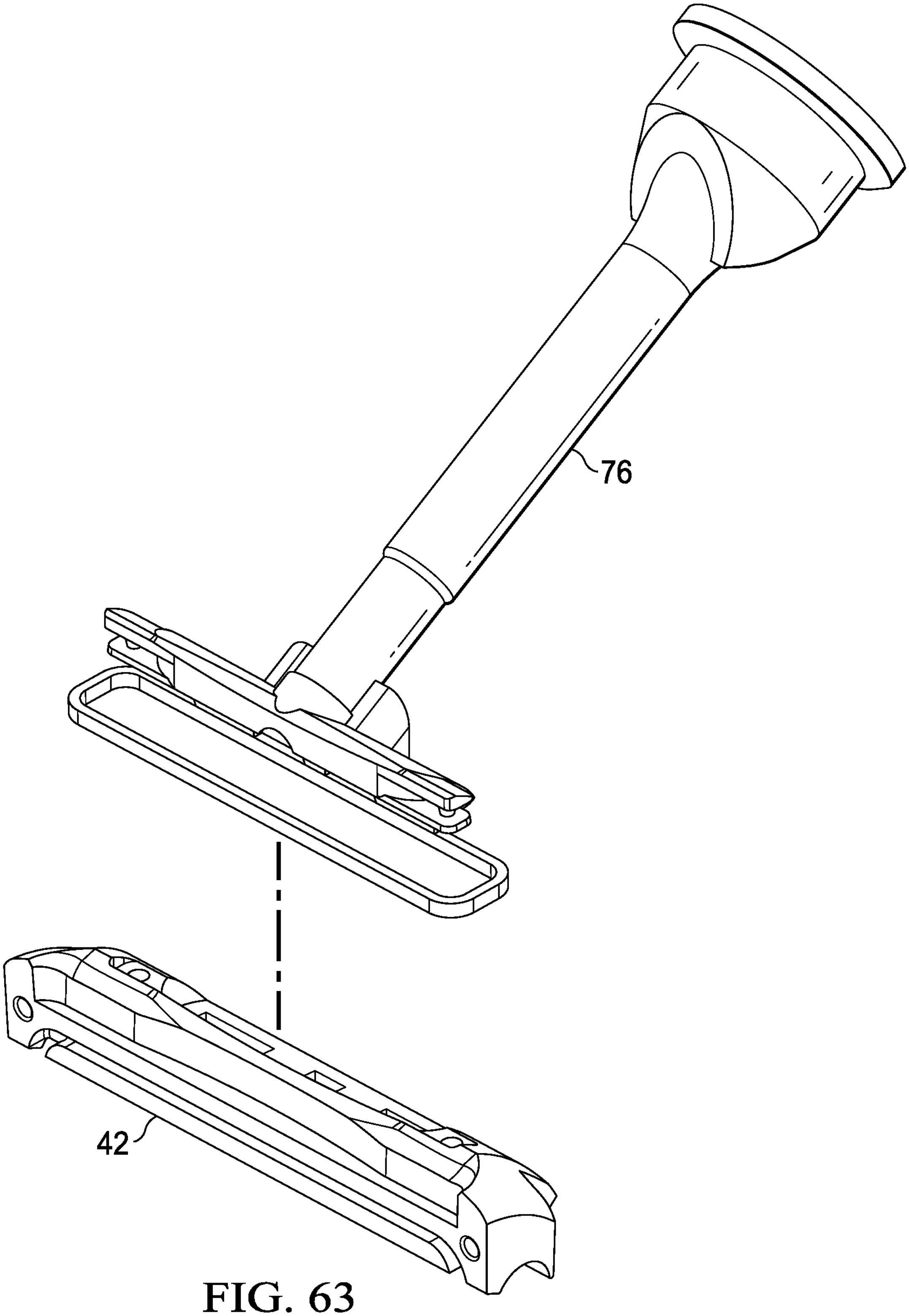
FIG. 63 is a perspective view of a fluid benefit delivery member and a portion of a pivoting head in accordance with an embodiment of the invention.
Figure 64:
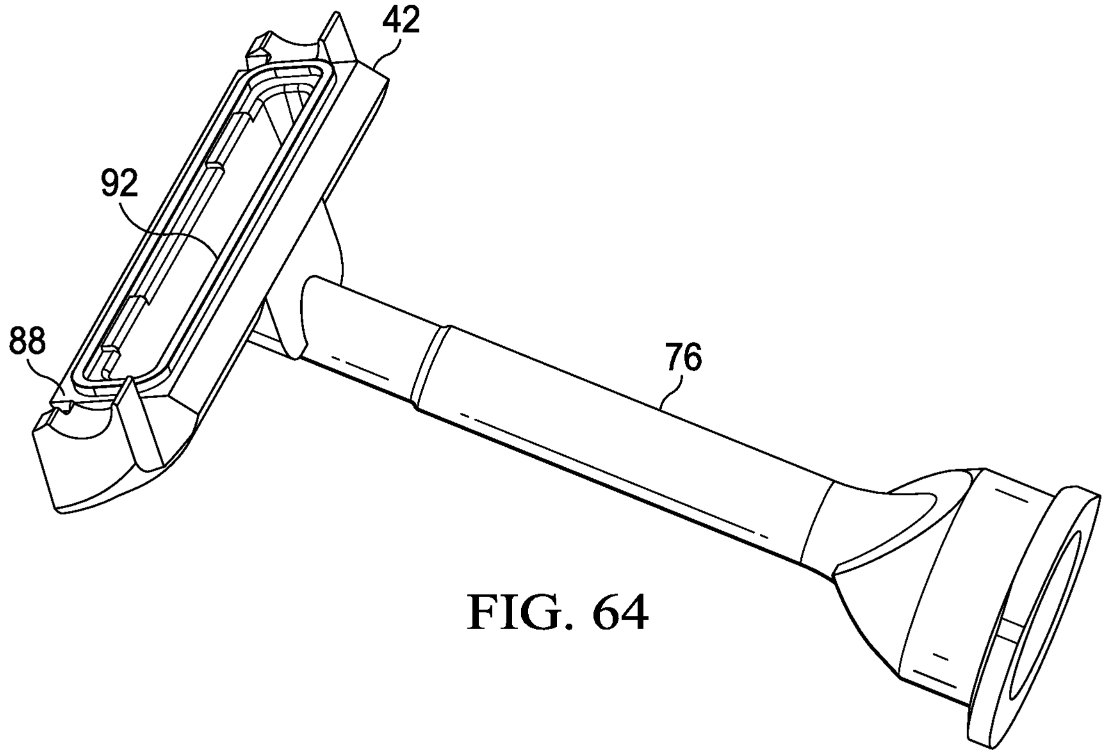
FIG. 64 is a perspective view of a fluid benefit delivery member and a portion of a pivoting head in accordance with an embodiment of the invention.
Figure 65:
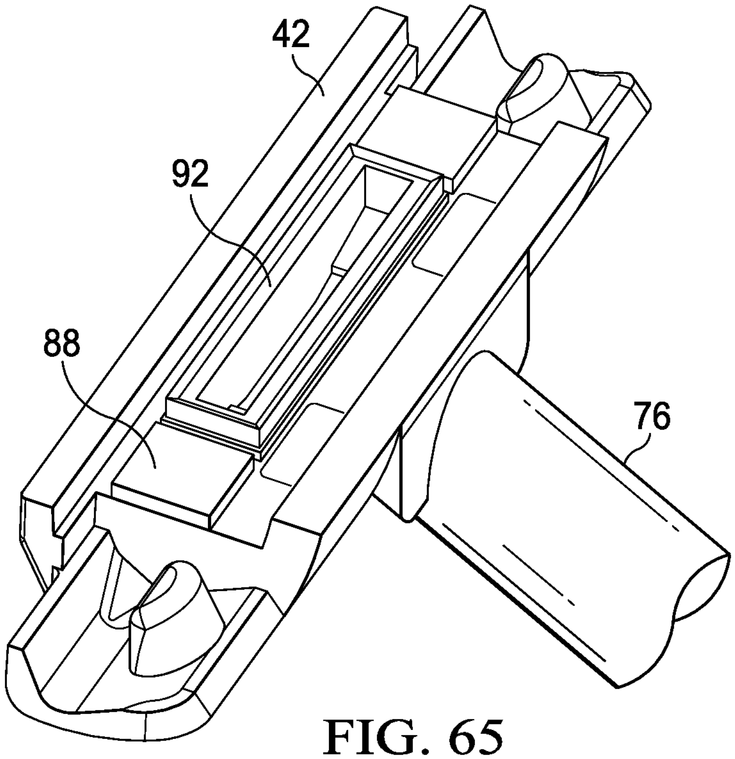
FIG. 65 is a perspective view of a portion of a fluid benefit delivery member and a portion of a pivoting head in accordance with an embodiment of the invention.

In an embodiment, the fluid benefit delivery member 76 and the base member 42 of the pivoting head 22 can be overmolded in a two-shot injection mold to form a three-component assembly that can form pivoting head 22. In this manner the base member can be a relatively hard material and the fluid benefit delivery member 76 can be a relatively soft material. A portion of the polymer injection molded for the fluid delivery member forms the gasket member 92 of the base member 42, as described above. Referring to FIG. 63, the base member 42 and fluid benefit delivery member 76 are shown as they would appear if they were injection molded separately. However, in an embodiment, the fluid benefit delivery member 76 and the base member 42 can be overmolded in a two-shot injection mold process to manufacture an integral member as shown in FIG. 64, in which the material of the fluid benefit delivery member 76 extends through base member 42 and is exposed at the first mating surface 88 as gasket member 92. FIG. 65 shows another perspective view of the first mating surface 88 of the cover member 42 having exposed and extended therefrom a gasket member 92 which is integral with fluid benefit delivery member 76. A two-shot injection molding of the fluid delivery member with the base member 42 as described is believed to increase the structural integrity of the fluid benefit delivery member 76/base member 42 unit by increasing the force required to remove the base member 42 from the fluid benefit delivery member 76. As described above, the base member can be joined to the third component, i.e., the cover member 40, such that their respective first and second mating faces 88, 90 are joined, and gasket member 92 lodges in and forms a gasket in gasket groove 94 of cover member 40.

Figure 66A:
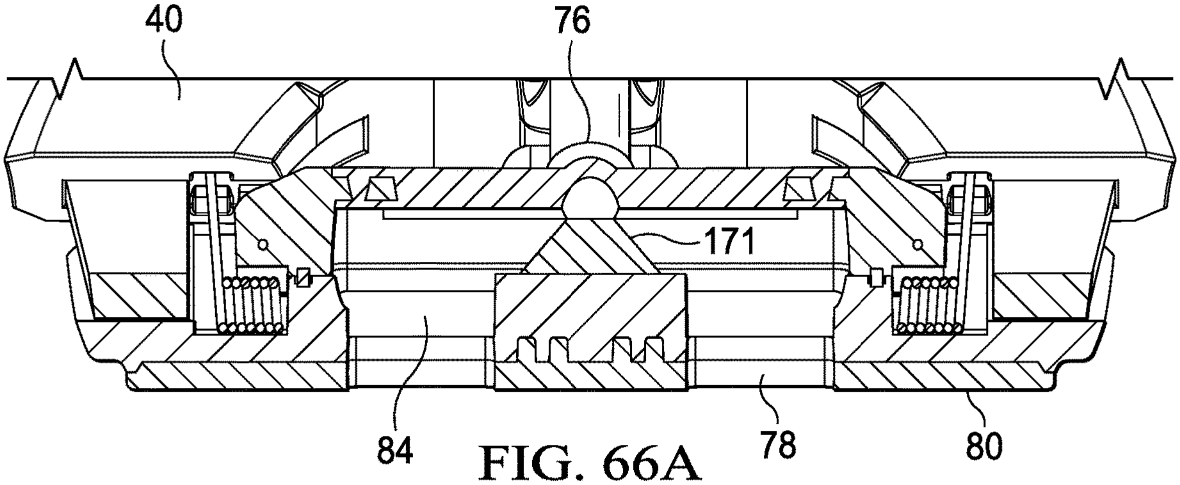
FIGS. 66A and 66B shows cut away views of a pivoting head and show a fluid distribution member.
Figure 66B:
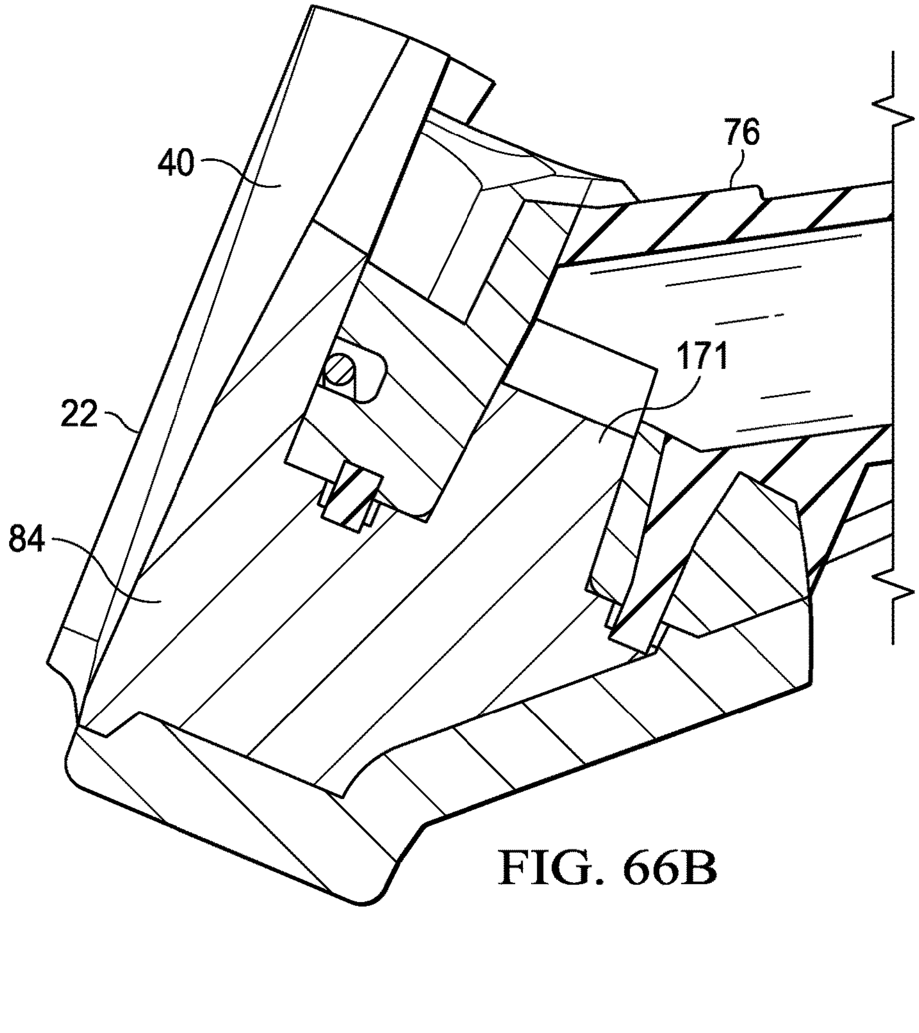

In an embodiment, the fluid flow path of the pivoting head 22 can be configured to provide for relatively unobstructed, smooth, continuous fluid flow from the fluid benefit delivery member 76 to openings 78 in face 80 of pivoting head 22, which can be a skin interfacing face. As shown in FIGS. 66A and 66B, which depict partial cross-sectional views of a pivoting head 22 having joined thereto a fluid benefit delivery member 76 that enters at a location having an area approximating the cross-sectional area of the fluid benefit delivery member 76 tube, a flow distributor 171 which directs and distributes fluid flow can be present. It is believed that having the flow distributor begin distribution relatively close to the entry point of the tube of the fluid benefit delivery member 76. By beginning fluid deflection and distribution almost immediately upon entry to the compartment 84, it has been unexpectedly found that fluid flow is enhanced, and blockage or clogging of openings, including openings 78, is minimized or eliminated. In an embodiment the fluid flow distributor 171 is located about 0.5 mm to about 2 mm from a junction of the connection of the fluid benefit delivery member 76 to the pivoting head 22. In an embodiment, the fluid reservoir in the pivoting head 22 can have a small cross section closer to the connection of the fluid benefit delivery member 76 to the pivoting head 22.

In general, the internal fluid conduit associated with fluid benefit delivery member 76 can have an internal hydraulic diameter from about 1 mm to about 3 mm. In general, the fluid benefit delivery member can have a minimum hydraulic diameter along the exterior of the fluid benefit delivery member from about 1.5 mm to about 3.5 mm.

In general, the materials used for the fluid benefit delivery member 76 can be elastomers with compression set of about less than 25%, and preferably about less than 10% measured by ASTM D-395. In an embodiment, silicone elastomer has been found to be suitable for the fluid benefit delivery member 76.

In general, other materials useful for the fluid delivery member include thermoplastics or thermosets with relatively high creep resistance, e.g., increase in tensile strain less than about 3%, and preferably less than about 1%, from initial tensile strain when measured using ISO 899-1 carried out at 1000 hours@73F.

The torques discussed above referred to as first and second pivoting torques can be referred to as relating to rotational stiffness. In general, since the benefit delivery member, such as the flexible conductive strip 98 of heat delivery member 96 and fluid benefit delivery member 76, can be comprised of materials that stress relax, it can be advantageous if the rotational stiffness of the pivoting head 22 is greater than twice, or more preferably greater than 5 times, the rotational stiffness of the pivoting head 22 with the benefit delivery member removed. The rotational stiffness of the pivoting head 22 without the benefit delivery member can be measured by severing, e.g., cutting out, the benefit delivery member such that it exerts no biasing force between the pivoting head 22 and the handle 12. Generally, the rotational stiffness of the pivot mechanism is desirably greater than twice the rotational stiffness of the pivot mechanism with the benefit pivot delivery connection disconnected at the proximal end of the handle and at the pivoting head 22. This latter configuration greatly reduces the probability and conditions under which the razor 10 or razor handle 12 can take a "set." The rotational stiffness of a pivot mechanism (with or without benefit pivot delivery connection) can be measured by the Static Torque Stiffness Method described below.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

Test Methods

Static Torque Stiffness Method

Without intending to be bound by any theory, it is believed that the torque stiffness of a bearing or pivot mechanism described herein can be applied to characterize a bearing or pivot mechanism within a razor, razor cartridge, or razor handle. The specific article being tested will be referred to as the test component for the rest of this method. Also, in the description of the method below, the term "pivot mechanism" is understood to encompass both bearing and pivot mechanisms.

Figure 67A:
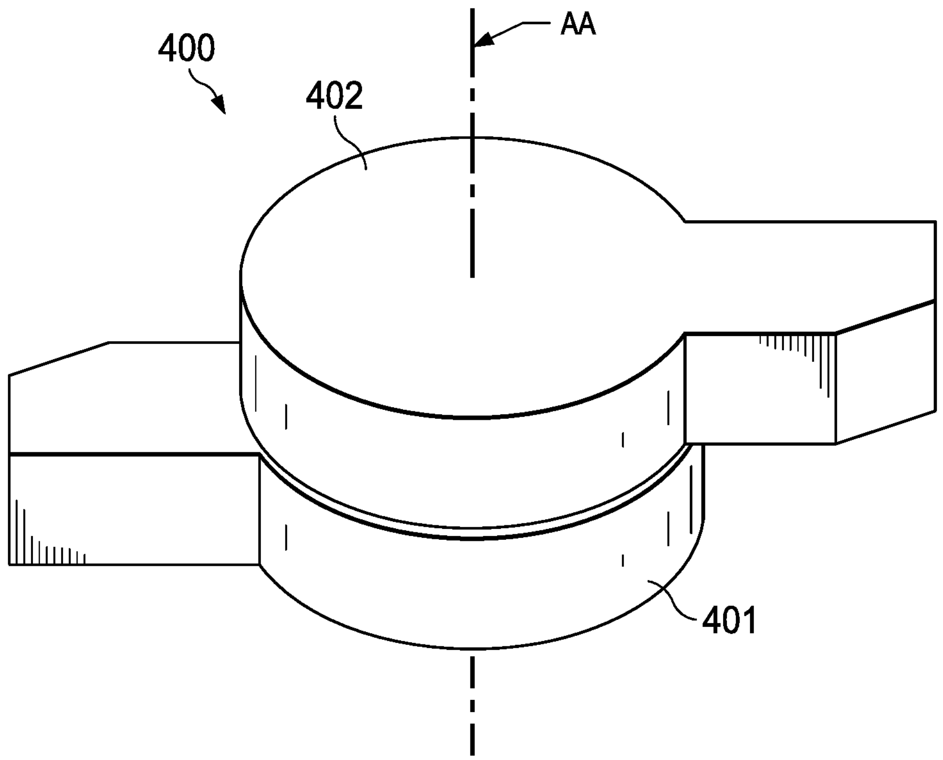
FIG. 67A-B is a schematic representation of a portion of an apparatus associated with a test method described herein in accordance with an embodiment of the invention.
Figure 67B:
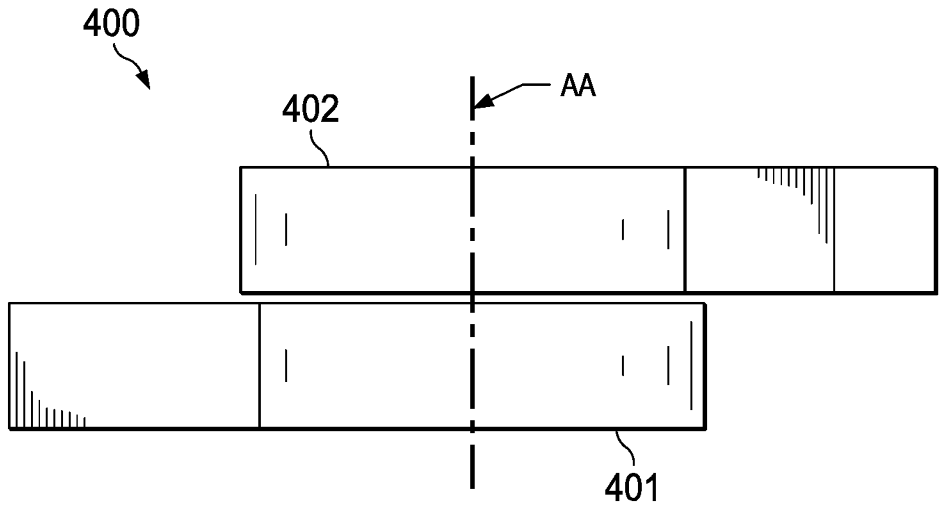

The static torque stiffness method can be used to measure torque stiffness. In this method, different sections of the test component are rotated relative to each other about an axis of rotation (such as axis of rotation 26, for example) of the pivot mechanism and torques versus angles of rotation between sections are measured. Referring to FIG. 67, in general, the pivot mechanism 400 can be understood to rotate a first section 401 of the test component located on one side of the pivot mechanism relative to a second section 402 of the test component located on the far side of the pivot mechanism about an axis of rotation AA. These first and second sections may include parts of the pivot mechanism.

Figure 68:
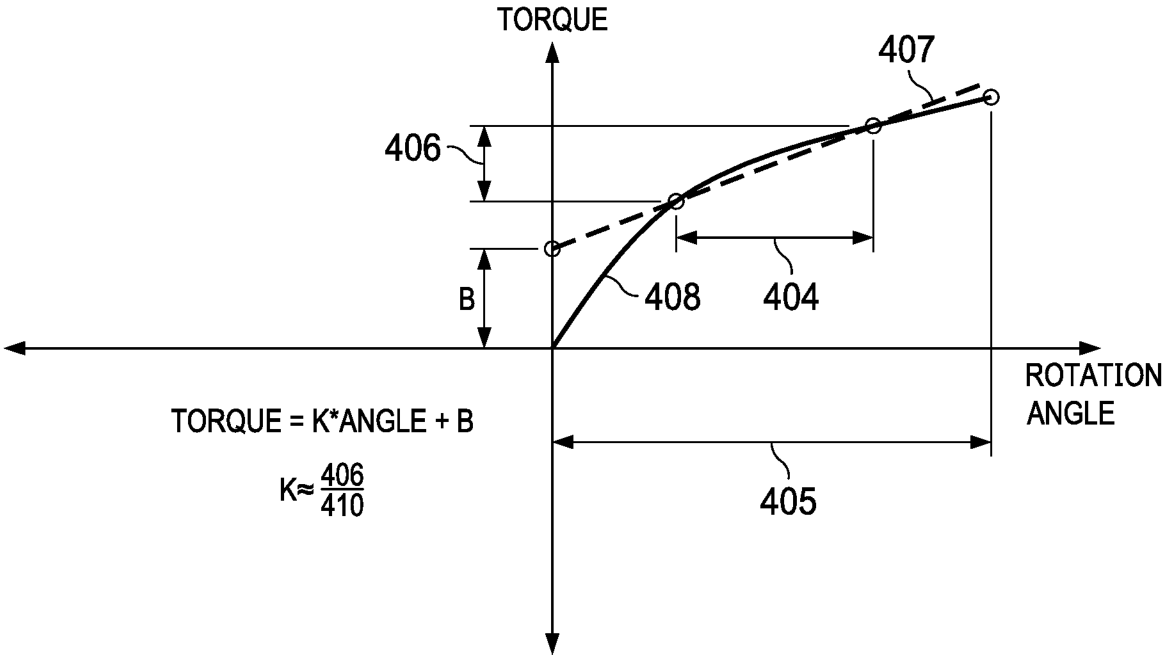
FIG. 68 is a graph showing a representative torque curve for an embodiment in accordance with an embodiment of the invention.
Figure 69:
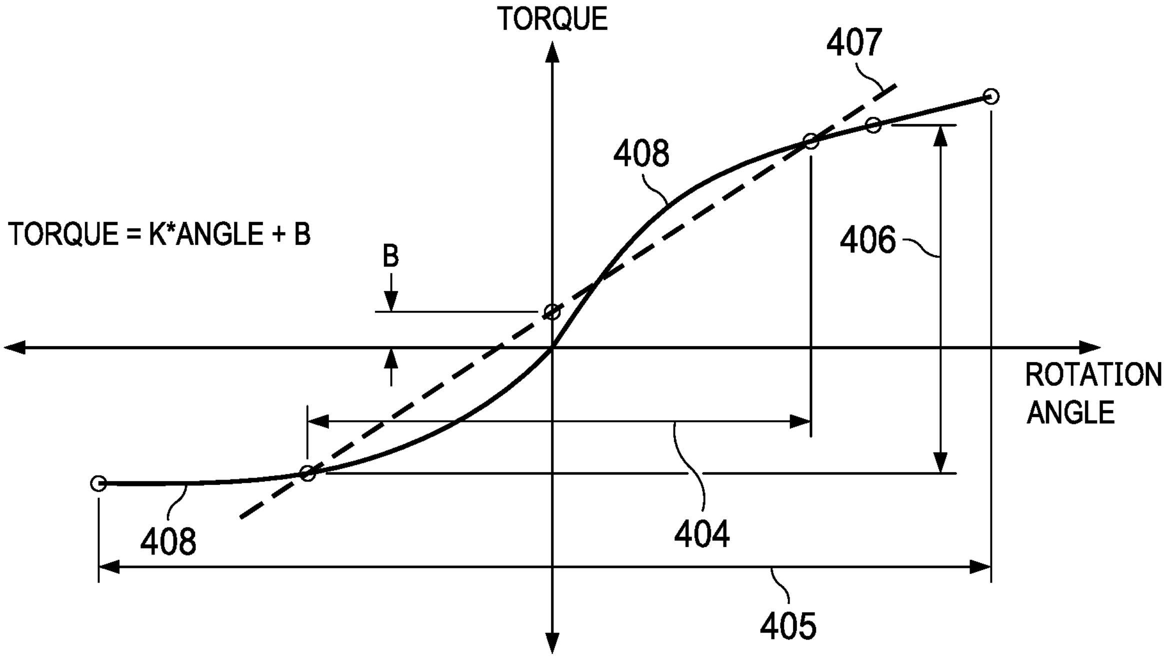
FIG. 69 is a graph showing a representative torque curve for an embodiment in accordance with an embodiment of the invention.

In FIGS. 68 and 69, some representative measurements of torque stiffness for different mechanisms are shown. From these figures, torque stiffness can be understood to be a measurement of proportionality between measurement of torque and rotation angle. More specifically, torque stiffness, K, is the proportionality constant for the least squares best fit line 407 for measurements 408 of torque versus rotation angle over the middle 50% 404 of the full range 405 of angular motion of the pivot mechanism 400 unless otherwise specified. An individual torque measurement can be understood to be the measurement of torque and angle while holding the relative angle between the first section 401, which can rotate, and the second section 402, which is held fixed, constant.

The static torque stiffness method consists of (1) identifying the instant center of rotation over the full angular range of the motion of the pivot mechanisms, (2) clamping the test component into an appropriate test fixture that has the torque sensor centered about axis of rotation, (3) making the individual measurement of torque and rotation, and (4) calculating the torque stiffness. The environmental testing conditions for the static torque stiffness method comprise of making measurements at a room temperature of 23 Celsius and relative humidity of 35% to 50% and using test components that are in a dry, "as-made" condition.

Step 1: Identify the instant center of rotation over the full angular range of motion of the pivot of mechanism.

The instant center of rotation is the location of the axis of rotation of the pivot mechanism at an individual angle of rotation. The identification of the axis of rotation for an individual torque versus angle measurement can be important because many pivot mechanisms have virtual pivots where the axis of rotation is offset or even outside the pivot mechanism, many pivot mechanisms have no obvious features such as a pin or a shaft that indicate the location of the axis of rotation, and some more complex pivot mechanisms have an axis of rotation that changes location during the motion.

Figure 70:
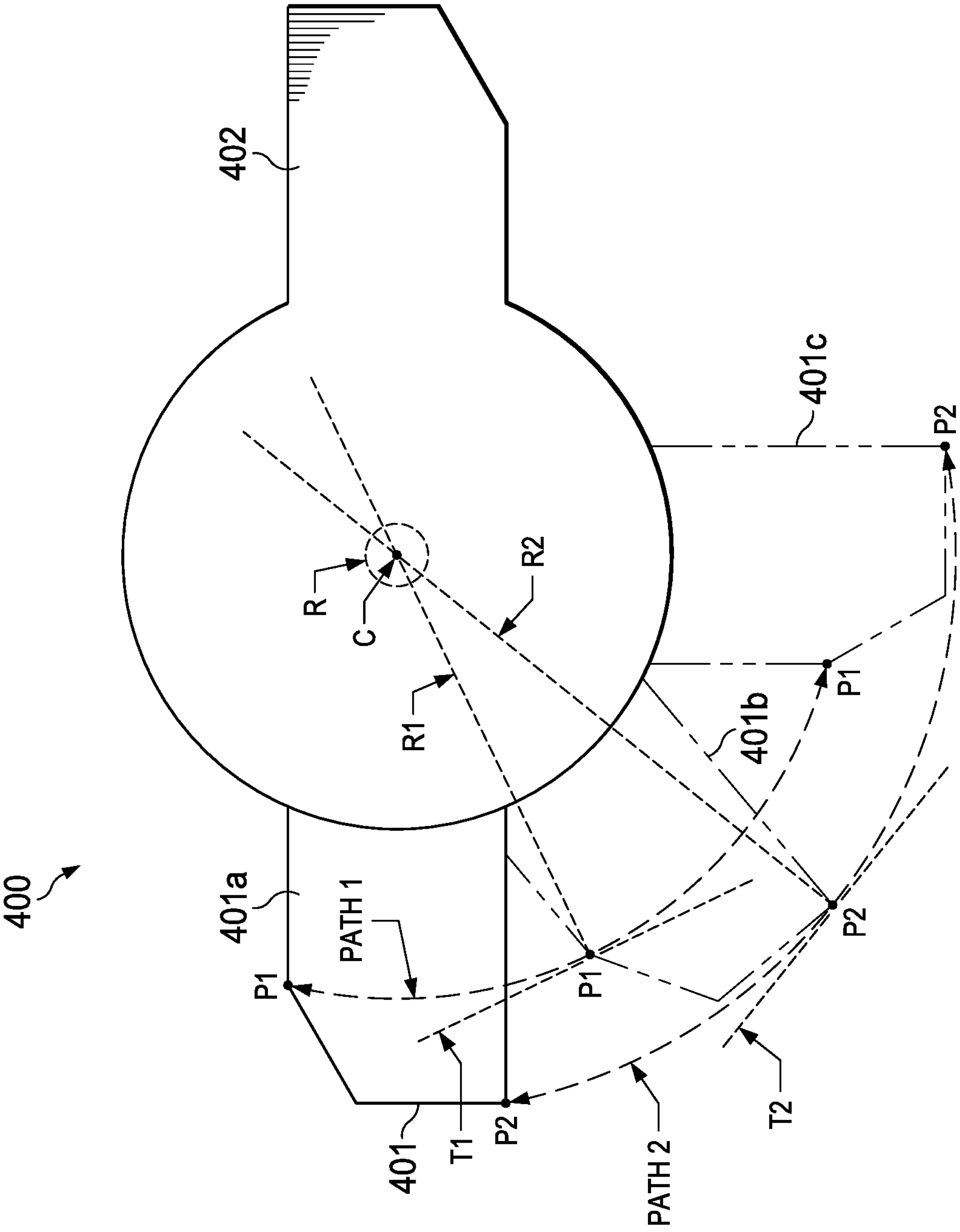
FIG. 70 is a schematic representation of a portion of an apparatus associated with a test method described herein in accordance with an embodiment of the invention.

As shown in FIG. 70, the instant center of rotation C of a pivot mechanism undergoing a planar rotation can be determined by tracing the path, PATH1 and PATH2, of two points, P1, and P2, on the rotating first section 401. As an illustration, FIG. 7 shows Section 401 at 3 positions 401*a,* 401*b,* and 401*c,* and it calculates the instant center of rotation C at position 401*b.* At this angle of rotation, two lines, T1 and T2, can be drawn tangent to PATH1 and PATH2 respectively. Two additional lines, R1 and R2, can be drawn perpendicular to T1 and T2 respectively. The instant center can be located at the intersection of R1 and R2. In general, the instant center can be considered fixed for the full range of angular motion of the pivot mechanism if all pivot centers are in a region R, which has an area of 0.25 $mm^2$.

Figure 71:
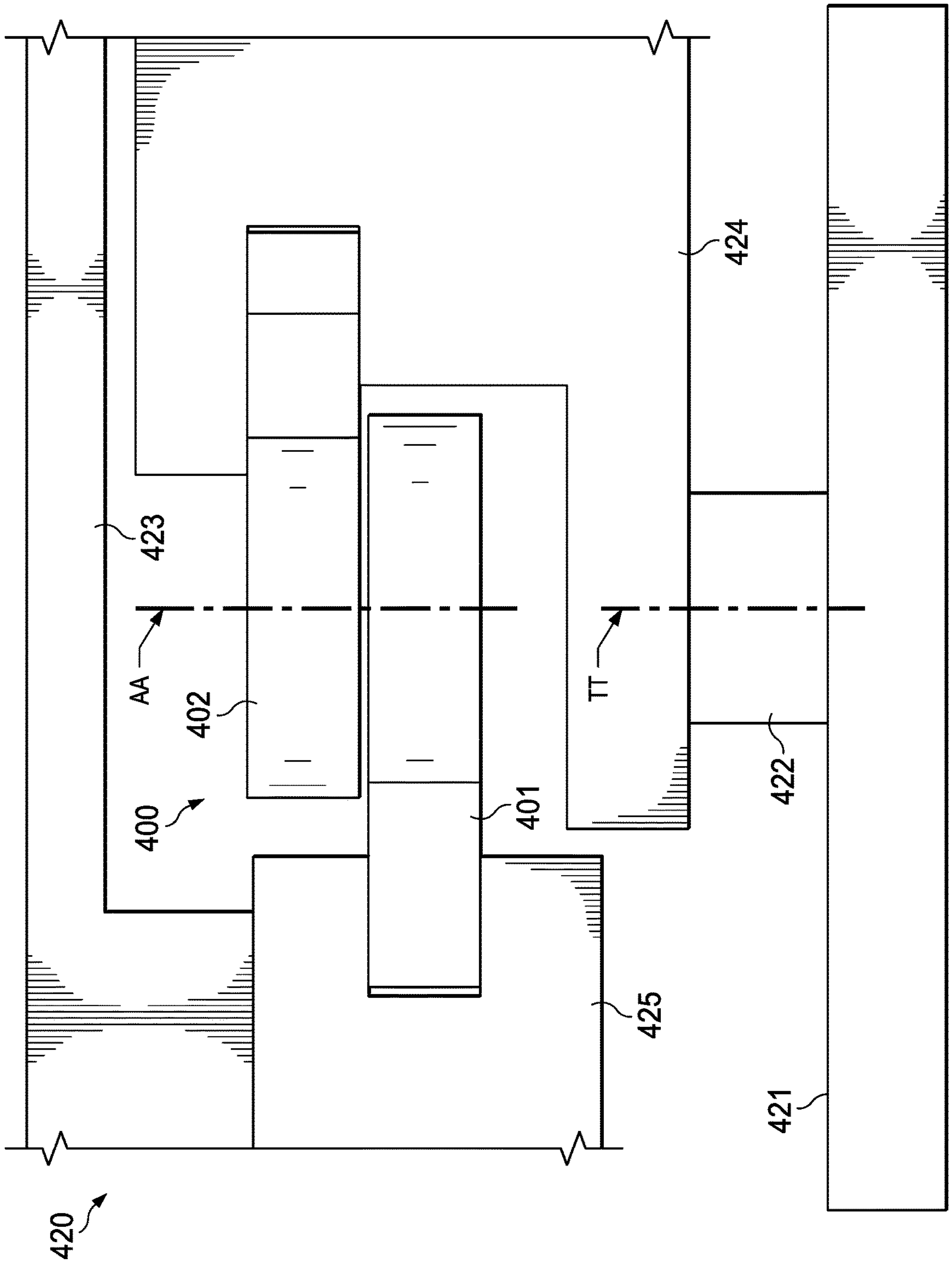
FIG. 71 is a schematic representation of a portion of an apparatus associated with a test method described herein in accordance with an embodiment of the invention.

Step 2: Clamp the test component in appropriate test fixture with torque sensor centered on axis of rotation As shown in FIG. 71, an appropriate test measurement system 420 can be configured to make the torque versus angle measurements needed to calculate the torque stiffness. Representative components of a torque tester such as Instron's MT1 MicroTorsion tester are shown as a tester base 421, tester torque cell 422, and torque tester rotational member 423. Instron's MT1 MicroTorsion tester has a full-scale torque cell of 225 N-mm, with a torque accuracy of +1-0.5%, a torque repeatability of +1-0.5%, and an angle resolution of 0.003 degrees. The tester base 421 is fixed and attached to a torque cell 422 while the tester rotational member 423 rotates about an axis of rotation, TT. The fixed second section 402 is fastened to the torque cell side 422 of the tester using a first clamping mechanism 424. The rotating first section 401 is fastened to the tester rotational member 423 using a second clamping mechanism 425. Both clamping mechanisms are designed to allow the pivot to freely rotate through its full range of motion with little to no lateral loading on the pivot mechanism. They are also designed to make the tester axis of rotation, TT, colinear to the pivot mechanism's axis of rotation, AA. For pivot mechanisms whose instant center of rotation changes, multiple clamps should be used to ensure that these axes are colinear.

The angles of rotation measured in accordance with the static torque stiffness method are the angles of deflection of the moving first section 401 of the test component that rotate relative to the at rest position of said first section. In other words, the angle that is being measured is defined as the relative angle of the first section from the at rest position of the first section. The zero angle position of the first section is defined to be the rest position of the first section relative to the handle when (1) the test component is fixed in space, (2) the first section is free to rotate about its axis of rotation relative to the fixed test component, (3) the axis of rotation of the first section is oriented colinear to the axis of rotation of the torque tester for range of angles being measured and (4) no external forces or torques other than those transmitted from the second section and gravity act on the first section. Prior to measurement, all rotations of the first section to one side of the zero angle position are designated as positive, while the rotations of the first section to the other side of the zero angle position are designated as negative. The sign convention of the torque measurement is positive for positive rotations of the first section and negative for negative rotations of the first section.

Step 3: Make the individual measurement of torque versus angle.

The following is the sequence for measurement of the torque-angle data of a safety razor.

Determine the angles at which to perform torque measurement by first determining the full angular range of the pivot mechanism; then by dividing this range into thirty about equal spaced intervals for measurement, resulting in a total of thirty one angles; and selecting the middle seventeen angles for measurement. Measurement of torque and angle at these seventeen angle can provide an accurate calculation of the torque stiffness over the middle 50% of the total angular range of the pivot mechanism.

For each of the angles, fasten the test component into the appropriate clamps (424 and 425) to ensure the instant center of rotation for the angle being measured is coincident to the axis of rotation of the tester, TT.

Attach the clamps to the torque tester in the zero angle position. Make the first measurement at the first positive value of the angle position being measured by moving the first section from the zero angle position to this first positive angle position.

Wait 20 seconds to 1 minute at this angle position. Record the torque value. Move the first section back to the zero angle position and wait 1 minute. Move to the next angle position at which a measurement is being made. Repeat the foregoing steps until all measurements are made.

Step 4. Calculate the measured data from the torque stiffness.

To determine the torque stiffness value, plot the seventeen torque measurements (y-axis) versus the corresponding seventeen angle measurements (x-axis). Create the best fit straight line through the data using a least squares linear regression. The torque stiffness value is the slope of the line Y=K*X+B, in which Y=torque (in N*mm); X=angle (in degrees); K=torque stiffness value (in N*mm/degree); and B=torque (in N*mm) at zero angle from the best fit straight line.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Representative embodiments of the present disclosure described above can be described as follows:

A. A handle, the handle comprising:

a. a main body;

b. a first substantially flat metal arm having a first proximal portion and a first distal end, the first proximal portion being rigidly coupled to the main body at a first location;

c. a second arm having a second proximal portion and a second distal end, the second proximal portion being rigidly coupled to the main body at a second location; and d. the first and second distal ends being in spaced relationship and having pivotally coupled therebetween a pivoting head.

B. The handle of paragraph A, wherein the handle weighs between 60 grams and 100 grams.

C. The handle of paragraph A or B, wherein the first distal end and second distal end each comprise a pin member welded thereto.

D. The handle of any of paragraphs A-C, wherein the first arm comprises a first cylindrical pin member welded at the first distal end and the second arm comprises a second cylindrical pin member welded to the second distal end, and wherein the first pin member and the second pin member reside in a coaxial relationship.

E. The handle of any of paragraphs A-D, wherein the first arm comprises a first cylindrical pin member welded at the first distal end and the second arm comprises a second cylindrical pin member welded to the second distal end, and wherein the first pin operatively engages a first receiving opening in the pivoting head and the second pin operatively engages a second receiving opening in the pivoting head.

F. The handle of any of paragraphs A-E, wherein the first and second arms are each rigidly coupled to the main body by a securement selected from the group consisting of welding, staking, cold heading, adhesive bonding, snap-fit, and frictional engagement.

G. The handle of any of paragraphs A-F, wherein the first and second arms each comprise metal plates, each metal plate defining a plate plane, and wherein the first arm plate plane is generally co-planar with the second arm plate plane.

H. The handle of any of paragraphs A-G, wherein the main body comprises a material selected from the group consisting of metal, cast metal, plastic, impact-resistant plastic, and composite.

I. A handle, the handle comprising:

a. a main body;

b. a first metal arm having a first proximal portion and a first distal end, the first proximal portion being slidably interlocked at a first location of the main body;

c. a second metal arm having a second proximal and a second distal end, the second proximal portion being slidably interlocked at a second location of the main; and d. the first and second distal ends being in opposed relationship and having pivotally coupled therebetween a pivoting head, the pivoting head having a trapezoidal prism-like shape.

J. The handle of paragraph I, wherein the handle weighs between 60 grams and 100 grams.

K. The handle of paragraph I or J, wherein the first arm comprises a first cylindrical pin member welded at the first distal end and the second arm comprises a second cylindrical pin member welded to the second distal end, and wherein the first pin member and the second pin member reside in a coaxial relationship.

L. The handle of any of paragraphs I-K, wherein the first arm comprises a first cylindrical pin member welded at the first distal end and the second arm comprises a second cylindrical pin member welded to the second distal end, and wherein the first pin operatively engages a first receiving opening in the pivoting head and the second pin operatively engages a second receiving opening in the pivoting head.

M. The handle of any of paragraphs I-L, wherein the first and second arms each comprise metal plates, each metal plate defining a plate plane, and wherein the first arm plate plane is generally co-planar with the second arm plate plane.

N. The handle of any of paragraphs I-M, wherein the main body comprises a material selected from the group consisting of metal, cast metal, plastic, impact-resistant plastic, and composite.

O. The handle of any of paragraphs I-N, wherein the main body comprises zinc.

P. A handle, the handle comprising:

a. a main body;

b. a first discrete metal arm having a first proximal portion and a first distal end, the first proximal portion being rigidly coupled to the main body at a first protuberance on the main frame;

c. a second discrete metal arm having a second proximal and a second distal end, the second proximal portion being rigidly coupled to the main body at a second protuberance on the main frame; and d. the first and second distal ends being in opposed relationship and having pivotally coupled therebetween a pivoting head, the pivoting head having a trapezoidal prism-like shape.

Q. The handle of paragraph P, wherein the handle weighs between 60 grams and 100 grams.

R. The handle of paragraph P or Q, wherein the first distal end and second distal end each comprise a pin member welded thereto.

S. The handle of any of paragraphs P-R, wherein the first arm comprises a first cylindrical pin member welded at the first distal end and the second arm comprises a second cylindrical pin member welded to the second distal end, and wherein the first pin member and the second pin member reside in a coaxial relationship.

T. The handle of any of paragraphs P-S, wherein the first arm comprises a first cylindrical pin member welded at the first distal end and the second arm comprises a second cylindrical pin member welded to the second distal end, and wherein the first pin operatively engages a first receiving opening in the pivoting head and the second pin operatively engages a second receiving opening in the pivoting head.

U. The handle of any of paragraphs P-T, wherein the first and second arms are each rigidly coupled to the main frame by a securement selected from the group consisting of welding, staking, cold heading, adhesive bonding, snap-fit, and frictional engagement.

V. The handle of any of paragraphs P-U, wherein the first and second arms each comprise metal plates, each metal plate defining a plate plane, and wherein the first arm plate plane is generally co-planar with the second arm plate plane.

W. The handle of any of paragraphs P-V, wherein the main frame comprises a material selected from the group consisting of metal, cast metal, plastic, impact-resistant plastic, and composite.

X. The handle of any of paragraphs P-W, wherein the main frame comprises zinc.

Y. A handle, the handle comprising:

a. a main body weighing greater than about 60 grams;

b. a first arm having a first proximal portion and a first distal end, the first proximal portion being rigidly coupled to the main body at a first location;

c. a second arm having a second proximal portion and a second distal end, the second proximal portion being rigidly coupled to the main body at a second location; and d. the first and second distal ends being in spaced relationship and having pivotally coupled therebetween a pivoting head.

Z. The handle of paragraph Y, wherein the first and second arms comprise metal and the handle weighs between 60 grams and 100 grams.

AA. The handle of paragraph Y or Z, wherein the first distal end and second distal end each comprise a pin member welded thereto.

BB. The handle of any of paragraphs Y-AA, wherein the first arm comprises a first cylindrical pin member welded at the first distal end and the second arm comprises a second cylindrical pin member welded to the second distal end, and wherein the first pin member and the second pin member reside in a coaxial relationship.

CC. The handle of any of paragraphs Y-BB, wherein the first arm comprises a first cylindrical pin member welded at the first distal end and the second arm comprises a second cylindrical pin member welded to the second distal end, and wherein the first pin operatively engages a first receiving opening in the pivoting head and the second pin operatively engages a second receiving opening in the pivoting head.

DD. The handle of any of paragraphs Y-CC, wherein the first and second arms each comprise a material selected from the group consisting of metal, plastic, and composite.

EE. The handle of any of paragraphs Y-DD, wherein the first and second arms are each rigidly coupled to the main body by a securement selected from the group consisting of welding, staking, cold heading, adhesive bonding, and frictional engagement.

PP. The handle of any of paragraphs Y-EE, wherein the first and second arms each comprise metal plates, each metal plate defining a plate plane, and wherein the first arm plate plane is generally co-planar with the second arm plate plane.

GG. The handle of any of paragraphs Y-FF, wherein the main body comprises a material selected from the group consisting of metal, cast metal, plastic, impact-resistant plastic, and composite.

HH. A handle, the handle comprising:

a. a main body;

b. a first arm having a first proximal portion and a first distal end, the first proximal portion being slidably interlocked at a first location of the main body;

c. a second arm having a second proximal and a second distal end, the second proximal portion being slidably interlocked at a second location of the main; and d. the first and second distal ends being in spaced relationship and having pivotally coupled therebetween a pivoting head,.

II. The handle of paragraph HH, wherein the first and second arms comprise metal and the handle weighs between 60 grams and 100 grams.

JJ. The handle of paragraph HH or II, wherein the first arm comprises a first cylindrical pin member welded at the first distal end and the second arm comprises a second cylindrical pin member welded to the second distal end, and wherein the first pin member and the second pin member reside in a coaxial relationship.

KK. The handle of any of paragraphs HH-JJ, wherein the first arm comprises a first cylindrical pin member welded at the first distal end and the second arm comprises a second cylindrical pin member welded to the second distal end, and wherein the first pin operatively engages a first receiving opening in the pivoting head and the second pin operatively engages a second receiving opening in the pivoting head.

LL. The handle of any of paragraphs HH-KK, wherein the first and second arms each comprise a material selected from the group consisting of metal, plastic, and composite.

MM. The handle of any of paragraphs HH-LL, wherein the first and second arms each comprise metal plates, each metal plate defining a plate plane, and wherein the first arm plate plane is generally co-planar with the second arm plate plane.

NN. The handle of any of paragraphs HH-MM, wherein the main body comprises a material selected from the group consisting of metal, cast metal, plastic, impact-resistant plastic, and composite.

OO. The handle of any of paragraphs HH-NN, wherein the main body comprise zinc.

PP. A handle, the handle comprising:

a. a main body weighing greater than about 60 grams;

b. a first arm having a first proximal portion and a first distal end, the first proximal portion being rigidly coupled to the main body at a first protuberance on the main frame;

c. a second arm having a second proximal and a second distal end, the second proximal portion being rigidly coupled to the main body at a second protuberance on the main frame; and d. the first and second distal ends being in spaced relationship and having pivotally coupled therebetween a pivoting head.

QQ. The handle of paragraph PP, wherein the first and second arms comprise metal and the handle weighs between 60 grams and 100 grams.

RR. The handle of paragraph PP or QQ, wherein the first distal end and second distal end each comprise a pin member welded thereto.

SS. The handle of any of paragraphs PP-RR, wherein the first arm comprises a first cylindrical pin member welded at the first distal end and the second arm comprises a second cylindrical pin member welded to the second distal end, and wherein the first pin member and the second pin member reside in a coaxial relationship.

TT. The handle of any of paragraphs PP-RR, wherein the first arm comprises a first cylindrical pin member welded at the first distal end and the second arm comprises a second cylindrical pin member welded to the second distal end, and wherein the first pin operatively engages a first receiving opening in the pivoting head and the second pin operatively engages a second receiving opening in the pivoting head.

UU. The handle of any of paragraphs PP-TT, wherein the first and second arms each comprise a material selected from the group consisting of metal, plastic, and composite.

VV. The handle of any of paragraphs PP-UU, wherein the first and second arms are each rigidly coupled to the main frame by a securement selected from the group consisting of welding, staking, cold heading, adhesive bonding, snap-fit, and frictional engagement.

WW. The handle of any of paragraphs PP-VV, wherein the first and second arms each comprise metal plates, each metal plate defining a plate plane, and wherein the first arm plate plane is generally co-planar with the second arm plate plane.

XX. The handle of any of paragraphs PP-WW, wherein the main frame comprises a material selected from the group consisting of metal, cast metal, plastic, impact-resistant plastic, and composite.

YY. The handle of any of paragraphs PP-XX, wherein the main frame comprises zinc.

What is claimed is:

1. A handle and pivoting head assembly comprising:

a main body;

a first substantially flat metal arm having a first proximal portion and a first distal end, the first proximal portion being non-rotatably rigidly coupled and fixed relative to the main body at a first location, the first arm having an upper main surface extending from the first proximal portion out to the distal end, at least a majority of the main surface from the first proximal portion to the first distal end extends in a plane, and the first arm being discrete from the main body;

a second arm having a second proximal portion and a second distal end, the second proximal portion being non-rotatably rigidly coupled and fixed relative to the main body at a second location, and the second arm being discrete from the main body; and the first and second distal ends being in spaced relationship and having pivotally coupled therebetween a pivoting head, wherein a first pin member is directly coupled to the first distal end and extends inwardly in a direction away from an outer edge of the first arm toward the second arm, and wherein the first pin member is operatively disposed in a first bearing recess on the pivoting head;

wherein the pivoting head comprises a skin interfacing face and has a tapered shape extending through an opening in a cartridge unit.

2. The handle and pivoting head assembly of claim 1, wherein the first pin member is welded to the first distal end and wherein the second distal end comprises a second pin member welded thereto.

3. The handle and pivoting head assembly of claim 1, wherein the first arm comprises the first pin member comprising a first cylindrical pin member welded at the first distal end and the second arm comprises a second pin member comprising a second cylindrical pin member welded to the second distal end, and wherein the first pin member and the second pin member reside in a coaxial relationship.

4. The handle and pivoting head assembly of claim 1, wherein the first arm comprises the first pin member comprising a first cylindrical pin member welded at the first distal end and the second arm comprises a second pin member comprising a second cylindrical pin member welded to the second distal end, and wherein the second pin member is operatively disposed in a second bearing recess on the pivoting head.

5. The handle and pivoting head assembly of claim 1, wherein the first and second arms are each rigidly coupled to the main body by a securement comprising a non-circular opening in each of the first and second arms engaged by corresponding protuberances on a main frame of the main body.

6. The handle and pivoting head assembly of claim 1, wherein the first and second arms each comprise metal plates, each metal plate defining a plate plane, and wherein the first arm plate plane is generally co-planar with the second arm plate plane.

7. The handle and pivoting head assembly of claim 1, wherein the pivoting head comprises a face comprising an elastomeric material.

8. The handle and pivoting head assembly of claim 1, wherein the first and second arms are non-rotatably rigidly coupled and fixed relative to the main body at the first and second locations once the first and second arms are coupled to the main body and the first and second arms do not pivot relative to the main body once the first and second arms are coupled to the main body.

9. The handle and pivoting head assembly of claim 1, wherein the pivoting head comprises at least one limit member capable of contacting one of the first and second arms to limit rotation of the pivoting head.

10. A handle and pivoting head assembly comprising:

a main body;

a first metal arm having a first proximal portion and a first distal end, the first proximal portion being slidably interlocked at a first location of the main body and being non-rotatably fixed relative to the main body;

a second metal arm having a second proximal portion and a second distal end, the second proximal portion being slidably interlocked at a second location of the main body and being non-rotatably fixed relative to the main body; and the first and second distal ends being in opposed relationship and having pivotally coupled therebetween a pivoting head, the pivoting head having a trapezoidal prism shape, with a relatively wide face of the pivoting head nearer to the main body than a relatively narrow face of the pivoting head, wherein the pivoting head comprises a skin interfacing face and the relatively narrow face extends through an opening in a blade cartridge unit, and the blade cartridge unit is capable of being attached to the pivoting head, and wherein the first distal end is operatively disposed in a first bearing recess on the pivoting head and the second distal end is operatively disposed in a second bearing recess on the pivoting head.

11. The handle and pivoting head assembly of claim 10, wherein the first arm comprises a first cylindrical pin member welded at the first distal end and the second arm comprises a second cylindrical pin member welded to the second distal end, and wherein the first pin member and the second pin member reside in a coaxial relationship.

12. The handle and pivoting head assembly of claim 10, wherein the first and second arms are each rigidly coupled to the main body by a securement comprising a non-circular opening in each of the first and second arms engaged by corresponding protuberances on a main frame of the main body.

13. The handle and pivoting head assembly of claim 10, wherein the first and second arms each comprise metal plates, each metal plate defining a plate plane, and wherein the first arm plate plane is generally co-planar with the second arm plate plane.

14. The handle and pivoting head assembly of claim 10, wherein the pivoting head comprises a face comprising an elastomeric material.

15. The handle and pivoting head assembly of claim 10, wherein the first and second arms are slidably interlocked and non-rotatably fixed relative to the main body at the first and second locations once the first and second arms are coupled to the main body and the first and second arms do not pivot relative to the main body once the first and second arms are coupled to the main body.

16. The handle and pivoting head assembly of claim 10, wherein the pivoting head comprises at least one limit member capable of contacting one of the first and second arms to limit rotation of the pivoting head.

17. A handle and pivoting head assembly comprising:

a main body;

a first discrete metal arm having a first proximal portion and a first distal end, the first proximal portion being non-rotatably rigidly coupled and fixed relative to the main body at a first protuberance on a main frame;

a second discrete metal arm having a second proximal portion and a second distal end, the second proximal portion being non-rotatably rigidly coupled and fixed relative to the main body at a second protuberance on the main frame; and the first and second distal ends being in opposed relationship and having pivotally coupled therebetween a pivoting head, the pivoting head having a trapezoidal prism shape, with a relatively wide face of the pivoting head nearer to the main body than a relatively narrow face of the pivoting head, wherein a blade cartridge unit is capable of being attached to the pivoting head such that the narrow face of the pivoting head extends through an opening in the cartridge, and wherein the first distal end is operatively disposed in a first bearing recess on the pivoting head and the second distal end is operatively disposed in a second bearing recess on the pivoting head.

18. The handle and pivoting head assembly of claim 17, wherein the handle weighs between 60 grams and 100 grams.

19. The handle and pivoting head assembly of claim 17, wherein the first distal end and second distal end each comprise a pin member welded thereto.

20. The handle and pivoting head assembly of claim 17, wherein the first arm comprises a first cylindrical pin member welded at the first distal end and the second arm comprises a second cylindrical pin member welded to the second distal end, and wherein the first pin member and the second pin member reside in a coaxial relationship.

21. The handle and pivoting head assembly of claim 20, wherein the first cylindrical pin member operatively engages the first bearing recess on the pivoting head and the second cylindrical pin member operatively engages the second bearing recess on the pivoting head.

22. The handle and pivoting head assembly of claim 17, wherein the first and second arms are each rigidly coupled to the main frame by a securement comprising a non-circular opening in each of the first and second arms engaged by corresponding protuberances on the main frame.

23. The handle and pivoting head assembly of claim 17, wherein the first and second arms each comprise metal plates, each metal plate defining a plate plane, and wherein the first arm plate plane is generally co-planar with the second arm plate plane.

24. The handle and pivoting head assembly of claim 17, wherein the pivoting head comprises a face comprising an elastomeric material.

25. The handle and pivoting head assembly of claim 17, wherein the first and second arms are non-rotatably rigidly coupled and fixed relative to the main body at the first and second protuberances once the first and second arms are coupled to the main body and the first and second arms do not pivot relative to the main body once the first and second arms are coupled to the main body.

26. The handle and pivoting head assembly of claim 17, wherein the pivoting head comprises at least one limit member capable of contacting one of the first and second arms to limit rotation of the pivoting head.

* * * * *